(12) United States Patent
Kikitsu et al.

(10) Patent No.: US 6,602,620 B1
(45) Date of Patent: Aug. 5, 2003

(54) MAGNETIC RECORDING APPARATUS, MAGNETIC RECORDING MEDIUM AND MANUFACTURING METHOD THEREOF

(75) Inventors: Akira Kikitsu, Yokohama (JP); Katsutaro Ichihara, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/472,250

(22) Filed: Dec. 27, 1999

(30) Foreign Application Priority Data

Dec. 28, 1998 (JP) .......................................... 10-372748
Dec. 28, 1998 (JP) .......................................... 10-372750

(51) Int. Cl.⁷ .............................. G11B 5/66; G11B 5/70
(52) U.S. Cl. ........................... 428/694 T; 428/694 TS; 428/694 BS; 428/694 BA; 428/900
(58) Field of Search ....................... 428/694 T, 694 TS, 428/694 B, 694 BS, 694 BN, 694 BA, 900

(56) References Cited

U.S. PATENT DOCUMENTS 5,652,054 A * 7/1997 Kikitsu et al. .............. 428/328
6,183,832 B1 * 2/2001 Margulies et al. ......... 428/65.3
6,271,994 B1 * 8/2001 Saito et al. .............. 360/236.5

FOREIGN PATENT DOCUMENTS

| JP | 55-157129 | 12/1980 |
| JP | 3-22211 | 1/1991 |
| JP | 6-231443 | 8/1994 |

OTHER PUBLICATIONS

Zhu et al.. "Micromagnetic Study of Network Media", Jul./1998, IEEE Trans. Magn., vol. 34, no. 4, pp. 1609–1611.*

Chou et al. , "Nanolithographically defined magnetic strictires and quantum magnetic disk", Apr. 15, 1996, J. Appl. Phys., vol. 79, No. 8, pp. 6101–6106.*

Robert White, et al. "Patterned Media Promise Superhigh Storage Densities," Data Storage, Sep. 1997, pp. 55–56, 58 and 60.

R. M. H. New, et al., "Submicron Patterning of Thin Cobalt Films for Magnetic Storage," Journal of Vacuum Science Technology, B12(6), Nov./Dec. 1994, pp. 3196–3201.

* cited by examiner

*Primary Examiner*—Holly Rickman
(74) *Attorney, Agent, or Firm*—Oblon, Spivak, McClelland, Maier & Neustadt, P.C.

(57) ABSTRACT

A magnetic recording medium comprising a magnetic recording layer formed on a substrate, in which information is recorded by forming recording cells in recording tracks formed on a surface of the magnetic recording layer, wherein the magnetic recording layer has a structure that magnetic particles are formed in a non-magnetic matrix and ordered particle domains in which magnetic particles are arrayed regularly are formed on a surface thereof, and wherein a size in a track width direction of each ordered particle domain is one fifth or more of a width of the recording track formed on the recording layer.

23 Claims, 13 Drawing Sheets

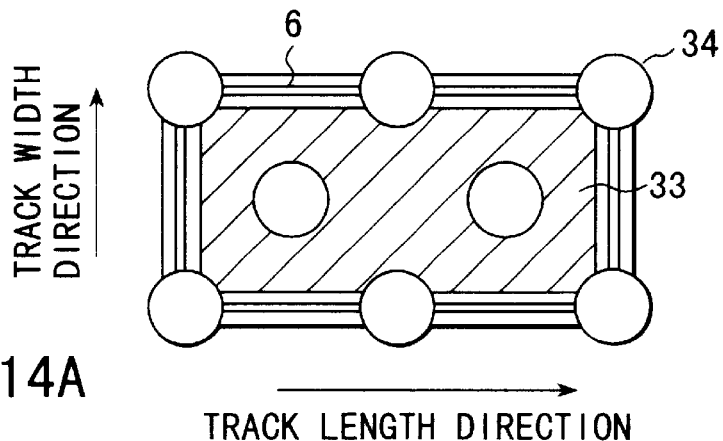
FIG. 14A
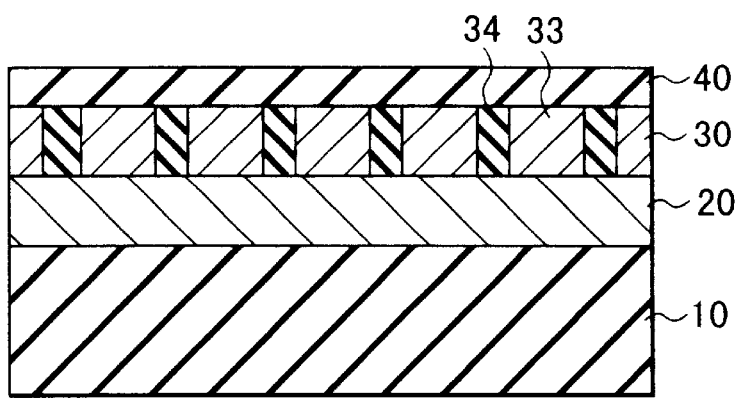
FIG. 14B
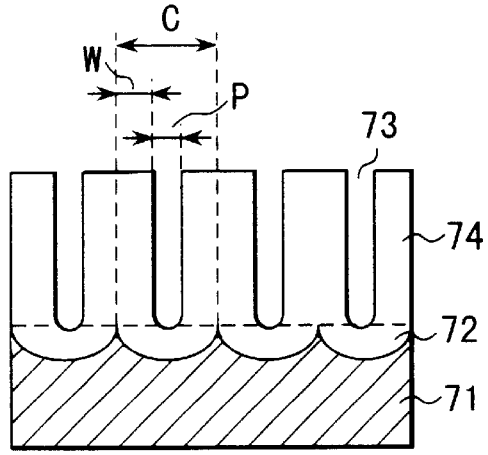
FIG. 15
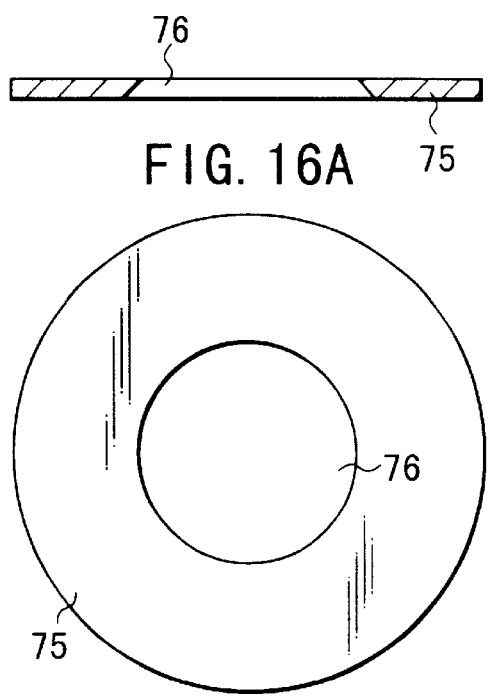
FIG. 16A
FIG. 16B

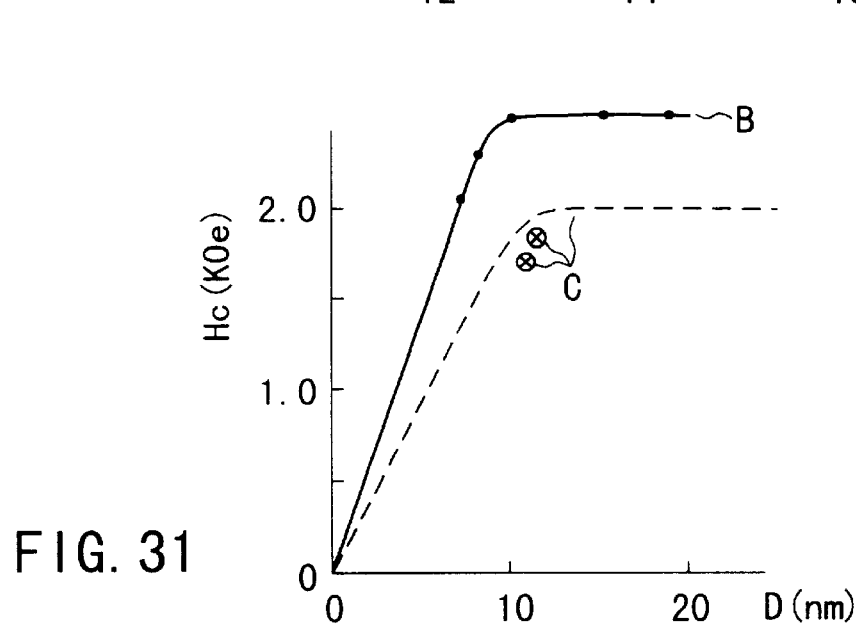
FIG. 30
FIG. 31
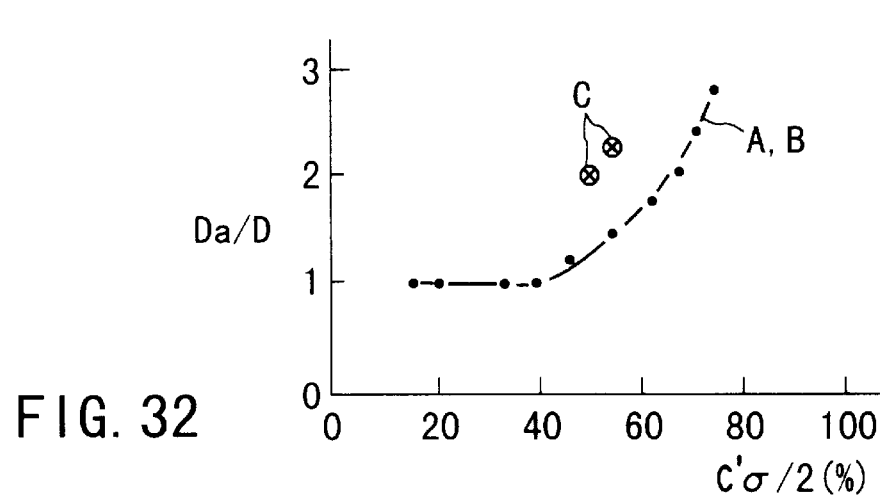
FIG. 32

MAGNETIC RECORDING APPARATUS, MAGNETIC RECORDING MEDIUM AND MANUFACTURING METHOD THEREOF

BACKGROUND OF THE INVENTION

The present invention relates to a magnetic recording apparatus and a magnetic recording medium for magnetically recording and reproducing information and a manufacturing method thereof.

A magnetic recording medium in a form of a rigid magnetic disk apparatus is widely used for a personal data file, a communication server, a large-scale computer file and the like. Also, a magnetic recording medium in a form of a magnetic tape apparatus is widely used for image or audio files for personal use or broadcasting. This is because a magnetic recording medium constituted by an ensemble of magnetic crystal grains shows a very high magnetization reversal rate, and therefore, a very high recording data transfer rate in an order of several hundreds Mbps or more, and also can attain a high recording density of about several tens $Gb/in^2$. As for the magnetic recording medium, a higher transfer rate and a higher recording density are expected in a situation toward forthcoming multimedia era that amount of information continues to increase remarkably.

An areal recording density of the magnetic recording medium, particularly of a hard disk drive (HDD), has been improved by 60% or more per year over the past five years or more, and currently reaches several $Gb/in^2$. Such improvement in areal density is owing to innovation and improvement of various elemental technologies such as use of a magnetoresistive reproducing system, use of a recording magnetic pole material having a high saturation magnetic flux density, improvement in processing of magnetic head of a narrow track width, use of a magnetic head having a narrower gap, miniaturization and high-precision processing of a slider, high-precision servo technology, and development of novel modulation/demodulation technology represented by PRML. In addition, with respect to a magnetic recording medium itself, there is advanced progress in elemental technologies such as smoothing and flattening of medium surface leading to low flying height operation of a magnetic head, reduction in magnetization transition width due to increase in coercivity and decrease in thickness of a magnetic layer, and medium noise reduction due to decrease in exchange interaction between magnetic grains and reduction in magnetic grain size.

In the aforementioned conventional so-called multigrain magnetic recording medium, it is supposed that, if isolation of magnetic grains and reduction in magnetic grain size are advanced to ensure low noise, the recording density will be limited because of thermal disturbance. Hereinafter, the thermal disturbance will be described.

For improvement of a recording density, it is necessary to reduce a recording cell size on a medium, which brings about reduction in signal magnetic field intensity generated from the medium. In order to meet an S/N ratio required for a recording system, noise must be reduced corresponding to reduction in signal intensity. The medium noise is mainly caused by fluctuation of a magnetization transition, and the fluctuation is proportional to a size of a magnetization reversal unit made of magnetic grains. Therefore, in order to reduce the medium noise, it is required to isolate magnetic grains by disrupting exchange interaction between magnetic grains, i.e., to reduce the fluctuation of the magnetization transition to an order of a size of single magnetic grain, and to reduce magnetic grain size.

Magnetic energy that a single isolated magnetic grain has is given by a product of magnetic anisotropy energy density and volume of the grain. To reduce a medium thickness in order to reduce a magnetization transition width and to reduce a magnetic grain size in order to meet a requirement for low noise significantly lowers the volume of magnetic grain, and further significantly lowers magnetic energy of the grain. If the magnetic energy of a certain grain is several hundred times of thermal energy at an operating temperature (at least at room temperature) for a magnetic memory, resistance against thermal disturbance is considered to be sufficient. However, if the magnetic energy of the grain is less than a hundred times of thermal energy, there is possibility that the magnetization direction of the magnetic grain is reversed by thermal disturbance and recorded information is lost. Because of the thermal disturbance, it is thought that the areal density of HDD will be limited to about 40 to 50 $Gb/in^2$.

A conventional multigrain magnetic medium such as CoCr-based medium has a structure in which a Cr-rich non-magnetic grain boundary is segregated between magnetic grains in order to lower exchange coupling between magnetic grains. However, in a method of fabricating a magnetic film by conventional sputtering, diameters of magnetic grains cannot be adjusted directly, and it is difficult to reduce the magnetic grain size uniformly. Thus, there is large distribution in grain diameter and intergranular distance, and grains are arranged irregularly. Therefore, even if exchange interaction between grains is severed to isolate grains, medium noise is not sufficiently lowered, which inhibits improvement in recording density. Specifically, when distribution in grain diameter is expressed by full width at half maximum (FWHM) of distribution of grain diameters, a value of about ±50% is exhibited in a typical medium, and a value of ±25% or more is exhibited even in a medium in which distribution is controlled by low-speed sputtering or the like. For example, a typical medium of 20 nm in average grain diameter has a number of grains between 10 nm and 30 nm. This means that there are considerable grains of less than 10 nm in grain diameter, which are strongly affected by thermal disturbance. Distribution in intergranular distance is more significant: the distribution is ±70% in FWHM in a typical medium, and is ±45% or more even in a well controlled medium. That is, a typical medium of 2 nm in intergranular distance has a number of grains of 0.6 nm to 3.4 nm in intergranular distance. This means that there are considerable grains in an exchange coupled state.

There has been proposed some solutions to overcome the problem of thermal disturbance. One solution is use of a magnetic material with high magnetic anisotropy. However, if the magnetic anisotropy becomes higher, the recording saturation magnetic field required for a medium is increased, and it is required to further increase saturation magnetic flux density of a magnetic pole material for recording head. This cannot be a practical solution because currently available soft magnetic film material, including laboratory level, is hard to meet the above requirements.

Another solution is light thermal assisted recording. In this method, a highly anisotropic magnetic material is employed, and a recording portion is heated by light irradiation during recording. This lowers the anisotropy of magnetic grains and the recording saturation magnetic field, and therefore, recording can be performed with an available recording head. However, this method is impractical because it requires providing an optical system in a drive unit having almost no extra space, including a space between disks. In addition, this method increases power-consumption, and brings about additional heat generation.

As another technical seed to avoid the problem of thermal disturbance for overcoming the HDD recording density limit, there has been proposed a near field optical recording employing SIL or evanescent light. However, optical recording cannot achieve high transfer rate like magnetic recording as long as a heat mode process is employed. On the other hand, there has been proposed a method employing a photon mode material in order to attain a ultrahigh transfer rate and ultrahigh density, but such a method is in a research level and not realized at all.

The foregoing methods cannot give a proper solution to thermal disturbance that prevents higher recording density of magnetic media.

Currently, it is considered that effective methods to solve thermal disturbance are use of a magnetic recording medium in which magnetic particles are arrayed regularly in a non-magnetic matrix (hereinafter, referred to as an ordered magnetic particle medium) and use of a magnetic recording medium in which non-magnetic particles (pores) are arrayed regularly in a continuous magnetic material (hereinafter, referred to as an ordered non-magnetic pore medium).

First, an ordered magnetic particle medium will be described. A magnetic recording medium comprising regularly arrayed magnetic particles is described, for example, in J. Appl. Phys. 76 (10) 6673, 1994. This medium is manufactured by coating an Au seed layer and a resist on an Si wafer, exposing the resist by electron beam (EB) direct write, developing the resist to form pores, and depositing Ni in the pores by plating, thereby forming a regularly arrayed Ni pillar array of 35 nm in diameter with distance of 100 nm. The medium studied in the above paper is directed to magnetic recording application, but there is no particular disclosure on how to use it. In this paper, there is merely suggested that the medium has a pattern with distance of 100 nm, thus making it possible to ensure the recording density of 65 Gb/in$^2$. In this paper, it is assumed that a single magnetic particle is regarded as a minimum recording unit, and there exists a single magnetic particle in a minimum recording cell. However, there is no description on devices such as magnetic head and servo system for performing recording and reproducing using such a small recording unit.

Examples of media comprising regularly arrayed magnetic particles fabricated by using EB direct write are also disclosed in J. Vac. Sci. Technol. B13 (6) 2850, 1995 and J. Vac. Sci. Technol. B12 (6) 3196, 1994. In these papers, although processes for fabricating regularly arrayed magnetic particles other than EB direct write are slightly different from each other, the concept that a single magnetic particle is assumed to be a minimum recording unit is common. In addition, in these papers, there is no description on distribution of magnetic particle diameter and distribution of inter-particle distance.

However, the EB direct write method cannot be used for industrial manufacturing of magnetic media from the viewpoints of cost and productivity, although the method can be employed to fabricate samples at laboratory level. In addition, in the case where a single magnetic particle is used as a minimum recording unit, significant burdens are imposed to improve elemental technologies other than the medium: for example, remarkable reduction in a track width of the recording/reproducing head, remarkable improvement in sensitivity of the reproducing head, remarkable improvement in servo precision or the like. Further, when a single particle constitutes one recording cell, the medium noise is high, and therefore, sufficient S/N ratio cannot be obtained, even if a head with high resolution is used.

Conventionally, an address pattern or a servo pattern in a magnetic medium is formed by a magnetic disk drive manufacturer by magnetically recording the patterns (so-called servo write). A method of forming the address pattern or the servo pattern by thin-film patterning is proposed in J. Appl. Phys. 69 (8) 4724, 1991. However, the medium employed in this paper does not have regularly arrayed magnetic particles.

In Jpn. J. Appl. Phys. 30 (2) 282, 1991 and J. Electrochem. Soc. 122 (1) 32, 1975, methods of manufacturing a magnetic medium by depositing a magnetic material in porous alumite by plating are disclosed. In these methods, however, a matrix is limited to $Al_2O_3$, and a magnetic material is limited to Co, Co—Cr, Co—Ni, Fe—Cu, Fe—P or the like to which plating is applicable.

Next, an ordered non-magnetic pore medium will be described. For example, a medium in which non-magnetic pores are arrayed in a magnetic continuous film, which is referred to as a network medium, is disclosed in IEEE-Trans. Magn. 34 (4), 1609, 1998. This paper relates to noise simulation of an imaginary medium in which non-magnetic pores are arrayed regularly in a multigrain magnetic film. In this paper, there is no description on non-magnetic pore diameter, distribution of inter-pore distance, address pattern, and servo pattern.

BRIEF SUMMARY OF THE INVENTION

An object of the present invention is to provide a magnetic recording apparatus and a magnetic recording medium capable of improving S/N ratio and achieving high density and a manufacturing method thereof.

According to one aspect of the present invention, there is provided a magnetic recording apparatus comprising a magnetic recording medium comprising a magnetic recording layer formed on a substrate, a recording head configured to record information by forming recording cells on recording tracks formed on a surface of the magnetic recording layer, and a reproducing head configured to reproduce information recorded in the recording cells, wherein the magnetic recording layer has a structure that magnetic particles are dispersed in a non-magnetic matrix and ordered particle domains in which magnetic particles are arrayed regularly are formed on a surface thereof, and wherein the size in the track width direction of each ordered particle domain is one fifth or more of a track width of the reproducing head.

According to another aspect of the present invention, there is provided a magnetic recording apparatus comprising a magnetic recording medium comprising a magnetic recording layer formed on a substrate, a recording head configured to record information by forming recording cells on recording tracks formed on a surface of the magnetic recording layer, and a reproducing head configured to reproduce information recorded in the recording cells, wherein the magnetic recording layer has a structure that non-magnetic particles are dispersed in a magnetic matrix and ordered particle domains in which non-magnetic particles are arrayed regularly are formed on a surface thereof, and wherein the size in the track width direction of each ordered particle domain is one fifth or more of a track width of the reproducing head.

A magnetic recording medium according to the present invention comprises a magnetic recording layer formed on a substrate, in which information is recorded by forming recording cells in recording tracks formed on a surface of the magnetic recording layer, wherein the magnetic recording layer has a structure that magnetic particles are dispersed in a non-magnetic matrix and ordered particle domains in which magnetic particles are arrayed regularly are formed on a surface thereof, and wherein the size in the track width direction of each ordered particle domain is one fifth or more of a width of the recording track formed on the recording layer.

Another magnetic recording medium according to the present invention comprises a magnetic recording layer formed on a substrate, in which information is recorded by forming recording cells in recording tracks formed on a surface of the magnetic recording layer, wherein the magnetic recording layer has a structure that non-magnetic particles are dispersed in a magnetic matrix and ordered particle domains in which non-magnetic particles are arrayed regularly are formed on a surface thereof, and wherein the magnetic matrix is constituted by magnetic crystal grains separated from each other with an average distance of 2 nm or less, and wherein an average non-magnetic particle diameter is 1 nm or more.

Another magnetic recording medium according to the present invention comprises a magnetic recording layer formed on a substrate, in which information is recorded by forming recording cells in recording tracks formed on a surface of the magnetic recording layer, wherein the magnetic recording layer has a structure that magnetic particles are dispersed in a non-magnetic matrix, the magnetic particles being arrayed regularly on a surface thereof, and wherein the number of the magnetic particles arrayed along the track length direction in the minimum recording cell is four or more, and wherein the full width at half maximum of distribution of the distance between closest magnetic particles is ±40% or less to an average distance between closest magnetic particles, and wherein the full width at half maximum of distribution of magnetic particle diameter is ±20% or less to an average magnetic particle diameter.

Still another magnetic recording medium according to the present invention comprises a magnetic recording layer formed on a substrate, in which information is recorded by forming recording cells in recording tracks formed on a surface of the magnetic recording layer, wherein the magnetic recording layer has a structure that non-magnetic pores are dispersed in a continuous magnetic film, the non-magnetic pores being arrayed regularly on a surface thereof, and wherein magnetization transitions in the continuous magnetic film are made by domain walls connecting the non-magnetic pores, and wherein an average non-magnetic pore diameter ranges from 0.5 to 3 times of an average domain wall width.

A method of manufacturing a magnetic recording medium according to the present invention comprises steps of forming a block copolymer layer on a non-magnetic layer, making the block copolymer layer to form a sea-island structure by self-organized manner in which the ratio of the etching speed between sea and island is three or more, etching the non-magnetic substrate through the block copolymer layer having the sea-island structure, depositing a magnetic layer in an etched region of the non-magnetic substrate, and lifting-off remaining polymer layer and the magnetic layer on the polymer layer.

Another method of manufacturing a magnetic recording medium according to the present invention comprises steps of forming an underlayer on a substrate, forming a non-magnetic layer on the underlayer, forming a block copolymer layer on the non-magnetic layer, making the block copolymer layer to form a sea-island structure by self-organized manner in which the ratio of the etching speed between sea and island is three or more, etching the non-magnetic layer through the block copolymer layer having the sea-island structure, depositing a magnetic layer in an etched region of the non-magnetic layer, and lifting-off remaining polymer layer and the magnetic layer on the polymer layer.

Another method of manufacturing a magnetic recording medium according to the present invention comprises steps of forming a magnetic layer on a substrate, forming a block copolymer layer on the magnetic layer, making the block copolymer layer to form a sea-island structure by self-organized manner in which the ratio of the etching speed between sea and island is three or more, etching the magnetic layer through the block copolymer layer having the sea-island structure, depositing a non-magnetic layer in an etched region of the magnetic layer, and lifting-off remaining polymer layer and the non-magnetic layer on the polymer layer.

Another method of manufacturing a magnetic recording medium according to the present invention comprises steps of forming a continuous non-magnetic film on a substrate, putting a self-organized mask having regularly arrayed holes on the continuous non-magnetic film, etching the continuous non-magnetic film through the mask, thereby forming regularly arrayed holes in the continuous non-magnetic film, and depositing a magnetic material in the holes formed in the continuous non-magnetic film, thereby forming magnetic particles.

Another method of manufacturing a magnetic recording medium according to the present invention comprises steps of, forming a continuous magnetic film on a substrate, forming a resist layer on the continuous magnetic film, putting a self-organized mask having regularly arrayed holes on the continuous magnetic film, exposing the resist layer through the mask and developing the resist layer, thereby forming a resist pattern having remaining regions corresponding to the holes, etching the continuous magnetic film through the resist pattern, thereby forming magnetic particles, and depositing a non-magnetic film in a region between the magnetic particles.

Still another method of manufacturing a magnetic recording medium according to the present invention comprises steps of forming a continuous magnetic film on a substrate, putting a self-organized mask having regularly arrayed holes on the continuous magnetic film, etching the continuous magnetic film through the mask, thereby forming regularly arrayed holes in the continuous magnetic film, and depositing a non-magnetic material in the holes formed in the continuous magnetic film, thereby forming non-magnetic pores.

BRIEF DESCRIPTION OF THE SEVERAL VIEWS OF THE DRAWING

FIG. 14A is a plan view showing an example of an ordered non-magnetic pore medium according to the present invention; FIG. 14B is a cross sectional view thereof;

FIG. 15 is a cross sectional view showing an example of an anodized barrier layer and a porous alumite according to the present invention;

FIG. 16A is a cross sectional view showing a metal ring according to the present invention; and FIG. 16B is a plan view thereof;

FIG. 30 is a graph showing an evaluation result of an ordered magnetic particle medium in an Example of the present invention;

FIG. 31 is a graph showing an evaluation result of an ordered magnetic particle medium in an Example of the present invention;

FIG. 32 is a graph showing an evaluation result of an ordered magnetic particle medium in an Example of the present invention;

DETAILED DESCRIPTION OF THE INVENTION

Hereinafter, the present invention will be described in detail with reference to the accompanying drawings.

Figure 1:
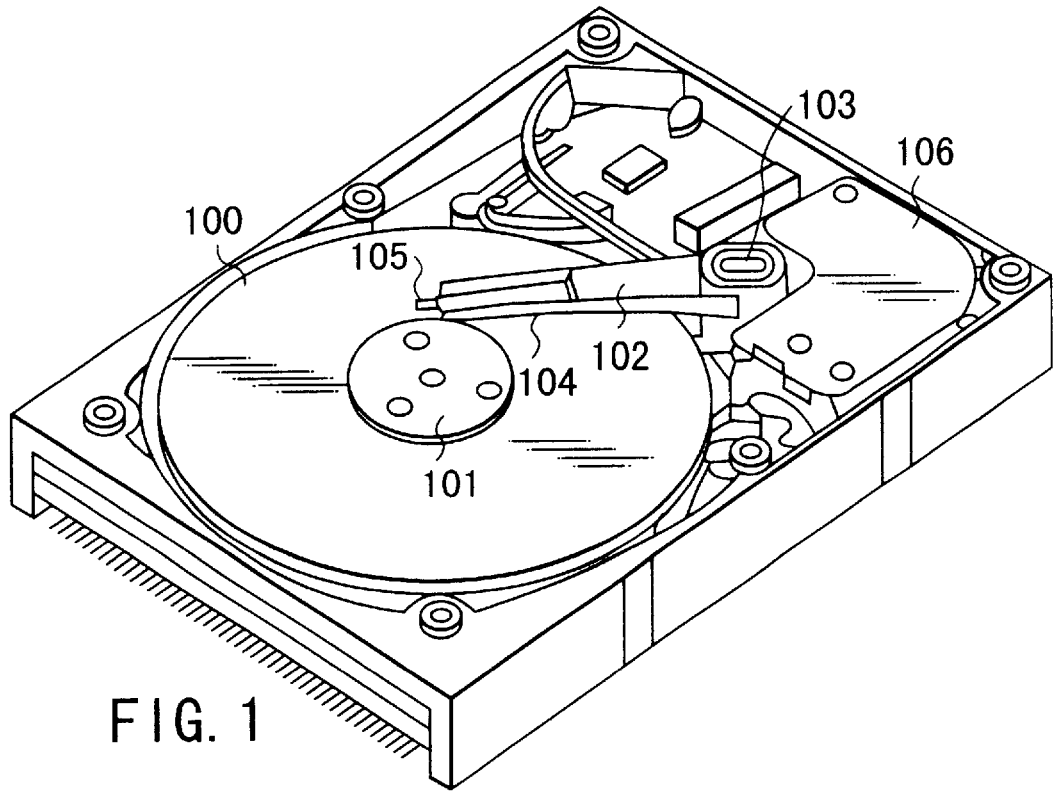
FIG. 1 is a perspective view showing an example of a magnetic recording apparatus of the present invention.

FIG. 1 is a perspective view showing an example of a magnetic recording apparatus. A magnetic disk 100 is fixed to a spindle 101 and is rotated by a motor (not shown) in response to control signals from a motor controller (not shown). A pivot 103 supports an actuator arm 102, which supports a suspension 104 and a head slider 105 disposed on the distal end of the suspension 104. When the disk 100 is rotated, the slider 105 glides over the disk 100 with a predetermined spacing between the air-bearing surface of the slider 105 and the disk 100, thus recording and reproducing are performed. A voice coil motor 106, which is a kind of linear motor, is installed at a proximal side of the actuator arm 102. The voice coil motor 106 is constituted by a driving coil (not shown) wound around a bobbin part of the actuator arm 102 and a magnetic circuit comprising a permanent magnet and a yoke which are disposed so as to sandwich the driving coil. The actuator arm 102 is supported by ball bearings (not shown) installed in upper and lower portions of the pivot 103, and is rotated by the voice coil motor.

A magnetic recording medium such as the magnetic disk 100 shown in FIG. 1 has a structure that a magnetic recording layer is formed on a substrate. An underlayer (seed layer) may be formed between the substrate and the magnetic recording layer. A protective layer may be formed on the magnetic recording layer. Tracks are formed on a surface of magnetic recording layer, and recording cells are formed in the tracks, thus information is recorded.

Figure 2:
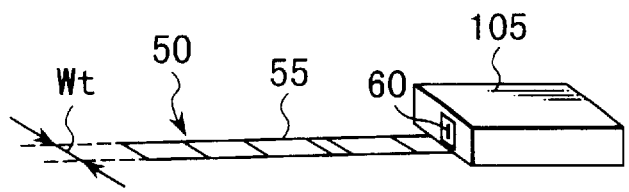
FIG. 2 is a perspective view showing a track and recording/reproducing head in a magnetic recording apparatus of the present invention.

FIG. 2 schematically shows a positional relationship between the magnetic recording layer and a recording/ reproducing head in the magnetic recording apparatus according to the present invention. FIG. 2 shows a track 50 formed on a part of the disk 100. The track 50 has a track width Wt. A recording/reproducing head 60 is formed on a distal end portion of the head slider 105. The head slider 105 glides over the disk 100 with a predetermined spacing, thus the recording/ reproducing head 60 moves relative to the disk 100. An array of recording cells (recording magnetic domains) is formed in the track 50 by magnetic field generated from the recording head, thus information is recorded. On the other hand, the reproducing head scans the recording cells 55 formed in the track 50, thus recorded information is reproduced.

Figure 3:
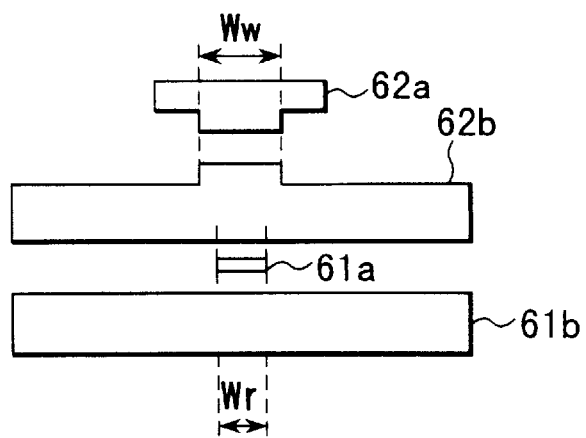
FIG. 3 is a plan view showing track widths of a recording head and a reproducing head.

FIG. 3 shows a relationship between track widths of the reproducing head and the recording head. In FIG. 3, numerals 61a and 61b denote magnetic poles of the reproducing head, and numerals 62a and 62b denote magnetic poles of the recording head. As shown in FIG. 3, the track width of the reproducing head is narrower than the track width of the recording head. The constitution shown in FIG. 3 is adopted for preventing reproducing signals from being affected by disorder of the recorded magnetic domain on edges of the track.

Figure 4:
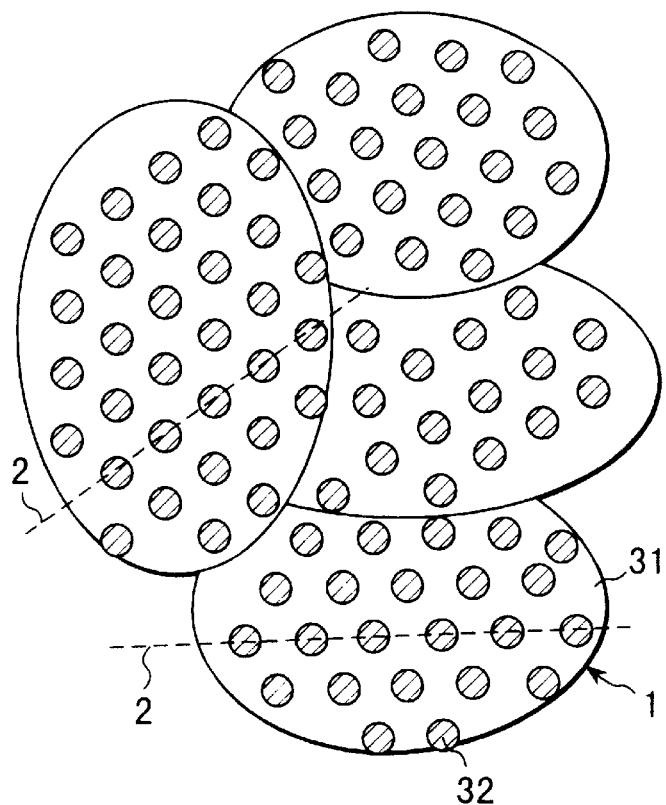
FIG. 4 is a schematic plan view showing an example of a magnetic recording medium of the present invention.

FIG. 4 is a plan view showing an example of a magnetic recording medium of the present invention. The magnetic recording layer constituting the magnetic recording medium has a structure in which magnetic particles 32 are dispersed in a non-magnetic matrix 31. On the surface of the magnetic recording layer, ordered particle domains 1 in which the magnetic particles 32 are arrayed regularly in the non-magnetic matrix 31 are formed. The magnetic particles 32 are arrayed along an array axis 2 in each ordered particle domain 1. When the magnetic particles 31 are arrayed so as to form triangle lattice, three arrangement axes 2 exist in every ordered particle domain 1. Three or more magnetic particles 32 are arrayed on one array axis 2.

In the magnetic recording medium according to the present invention shown in FIG. 4, a size in a track width direction of each ordered particle domain 1 is one fifth or more of a width of a recording track formed on the recording layer. In the magnetic recording apparatus according to the present invention using the medium shown in FIG. 4, a size in a track width direction of each ordered particle domain 1 is one fifth or more of a track width of reproducing head thereof.

A magnetic material having large saturation magnetization Is and having large magnetic anisotropy is suitable for forming the magnetic particles 32. Such a magnetic material comprising a metal or an alloy selected from the group consisting of, for example, Co, Pt, Sm, Fe, Ni, Cr, Mn, Bi and Al, and alloys thereof. Among these magnetic metal materials, a Co-based alloy with high crystalline magnetic anisotropy, in particular, CoPt, SmCo, and CoCr-based alloys are more preferable. Specifically, the magnetic material includes Co—Cr, Co—Pt, Co—Cr—Ta, Co—Cr—Pt, Co—Cr—Ta—Pt, Co, Fe or the like. In addition to these metals, the magnetic material can be widely selected from among Co-based alloy, rare earth-transition metal alloy, regular alloy, magnetic oxide or the like such as Tb—Fe, Tb—Fe—Co, Tb—Co, Gd—Tb—Fe—Co, Gd—Dy—Fe—Co, Nd—Fe—Co, Nd—Tb—Fe—Co, PtMnSb, FePt, Co ferrite, Ba ferrite or the like. For the purpose of controlling magnetic characteristics such as saturation magnetization or coercivity, at least one element selected from Fe and Ni may be further alloyed in addition to the above magnetic material. In addition, to these metals or alloys, there may be added an additive for improving magnetic characteristics, for example, Cr, Nb, V, Ta, Ti, W, Hf, Cr, V, In, Si, B and the like or a compound with at least one element selected from among these elements and oxygen, nitrogen, carbon, and hydrogen.

A non-magnetic material used for the non-magnetic matrix includes a compound expressed by the general formula M-G or a carbon atom, organic material and the like. Here, M is at least one element selected from the group consisting of Si, Al, Zr, Ti, Ta, In, Sn, and B; and G is at least one element selected from the group consisting of oxygen, nitrogen, and carbon. Specifically, it can be widely selected from among oxide, nitride, carbide, borate, and organic materials such as C, Si—O, Al—O, Zr—O, Ti—O, Ta—O, In—O, Si—N, Al—N, Zr—N, Ti—N, Ta—N, In—N, B—N, Si—C, Ti—C, B—C, SiAl—ON, Si—ON, AlTi—OC, In—Sn—O, or Teflon. Of course, a non-magnetic element (including such an element that becomes non-magnetic in additive state, although it constitutes a magnetic material in a bulk having a particular crystal structure) may be further added to these matrix. In this case, the additive element may form a solid solution with the matrix or may be in a phase separated state. The additive element may exist as fine particles in the matrix material.

A shape of the ordered particle domain 1 may be any shape. A boundary between ordered particle domains 1 may be a transient region, i.e., a region in which an array axis is disordered. Degree of arrangement of magnetic particles 32 in the ordered particle domains 1 may include a certain degree of disorder that, for example, the array axis 2 does not always pass through a center of the magnetic particle 32. The degree of arrangement required for the present invention may be such that at least local spots can be observed by spatial FFT analysis.

The magnetic anisotropy that the magnetic recording medium material has may be in in-plane direction or may be in perpendicular direction. A longitudinal medium is preferred in the case where a current recording/reproducing system is used as is. A perpendicular medium has an advantage that a problem of thermal fluctuation because magnetic anisotropy energy increases due to increase in a volume of the magnetic particle.

It has been reported that, in a medium having regularly arrayed magnetic particles, problem of noise and jitters coming from a magnetization transition or side writing occurs more infrequently than a conventional medium having randomly arranged magnetic particles (R. White: Data Storage, September 1997, page 55). However, the medium examined in this paper is one that magnetic particles are coherently arrayed within entire surface of a disk. Such a medium cannot be prepared unless patterning by electron beam direct write is used.

A magnetic recording medium having regularly arrayed magnetic particles of the present invention is prepared by utilizing, for example, self-organizing phenomenon of a block copolymer as described later. When the self-organizing phenomenon on the block copolymer is utilized, it is generally difficult to obtain a magnetic recording medium in which magnetic particles are arrayed in a same direction over a wide area. This is because there exist disturbance factors such as impurities, dust, and substrate defect. As a result of presence of such disturbance factors, a plurality of ordered particle domains in which magnetic particles are arrayed regularly are formed on the surface of the medium, and the array directions of the ordered particle domains are different from each other.

In the magnetic recording apparatus and magnetic recording medium according to the present invention, a size in a track width direction of each ordered particle domain 1 is 1/5 or more of a track width of reproducing head or 1/5 or more of a track width formed on the magnetic recording layer. The present inventors experimentally found that, in the medium of the present invention having an above constitution, an error rate estimated under predetermined conditions is reduced to 90% relative to a conventional medium having randomly arranged magnetic grains.

In the magnetic recording medium of the present invention shown in FIG. 4, it is preferable that the size in the track width direction of each ordered particle domain is 3 times or more of the track width formed on the magnetic recording layer. The present inventors experimentally found that, if each ordered particle domain has such a size as described above, medium noise in a recorded state with a single frequency is reduced to 90% relative to the conventional medium having randomly arranged magnetic grains. Further, the inventors found that medium noise is further reduced as the size in the track width direction of the ordered particle domain increases. Medium noise reduction brings about improvement in S/N ratio, thus making it possible to obtain a magnetic recording medium whose recording density is improved than a random magnetic grain medium free from thermal fluctuation. However, when the size in the track width direction of the ordered particle domain is larger than the track width, fluctuation of transition width is constant in an ordered particle domain, but is different between ordered particle domains from each other. Influence from the latter state tends to appear as transition jitters.

Note that, a permissible error rate remarkably depends on various characteristics such as an encoding method of a system intended to apply the medium. Therefore, the size in the track width direction of the ordered particle domain should be appropriately designed within a range of 1/5 or more of the track width with taking medium noise and error rate required for the system into consideration.

In the magnetic recording medium of the present invention, it is preferable that an average diameter of magnetic particles 32 is 2 nm or more and an average distance between magnetic particles is 1 nm or more. If the diameter of the magnetic particle 32 is smaller than 2 nm, it is difficult to maintain a stable magnetization state in view of magnetic anisotropic energy actually obtained. Unless the average distance between the magnetic particles 32 is 1 nm or more, magnetization reversal is caused by adjacent magnetic particles through exchange interaction, and thus, an effect of arrangement of the magnetic particles 32 cannot be achieved. When the magnetic particle 32 has a microstructure that a non-magnetic shell is formed around its periphery, the thickness of the shell is included in a distance between magnetic particles 32.

Figure 5:
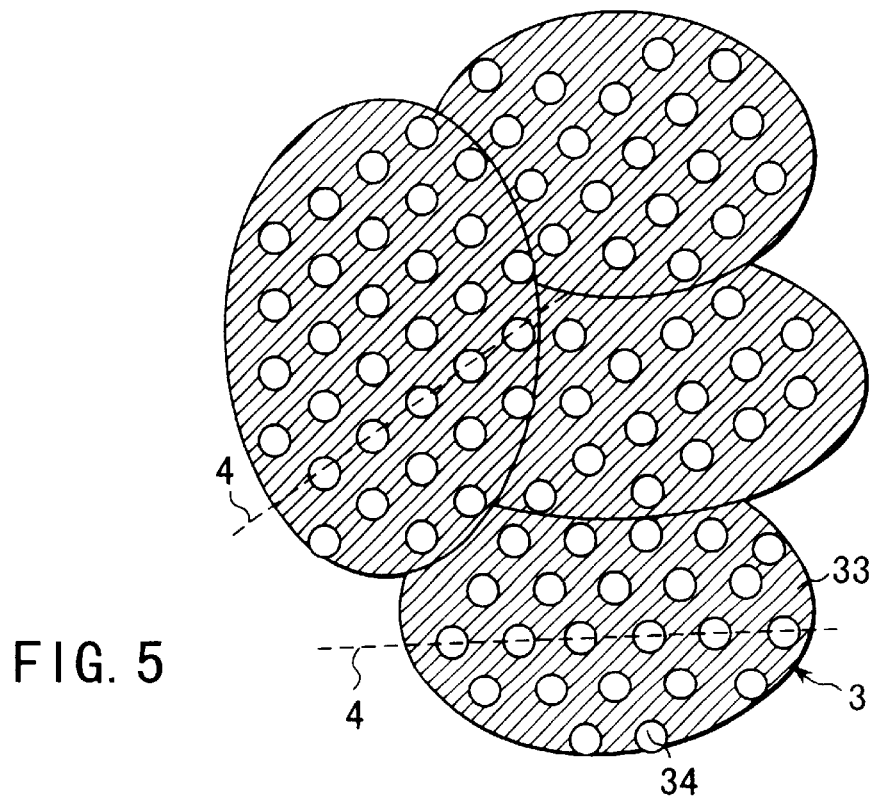
FIG. 5 is a schematic plan view showing another example of the magnetic recording medium of the present invention.

FIG. 5 is a plan view showing another example of a magnetic recording medium of the present invention. A magnetic recording layer constituting the magnetic recording medium has a structure in which non-magnetic particles 34 are dispersed in a magnetic matrix 33. The magnetic matrix 33 contains magnetic crystal grains. Orientation directions of the magnetic crystal grains in the magnetic matrix 33 may be different from each other. On the surface of the magnetic recording layer, ordered particle domains 3 in which the non-magnetic particles 34 are arrayed regularly in the magnetic matrix 33 are formed. The magnetic particles 32 are arrayed along an array axis 4 in each ordered particle domain 3. When the non-magnetic particles 34 are arrayed so as to form triangle lattice, three arrangement axes 4 exist in every ordered particle domain 3. Three or more non-magnetic particles 34 are arrayed on one array axis 4.

In the magnetic recording medium of the present invention, an average distance between magnetic crystal grains constituting the magnetic matrix 33 is 2 nm or less, and an average diameter of the non-magnetic particles 34 is 1 nm or more. The magnetic crystal grains constituting the magnetic matrix 33 affect exchange interaction to each other because the average distance between them is 2 nm or less. On the other hand, the non-magnetic particles 34 having an average diameter of 1 nm or more sever or sufficiently weaken the exchange interaction between the magnetic crystal grains. Thus, domain walls, formed by a recording operation in the magnetic matrix 33, are pinned at the positions of non-magnetic particles 34. Therefore, distortion in a shape of a reversed magnetic domain is reduced, which brings about reduction in medium noise.

A material forming the magnetic matrix 33 is similar to that forming the magnetic particles 32 shown in FIG. 4. A material forming the non-magnetic particles 34 is similar to that forming the non-magnetic matrix 33 shown in FIG. 4. A shape of the ordered particle domain 3 may be any shape. A transient region having a certain size may be formed at boundary between ordered particle domains 3. Degree of arrangement of non-magnetic particles 34 in the ordered particle domains 3 may include a certain degree of disorder that, for example, the array axis 4 does not always pass through a center of the non-magnetic particle 34. The degree of arrangement required for the present invention may be such that at least local spots can be observed by spatial FFT analysis. The magnetic anisotropy that the magnetic matrix 33 has may be in in-plane direction or may be in perpendicular direction. A longitudinal medium is preferred in the case where a current recording/reproducing system is used as is. A perpendicular medium has an advantage that high-density recording can be performed because demagnetizing field acts so as to help formation of reversed magnetic domain.

A process for orderly arranging the non-magnetic particles 34 in the medium shown in FIG. 5 employs a self-organizing phenomenon of a block copolymer described later, as in the process for arrangement of the magnetic particles 32 of the medium shown in FIG. 4. Therefore, as described previously, a plurality of ordered particle domains are formed.

It is preferable, in the magnetic recording medium according to the present invention shown in FIG. 5, that a size in a track width direction of each ordered particle domain 3 is 1/5 or more of a track width formed on the magnetic recording layer. Also, It is preferable, in the magnetic recording apparatus according to the present invention using the medium shown in FIG. 5, that a size in a track width direction of each ordered particle domain 3 is 1/5 or more of a track width of reproducing head thereof. The present inventors experimentally found that, in the medium of the present invention having an above constitution, an error rate estimated under predetermined conditions is reduced to 90% relative to a conventional medium having randomly arranged magnetic grains. In the medium shown in FIG. 5, domain walls are pinned at non-magnetic particles 34, and, as a result of this, the shape of the domain walls become substantially linear. Thus, the medium shown in FIG. 5 also forms recording cells having almost same shape as that formed in the medium shown in FIG. 4 having regularly arrayed magnetic particles 32. Therefore, it is assumed that the medium shown in FIG. 5 shows similar results like the medium shown in FIG. 4.

It is preferable, in the magnetic recording medium of the present invention shown in FIG. 5 that a size in a track width direction of each ordered particle domain 3 is three times or more of the track width formed on the magnetic recording layer from the viewpoint of reducing media noise.

It is preferable, in the magnetic recording medium of the present invention shown in FIG. 5, that an average distance between non-magnetic particles 34 is equal to or smaller than a track width formed on the magnetic recording layer. It is preferable, in the magnetic recording apparatus of the present invention using the medium shown in FIG. 5, that an average distance between non-magnetic particles 34 is equal to or smaller than a track width of recording head thereof. If the average distance between the non-magnetic particles 34 does not meet above conditions, a domain wall pinned by non-magnetic particles 34 is formed across the track width. This arises interference between tracks, which becomes a cause to make medium noise high.

Next, cross sectional structures of the magnetic recording media according to the present invention will be described with reference to FIGS. 6 to 11. In these figures, a magnetic portion 35 may be the magnetic particles in FIG. 4 or the magnetic matrix in FIG. 5. Likewise, a non-magnetic portion 36 may be the non-magnetic matrix in FIG. 4 or the non-magnetic particles in FIG. 5.

Figure 6:
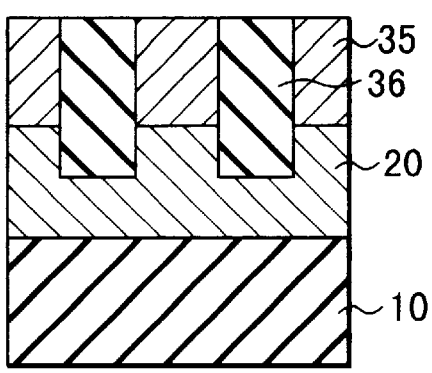
FIG. 6 is a cross sectional view showing an example of the magnetic recording medium of the present invention.

FIG. 6 is a sectional view showing an embodiment of a magnetic recording medium of the present invention. In FIG. 6, an underlayer 20 is formed on a substrate 10, and a magnetic portion 35 and non-magnetic portion 36 constituting a magnetic recording layer are formed on the underlayer 20. The underlayer 20 may be of multilayered structure. In FIG. 6, the thickness of the underlayer 20 under the magnetic portion 35 is greater than that under non-magnetic portion 36.

As a material for the substrate 10, a metal, glass, or ceramics can be employed.

The underlayer 20 may consist of a magnetic material or non-magnetic material. For a multilayered underlayer, plural magnetic materials and/or non-magnetic materials are employed. The thickness of the underlayer 20 is about 10 nm to 1000 nm. If the thickness is less than 10 nm, the underlayer 20 does not function properly. On the other hand, if the thickness exceeds 1000 nm, it takes long to form the underlayer 20, which is not applicable to mass-production.

The underlayer 20 consisting of a magnetic material is magnetically coupled through exchange interaction or magnetostatic interaction with recording cells in the magnetic recording layer or a recording/reproducing head. An underlayer formed so as to be exchange coupled with the recording cells includes a magnetic underlayer likely to be reversed which serves to stabilize recording cells, and a magnetic underlayer having a large magnetization that serves to improve reproducing output.

An underlayer 20 consisting of a non-magnetic material is employed for the purpose of controlling a crystal structure of a magnetic portion 35 or non-magnetic portion 36, or for the purpose of preventing mixing of impurities from the substrate 10. For example, if an underlayer 20 having a lattice constant close to that of the magnetic portion 35 of desired crystal orientation is employed, it is possible to control a crystal structure of the magnetic portion 35. If an amorphous underlayer 20 having certain surface energy is employed, it is possible to control crystalline or amorphous properties of the magnetic portion 35 or non-magnetic portion 36. For the purpose of preventing mixing of impurities from the substrate 10, a thin film with small lattice constant or a dense thin film may be employed as an underlayer 20.

The underlayer 20 consisting of a magnetic material or a non-magnetic material may have a plurality of aforementioned functions. For example, a magnetic underlayer 20 for controlling crystallinitys of the magnetic portion 35 may be provided. In this case, the underlayer 20 gives both effects on recording/reproducing characteristics and on crystalline properties, and thus it is more preferable than an underlayer having a single function. Such an underlayer 20 exhibits above functions includes one consisting of, for example, amorphous CoZrNb.

The underlayer 20 may be a modified layer formed by modifying the surface of the substrate 10 using ion plating, doping in atmospheric gas, neutron beam irradiation or the like. Such an underlayer is preferable for preparing a medium because a process of depositing a thin film can be eliminated.

A conventional magnetic recording medium is often prepared by depositing a CoCr-based magnetic layer on an underlayer consisting of Cr-based non-magnetic alloy. In this case, an interface layer is likely to be formed between the underlayer and the magnetic layer, the interface layer containing elements diffused from both the underlayer and the magnetic layer. When the magnetic recording medium of the present invention is prepared with a material system of the underlayer and the magnetic layer which is likely to form an interface layer, the interface layer spreads not only under the magnetic portion 35 but also under the non-magnetic portion 36, which makes obscure the boundary of these portions. In addition, atoms mutually diffuse between the interface layer between the non-magnetic portion 36 and the underlayer 20 and the magnetic portion 35, a composition of the boundary portion between the magnetic portion 35 and the non-magnetic portion 36 may be different from that of the center of the magnetic portion 35.

To avoid such situation, it is preferable to make the thickness of the underlayer 20 immediately under the magnetic portion 35 thicker than that of the underlayer immediately under the non-magnetic portion 36. Such a constitution suppresses diffusion of atoms between interface layers under the magnetic portion 35 and under the non-magnetic portion 36. In addition, it makes possible for the non-magnetic portion 36 to employ such a non-magnetic material that forms a more active interface layer than that formed under the magnetic portion 35. This brings about an effect that a range of material selection can be widened.

A difference in thickness of the underlayer 20 shown in FIG. 6 which exhibits above effect may be 0.5 nm or more, although it depends on the thickness of the interface layer. There is no particular restriction to an upper limit of the above difference in thickness, but the difference is preferably 20 nm or less considering preparation of the medium and the thickness of the underlayer 20.

Figure 7:
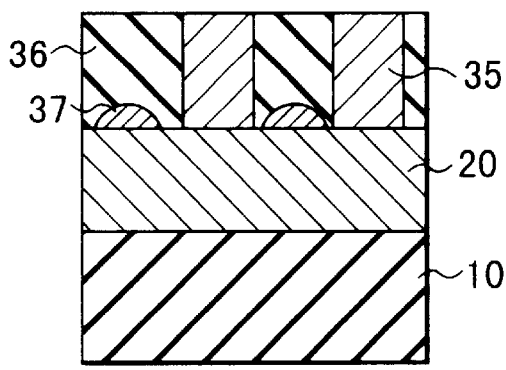
FIG. 7 is a cross sectional view showing another example of the magnetic recording medium of the present invention.

FIG. 7 is a sectional view showing another embodiment of the magnetic recording medium of the present invention. In FIG. 7, an underlayer 20 is formed on a substrate 10, and a magnetic portion 35 and a non-magnetic portion 36 constituting a magnetic recording layer are formed on the underlayer 20. An interface layer 37 comprising at least one of elements constituting the magnetic portion 35 is provided between a part of the non-magnetic portion 36 and the underlayer 20.

In general, if magnetic or non-magnetic impurity atoms diffuse from the underlayer 20 and enter the magnetic portion 35, magnetic characteristics of the magnetic portion 35 vary on the side of the underlayer 20. It is not preferable for magnetic recording medium, from the viewpoint of performing stable recording/ reproducing, that magnetic characteristics differ between a portion on the side of the underlayer 20 and other portion, in particular, a portion on the surface side facing the magnetic recording head. On the other hand, the non-magnetic portion 36 constituting the magnetic recording medium of the present invention functions enough if only it meets a requirement not to produce disorder in magnetostatic energy distribution by severing exchange interaction between the magnetic portions 35 or by partly converting into a magnetic material. Even if a magnetic or non-magnetic impurity atoms diffuse from the underlayer 20 and enter the non-magnetic portion 36, their influence to the non-magnetic portion 36 is little. When the interface layer 37, comprising at least one element constituting the magnetic portion 35, is formed between the non-magnetic portion 36 and the underlayer 20, atomic diffusion from the underlayer 20 to the interface layer 37 is caused. This makes it possible to suppress atomic diffusion from the underlayer 20 to the magnetic portion 35. As a result, the problem that magnetic characteristics of the magnetic portion 35 differ between the side of the underlayer 20 and the surface side can be solved. In addition, adhesiveness between the non-magnetic portion 36 and the underlayer 20 is improved by forming the interface layer 37, which prevents the non-magnetic portion 36 from being peeled off from the underlayer 20. A magnetic head glides over the magnetic recording medium with a very small spacing of sub-micrometer. Therefore, even if peeling-off of the non-magnetic portion 36 partially occurs, a magnetic recording system does not operate well.

There is no particular restriction to an area of the interface layer 37 viewed from the medium face.

However, the area of the interface layer 37 is preferably 0.5% or more of that of the non-magnetic portions 36. By providing such area, an effective action of the interface layer 37 can be expected. A material constituting the interface layer 37 is magnetic or non-magnetic element, or a mixture thereof. In a range free of influence upon the above effect, the interface layer 37 may or may not be in contact with the magnetic portions 35. As the interface layer 37 shown in FIG. 7 is effective enough if only it is subjected to mixing at the interface, an average thickness of the interface layer 37 is preferably 5 nm or less.

Figure 8:
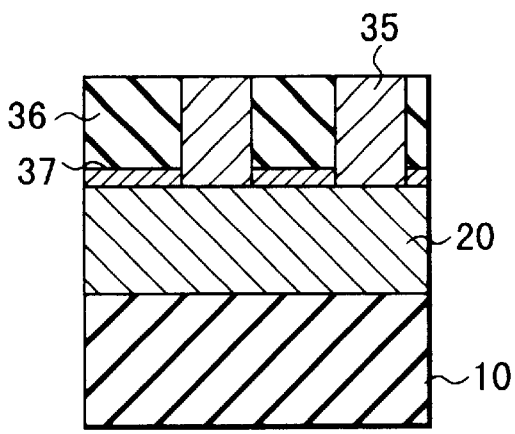
FIG. 8 is a cross sectional view showing another example of the magnetic recording medium of the present invention.

FIG. 8 is a sectional view showing another embodiment of the magnetic recording medium of the present invention having the aforementioned interface layer 37. In this figure, the interface layer 37 connects the magnetic portions 35. Such interface layer 37 functions to further reduce the influence of atomic diffusion from the underlayer 20 to the magnetic portion 35 and to further improve adhesiveness between the underlayer 20 and the non-magnetic portion 36. In addition, because the magnetic portions 35 are connected with each other through the interface layer 37, it is considered that the magnetic portions 35 continuously exist on the underlayer 20. Therefore, the crystalline structure of the magnetic portions 35 can be adjusted more easily by the underlayer 20.

The interface layer 37 may have a composition substantially similar to the magnetic portion 35.

Since the interface layer 37 is as thin as 5 nm or less, it turns to a non-magnetic material by a superparamagnetic effect when exchange interaction between magnetic crystal grains constituting the interface layer 37 is sufficiently low, even if it has a composition substantially similar to the magnetic portion 35. In addition, since the interface layer 37 is as thin as 5 nm or less, the interface layer 37 almost exists on the underlayer 20, which prevents an adverse influence by exchange coupling between the magnetic materials.

Whether the interface layer 37 forms a structure of FIG. 7 or FIG. 8 should be selected according to materials of the underlayer 20, magnetic portion 35, and non-magnetic portion 36 with taking above effects into consideration.

Figure 9:
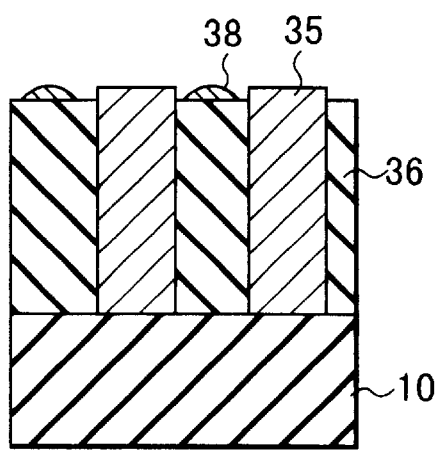
FIG. 9 is a cross sectional view showing another example of the magnetic recording medium of the present invention.

FIG. 9 is a sectional view showing another embodiment of the magnetic recording medium of the present invention. In FIG. 9, a magnetic portion 35 and a non-magnetic portion 36 constituting a magnetic recording layer is formed on a substrate 10. On a part of the non-magnetic portion 36, an interface layer 38 comprising at least one element constituting the magnetic portion 35 is formed. An underlayer may be formed between the substrate 10 and magnetic and non-magnetic portions 35, 36. Materials of the substrate 10 and the underlayer are similar to those employed in the recording medium shown in FIG. 6.

In the magnetic recording medium, since a protective layer is generally formed on the magnetic recording layer, adhesiveness of the protective layer to the magnetic recording layer is important. Even in the case where the protective layer is not employed, a lubricant layer is formed on the magnetic recording layer. Therefore, adhesiveness and wettability of the lubricant layer to the magnetic recording layer becomes important.

By forming the interface layer 38 comprising at least one element constituting the magnetic portion 35 the non-magnetic portion 36, it makes possible to improve the adhesiveness between the non-magnetic portion 36 and the protective layer. In addition, by forming such interface layer 38, it suffices to select a protective layer having appropriate adhesiveness and protection performance for only the magnetic portion 35, which is preferable in view of a variety of material selection, mass-productivity, and cost. The interface layer 38 shown in FIG. 9 preferably has an average thickness of 5 nm or less.

Figure 10:
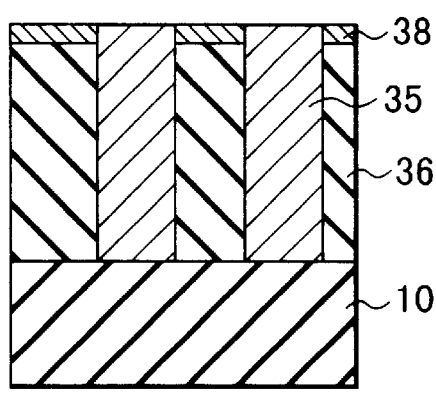
FIG. 10 is a cross sectional view showing another example of the magnetic recording medium of the present invention.

FIG. 10 is a sectional view showing another embodiment of the magnetic recording medium of the present invention. In this figure, an interface layer 38 connecting the magnetic portions 35 is formed on the non-magnetic portion 36. When such interface layer 38 is formed, it makes possible to improve adhesiveness between the non-magnetic portion 36 and a protective layer. In addition, because the magnetic portions 35 are connected with each other through the interface layer 38, it is considered that the magnetic portions 35 continuously exist on the non-magnetic portion 36. Therefore, it makes possible to improve adhesiveness of the protective layer. The interface layer 38 may have a composition substantially similar to the magnetic portion 35.

The interface layer 37 may have a composition substantially similar to the magnetic portion 35. Since the interface layer 37 is as thin as 5 nm or less, it turns to a non-magnetic material by a superparamagnetic effect when exchange interaction between magnetic crystal grains constituting the interface layer 37 is sufficiently low, even if it has a composition substantially similar to the magnetic portion 35. In addition, since the interface layer 37 is as thin as 5 nm or less, the interface layer 37 almost exists on the non-magnetic layer 36, which prevents an adverse influence by exchange coupling between the magnetic materials.

Whether the interface layer 38 forms a structure of FIG. 9 or FIG. 10 should be selected according to materials of the underlayer 20, magnetic portion 35, and non-magnetic portion 36 with taking above effects into consideration.

Figure 11:
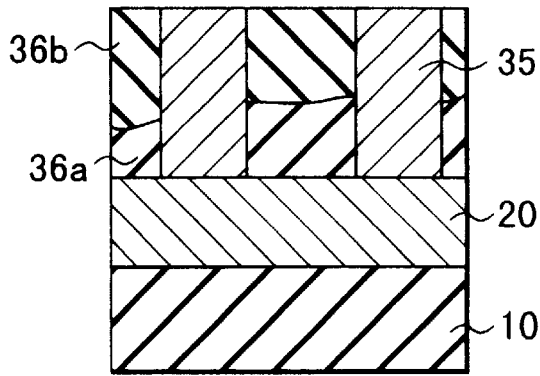
FIG. 11 is a cross sectional view showing still another example of the magnetic recording medium of the present invention.

FIG. 11 is a sectional view showing still another embodiment of the magnetic recording medium of the present invention. In FIG. 11, an underlayer 20 is formed on a substrate 10, and a magnetic portion 35 and a non-magnetic portion 36 constituting a magnetic recording layer are formed on the underlayer 20. In FIG. 11, the non-magnetic portion 36 consists of an initial layer 36a being in contact with the underlayer 20 and a growth layer 36b on the initial layer 36a.

Since a magnetic material and a non-magnetic material generally differ to each other in mechanical properties such as thermal expansion coefficient, strain is likely to generate in a region where the two materials are in contact. When strain is generated in the contact region between the magnetic material and the non-magnetic material, it brings about problems such as propagation of crack into the magnetic recording layer, and deterioration and peeling-off of the magnetic recording layer. If the non-magnetic portion 36 is formed of the initial layer 36a and the growth layer 36b, a boundary region between the two layers 36a and 36b serves as a buffer region against the strain, thereby reducing influence of the strain. It suffices for this purpose if only the boundary region between the initial layer 36a and the growth layer 36b is formed, and therefore, there is no specific restriction with respect to the thickness of these layers. Similar effect is obtainable when the magnetic portion is formed of an initial layer and a growth layer.

As for the ordered particle domains in the magnetic recording medium of the present invention, it is preferable that a full width at half maximum of distribution of an angle formed between an array axis of each ordered particle domain and a track length direction is set to 40 degrees or less.

The array axis means the closest array axis to the track length direction, among the arrangement axes 2 along which magnetic particles 32 are arrayed in the ordered particle domains 1 shown in FIG. 4 or the arrangement axes 4 along which non-magnetic particles 34 are arrayed in the ordered particle domains 3 shown in FIG. 5.

Figure 12:
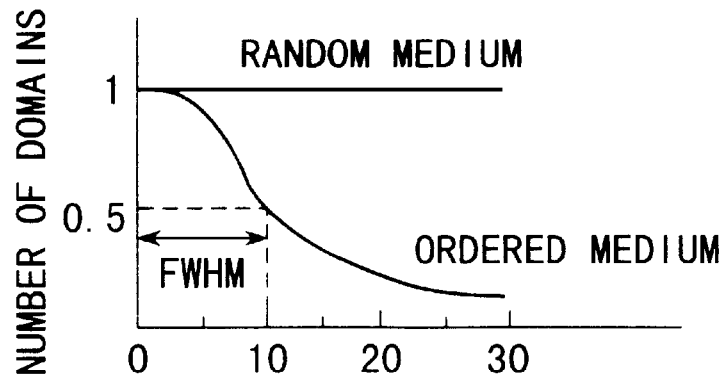
FIG. 12 is a graph showing a relationship between an angle formed between an array axis and a head scanning direction, and the number of domains in the magnetic recording medium of the present invention.

An angle formed between the array axis 2 or 4 and the track length direction is 60 degrees at maximum in the case where the magnetic particles 32 or non-magnetic particles 34 in domains 1 or 3 form triangular lattice, and is 45 degrees at maximum in the case of square lattice. FIG. 12 is a graph showing a relationship between the angle formed between the array axis and the track length direction, and the number of ordered particle domains. As shown in FIG. 12, the number of domains has a certain distribution with respect to the angle formed between the array axis and the track length direction. On the other hand, in a random medium, it is considered that the relationship between the number of domains relative to the angle represents flat distribution.

Assuming that information is reproduced by a magnetic head while rotating a magnetic recording medium, as the arrangement axes are more uniformly oriented to the track length direction, deviation of the array axis from the track length direction tends to be constant or below a certain value. This is preferable to reduce media noise and jitters generated due to the above deviation. In other words, the more domains having an array axis forming a small angle to the track length direction are present, the more preferable.

From studies on correlation between FWHM of distribution of angles formed between the array axis and the scanning direction and medium noise, the present inventors have found that the noise level for an angle of 40° becomes 90% of that for an angle of 60°. The FWHM of distribution of angle formed between the array axis of each domain and the track length direction is preferably 40° or less, more preferably 20° or less, and most preferably 10° or less. The above conditions are related to only the degree of arrangement of magnetic particles 32 or non-magnetic particles 34. Therefore, the same effect is obtained whether in the medium shown in FIG. 4 or in the medium shown in FIG. 5.

Next, manufacturing methods of the magnetic recording medium according to the present invention will be described. The present invention includes first to eighth methods utilizing self-organization of a block copolymer described below. Each manufacturing method is effective for manufacturing the magnetic recording medium of the present invention.

(1) First Method

The first method comprises the following steps of: (a) forming a block copolymer layer on a non-magnetic substrate; (b) making the block copolymer layer form a sea-island structure by self-organized manner in which the ratio of the etching speed between sea and island is three or more; (c) etching the non-magnetic substrate through the block copolymer layer having the sea-island structure; (d) depositing a magnetic layer in an etched region of the non-magnetic substrate; and (e) lifting-off remaining polymer layer and the magnetic layer on the polymer layer. In the step (d), an underlayer and a magnetic layer may be successively deposited. The underlayer may be of a multilayered structure. Hereinafter, each of the steps will be described.

(a) The step of forming a block copolymer layer on a non-magnetic substrate.

A block copolymer is a linear copolymer consisting of a plurality of different homopolymers. The block copolymer may be either of binary or of ternary or more. An example of block copolymer contains polystyrene and polyisoprene at a ratio of 7:3, and has a molecular weight Mw of about 500,000, distribution of the molecular weight being 1.1 or less. The block copolymer is employed as a solution dissolved in, for example, a cellosolve-based solvent. The solution is applied on the non-magnetic substrate by spin-coating or the like to form a block copolymer layer.

(b) The step of making the block copolymer layer to form a sea-island structure by self-organized manner in which the ratio of the etching speed between sea and island is three or more.

When a block copolymer layer is annealed, it forms a self-organized structure called a sea-island structure. The sea-island structure denotes a structure, for example in a diblock copolymer, in which one block constitutes islands and the other block becomes sea surrounding the islands. When a volume fraction of one block is 30% or less, for example, the see-island structure is formed. An example of such sea-island structure includes a structure in which islands made of polyisoprene having an average diameter of about 10 nm at minimum are orderly dispersed in the polystyrene sea.

When the block copolymer layer having the sea-island structure is treated with ozone, for example, ratio of the etching speed in reactive ion etching (RIE) using $CF_4$ described later can be adjusted to polystyrene sea:polyisoprene island=1:4. In this manner, when the etching speed is greater in islands, a pattern of holes corresponding to islands can be formed in the substrate by etching process for the substrate through the block copolymer.

Which of etching rates of sea and islands in the block copolymer layer may be high. However, whichever the etching rates of sea and islands is high, it is difficult to form a pattern by etching unless the etching speed ratio (selectivity ratio) between the two regions is three or more.

When a material of block copolymer itself has above selectivity ratio, ozone treatment or the like is unnecessary. It is preferable that ozone treatment or the like does not required, because manufacturing steps are reduced.

(c) The step of etching the non-magnetic substrate through the block copolymer layer having the sea-island structure.

An etching process such as RIE by $CF_4$ is performed through the block copolymer layer having a sea-island structure, the ratio of etching speed thereof having been adjusted in step (b). By the etching process, only sea or islands having a high etching speed in the sea-island structure of the block copolymer layer is first removed. For example, when the block copolymer layer is ozone-treated in the step (b) as described above, only polyisoprene islands are removed by etching, and the polystyrene sea remains. Then, following the etching of the sea or islands, the non-magnetic substrate is removed by etching. In this manner, the non-magnetic substrate is processed through the block copolymer layer.

(d) The step of depositing a magnetic layer in an etched region of the non-magnetic substrate.

After the non-magnetic substrate has been etched, a magnetic layer is deposited by, for example, sputtering. Thus, the magnetic layer is deposited in the etched region of the non-magnetic substrate (for example, holes corresponding to the polyisoprene islands) and on the surface of remaining polymer layer (for example, polystyrene sea). In this step, an underlayer and a magnetic layer may be subsequently deposited. The underlayer may have a multilayered structure.

(e) The step of lifting-off remaining polymer layer and the magnetic layer on the polymer layer.

The remaining polymer layer (for example, polystyrene) and the magnetic layer or the underlayer and the magnetic layer on the polymer layer are removed by lifting-off using an organic solvent or the like. Then, other residuals are removed by ashing or the like.

Using the above steps of (a) to (e), a magnetic layer can be filled in the non-magnetic substrate in accordance with the pattern of the sea-island structure of the block copolymer layer. In this manner, a magnetic recording medium of the present invention in which magnetic particles are dispersed in the non-magnetic substrate (non-magnetic matrix) can be formed.

The above method is clearly inexpensive compared with a method for forming a mask by electron beam direct write. In addition, since a plurality of media can be processed simultaneously by annealing, throughput of the media of the present invention is not lowered.

According to this method, because the substrate serves as the non-magnetic matrix, a problem of peeling-off of the non-magnetic matrix does not occur, even in the case where planarization process using, for example, chemical mechanical polishing (CMP) is required after the remaining polymer layer has been removed. Therefore, the polishing conditions may be optimized for the magnetic portion only, making it easy to prepare the recording medium. Further, it is preferable from the viewpoint of high density recording that peeling-off of the non-magnetic matrix does not occur, because a magnetic head can be operated with a low flying height.

Note that, as described in, For example, M. Park: Science, vol. 276, p. 1401, 1997, it is possible to reverse the ratio of etching speed between sea and islands if osmium treatment is performed in stead of above ozone treatment for the block copolymer layer having the sea-island structure. When an etching speed of sea is higher than that of islands, a pattern can be formed on the substrate by etching in such a manner that the islands remain. Further, a non-magnetic substrate is etched so that the islands remains, and then the etched region corresponding to the sea of the non-magnetic substrate is filled with magnetic material, thereby making it possible to prepare a magnetic recording medium of the present invention having a structure in which non-magnetic particles are arrayed in a magnetic matrix. In the case where such medium having a structure in which non-magnetic particles are dispersed in the magnetic matrix is fabricated, the same effect as described above can be obtained.

(2) Second Method

The second method includes the following steps of:

(a) depositing a non-magnetic layer on a substrate; (b) forming a block copolymer layer on the non-magnetic layer; (c) making the block copolymer layer form a sea-island structure by self-organized manner in which the ratio of the etching speed between sea and island is three or more; (d) etching the non-magnetic layer through the block copolymer layer having the sea-island structure; (e) depositing a magnetic layer in an etched region of the non-magnetic substrate; and (f) lifting-off remaining polymer layer and the magnetic layer on the polymer layer. In the step (e), an underlayer and a magnetic layer may be successively deposited. The underlayer may be of a multilayered structure.

Of the above steps, the steps (b) to (f) are similar to the steps (a) to (e) in the first method.

In the second method, a non-magnetic layer that serves as a matrix is deposited on a substrate in the step (a). Therefore, a block copolymer layer is formed on the non-magnetic layer in the step (b), the block copolymer layer is made into a sea-island structure in the step (c), and then reactive ion etching is performed in the step (d). At this stage, a depth of a recess formed by etching is as follows: that is, either (i) etching is stopped in the non-magnetic layer, and thus the non-magnetic layer is exposed; or (ii) etching is stopped on the surface or under the surface of the substrate, and thus the substrate is exposed. Further, a magnetic layer only or an underlayer and a magnetic layer are deposited.

In the case of (i), the non-magnetic layer functions as an underlayer under the magnetic layer or upper underlayer. For example, when a dielectric thin film such as ZnO is employed as a non-magnetic layer and CoPt is employed as a magnetic layer, ZnO acts to promote c-axis orientation of the magnetic layer. Thus, there can be provided a CoPt—ZnO magnetic recording layer having perpendicular magnetic anisotropy. In the case of (ii), by depositing an underlayer or magnetic layer that exhibits good orientation on the substrate in the step (e), magnetic characteristics of the magnetic recording medium can be improved.

(3) Third Method

The third method includes the following steps of: (a) depositing an underlayer on a substrate; (b) depositing a non-magnetic layer on the underlayer; (c) forming a block copolymer layer on the non-magnetic layer; (d) making the block copolymer layer form a sea-island structure by self-organized manner in which the ratio of the etching speed between sea and island is three or more; (e) etching the non-magnetic layer through the block copolymer layer having the sea-island structure; (f) depositing a magnetic layer in an etched region of the non-magnetic layer; and (g) lifting-off remaining polymer layer and the magnetic layer on the polymer layer. The underlayer deposited in the step (a) may have a multilayered structure. In the step (f), an underlayer (which may be of multilayered structure) and a magnetic layer may be successively deposited. Of the above steps, the steps (c) to (g) are the same as the steps (a) to (e) in the first method.

In this method, the underlayer is first deposited on the substrate in the step (a) and the non-magnetic layer is deposited in the step (b), and then, the block copolymer layer is formed in the step (c). For example, a metal layer such as Cr is deposited as an underlayer in the step (a) and a dielectric such as $SiO_2$ is deposited as a non-magnetic matrix in the step (b). In this case, when RIE using $CF_4$ is performed in the step (e), the underlayer acts as an etching stop layer, thereby making it possible to stop etching precisely on the surface of the underlayer. In addition, by continuing etching after the underlayer has been exposed, it is possible to remove organic materials or impurities on the surface of the underlayer so as to clean the surface. Thus, it is possible to improve orientation of the magnetic layer to be deposited on the surface of the underlayer.

(4) Fourth Method

The fourth method includes the following steps of: (a) depositing a magnetic layer on a substrate; (b) forming a block copolymer layer on the magnetic layer; (c) making the block copolymer layer form a sea-island structure by self-organized manner in which the ratio of the etching speed between sea and island is three or more; (d) etching the magnetic layer through the block copolymer layer having the sea-island structure; (e) depositing a non-magnetic layer in an etched region of the magnetic layer; and (f) lifting-off remaining polymer layer and the non-magnetic layer on the polymer layer. In the step (a), an underlayer (which may be of multilayered structure) and a magnetic layer may be deposited. The above steps are similar to those included in the first to third methods.

In this method, the magnetic layer is first deposited on the substrate in the step (a), the block copolymer layer is formed in the step (b), and a recess is formed in the magnetic layer in the step (d), and then, non-magnetic layer as a matrix is filled in the recess in the step (e). In the step (d), plasma generated in carbon monoxide and/or ammonia can be employed as a RIE reaction gas for etching the magnetic material.

In this method, since the magnetic layer is formed as a thin film in the step (a), there is provided an advantage that orientation or magnetic characteristics can be easily controlled as compared with a case where a magnetic material is filled in recess formed in a non-magnetic material. In addition, when an underlayer and a magnetic layer are deposited in the step (a), by etching the magnetic layer up to the underlayer in the step (d), a magnetic recording medium having a structure shown in FIG. 6 can be prepared. Further, in the step (d), if etching is stopped in the magnetic layer so as not to completely etch the magnetic layer, a magnetic recording medium having a structure shown in FIGS. 7 or 8 can be prepared.

(5) Fifth Method

The fifth method includes the following steps of: (a) forming a block copolymer layer on a non-magnetic substrate; (b) making the block copolymer layer form a sea-island structure by self-organized manner in which the ratio of the etching speed between sea and island is three or more; (c) etching the non-magnetic substrate through the block copolymer layer having the sea-island structure; (d) removing remaining polymer layer; (e) depositing a magnetic layer in an etched region of the non-magnetic substrate; and (f) performing chemical mechanical polishing (CMP) for an entire surface. In the step (e), an underlayer (which may be of multilayered structure) and a magnetic layer may be deposited. Of the above steps, the steps (a) to (e) are similar to those in the first method.

In this method, the remaining polymer layer is completely removed in the step (d), prior to depositing a magnetic thin film in the step (e). In this case, an organic material constituting the polymer is prevented from mixing with the magnetic layer. When the lifting-off process is employed as in the first to fourth methods, burrs of magnetic material or non-magnetic material are likely to be produced. Therefore, for a medium over which a magnetic head is operated with low flying height, it is required to determine conditions that burrs are unlikely generated. On the contrary, since the fifth method does not employ the lifting-off process, manufacturing of the medium becomes easy. In this method, CMP process is required to planarize the magnetic layer deposited on the whole entire in the step (f). In this method, by stopping the CMP process before the surface of the non-magnetic substrate is completely exposed in the step (f), a magnetic recording medium in which an interface layer is formed on the non-magnetic portion, shown in FIGS. 9 or 10, can be manufactured. In addition, this method provides an advantage that peeling-off of the non-magnetic matrix because the non-magnetic substrate serves as the non-magnetic matrix, like the first method, and another advantage that CMP process conditions may be optimized for the magnetic material only. The aforementioned effect is obtained similarly in the case of manufacturing a medium having a structure in which non-magnetic particles are dispersed in a magnetic matrix.

(6) Sixth Method

The sixth method includes the following steps of: (a) depositing a non-magnetic layer on a substrate; (b) forming a block copolymer layer on the non-magnetic layer; (c) making the block copolymer layer form a sea-island structure by self-organized manner in which the ratio of the etching speed between sea and island is three or more; (d) etching the non-magnetic layer through the block copolymer layer having the sea-island structure; (e) removing remaining polymer layer; (f) depositing a magnetic layer in an etched region of the non-magnetic layer; and (g) performing chemical mechanical polishing for an entire surface. In the step (f), an underlayer (which may be of multilayered structure) and a magnetic layer may be deposited. This method comprises the step (a) of depositing the non-magnetic layer on the substrate before performing the fifth method.

The sixth method also has advantages that, like the fifth method, an organic material constituting the polymer is prevented from mixing with the magnetic layer because the remaining polymer layer is removed in the step (e) prior to depositing a magnetic thin film, and burrs are not produced. In addition, since the matrix layer made of a non-magnetic material is first deposited in the first step (a) and then the block copolymer layer is formed in the step (b), an effect similar to that described in the second method can be obtained. Also in this method, like the fifth method, by stopping the CMP process before the surface of the non-magnetic substrate is completely exposed in the step (g), a magnetic recording medium in which an interface layer is formed on the non-magnetic portion, shown in FIGS. 9 or 10, can be manufactured.

(7) Seventh Method

The seventh method includes the following steps of: (a) depositing an underlayer on a substrate; (b) depositing a non-magnetic layer on the underlayer; (c) forming a block copolymer layer on the non-magnetic layer; (d) making the block copolymer layer form a sea-island structure by self-organized manner in which the ratio of the etching speed between sea and island is three or more; (e) etching the non-magnetic layer through the block copolymer layer having the sea-island structure; (f) removing remaining polymer layer; (g) depositing a magnetic layer in an etched region of the non-magnetic layer; and (h) performing chemical mechanical polishing for an entire surface. The underlayer deposited in the step (a) may have a multilayered structure. In the step (g), an underlayer (which may be of multilayered structure) and a magnetic layer may be deposited. This method comprises the step (a) of depositing one ore more underlayers on the substrate before performing the sixth method.

The seventh method also has advantages that, like the fifth method, an organic material constituting the polymer is prevented from mixing with the magnetic layer, and burrs are not produced. In addition, since the underlayer is first deposited in the first step (a) and then the non-magnetic layer as a matrix is deposited in the step (b), an effect similar to that described in the third method can be obtained. Also in this method, as in the fifth method, by stopping the CMP process before the surface of the non-magnetic substrate is completely exposed in the step (h), a magnetic recording medium in which an interface layer is formed on the non-magnetic portion, shown in FIGS. 9 or 10, can be manufactured.

(8) Eighth Method

The eighth method includes the following steps of: (a) depositing a magnetic layer on a substrate; (b) forming a block copolymer layer on the magnetic layer; (c) making the block copolymer layer form a sea-island structure by self-organized manner in which the ratio of the etching speed between sea and island is three or more; (d) etching the magnetic layer through the block copolymer layer having the sea-island structure; (e) removing remaining polymer layer; (f) depositing a non-magnetic layer in an etched region of the magnetic substrate; and (g) performing chemical mechanical polishing for an entire surface. In the step (a), an underlayer (which may be of multilayered structure) and a magnetic layer may be deposited. The above steps are similar to those included in the fifth to seventh methods.

The eighth method also has advantages that, like the fifth method, an organic material constituting the polymer is prevented from mixing with the magnetic layer, and burrs are not produced. In addition, in this method, there can be provided an effect similar to that described in the fourth method. That is, since the magnetic layer is formed as a thin film in the step (a), there is provided an advantage that orientation or magnetic characteristics can be easily controlled as compared with a case where a magnetic material is filled in recess formed in a non-magnetic material. In addition, when an underlayer and a magnetic layer are deposited in the step (a), by etching the magnetic layer up to the underlayer in the step (d), a magnetic recording medium having a structure shown in FIG. 6 can be prepared. Further, in the step (d), if etching is stopped in the magnetic layer so as not to completely etch the magnetic layer, a magnetic recording medium having a structure shown in FIGS. 7 or 8 can be prepared.

The present invention relates to a magnetic recording medium such as ordered magnetic particle medium and ordered non-magnetic pore medium and a method thereof.

Next, an magnetic recording medium having a higher regularity of array of magnetic particles of non-magnetic particles (non-magnetic pores), than the aforementioned magnetic recording medium fabricated by using the block copolymer, and a method of manufacturing the magnetic recording medium will be described. The ordered magnetic particle medium or ordered non-magnetic pore medium having such a structure that magnetic particles or non-magnetic pores of several tens nm or less in size are arrayed regularly. Hereinafter, the present these magnetic recording media will be described in detail with reference to the drawings.

(A) Ordered Magnetic Particle Medium

Figure 13A:
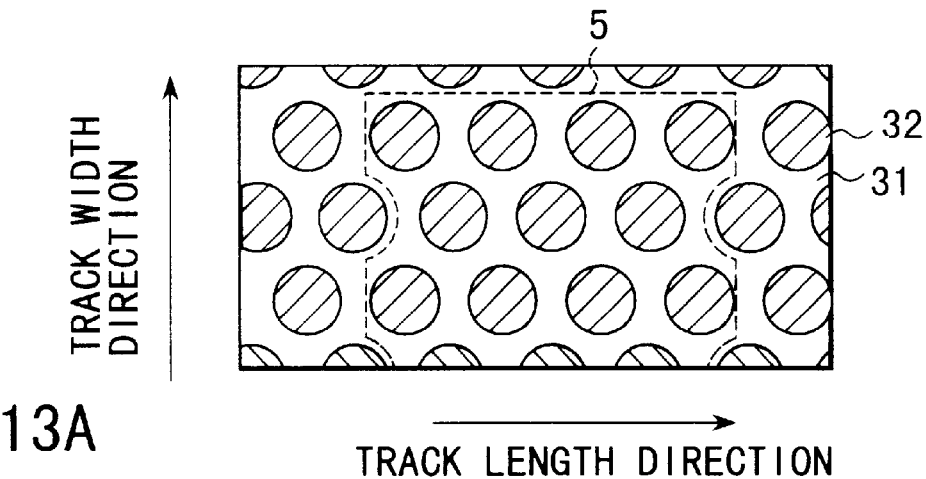
FIG. 13A is a plan view showing an example of an ordered magnetic particle medium according to the present invention.
Figure 13B:
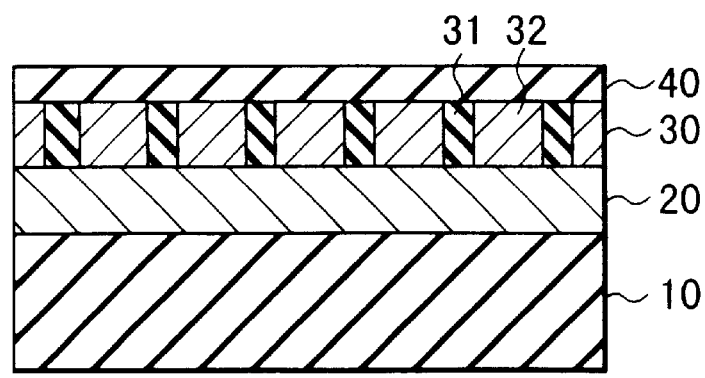
FIG. 13B is a cross sectional view thereof.

FIG. 13 is a schematic view showing an example of an ordered magnetic particle medium according to the present invention; FIG. 13A is a plan view thereof; and FIG. 13B is a sectional view thereof.

In the ordered magnetic particle medium according to the present invention, a seed layer 20 is formed on a substrate 10, and a magnetic recording layer 30 is formed on the seed layer 20. The magnetic recording layer 30 comprises a plurality of magnetic particles 31 arrayed regularly in a non-magnetic matrix 32. A protective layer 40 is formed on the magnetic recording layer 30. The term "regularly arrayed" means that a full width at half maximum of distribution of distance between the closest magnetic particles is equal to or less than ±40% of average distance between the closest magnetic particles.

A material forming the substrate 1 includes a material employed for a general magnetic medium such as glass, Si, or NiP coated material thereon.

The seed layer 20 is a layer for controlling crystallinity of the magnetic layer 30, but may not be employed. The seed layer 20 includes Cr, Cr-alloy based, Cr, NiFe or the like. The film thickness of the seed layer 20 is preferably 0 to 200 nm (0 nm when the seed layer 2 is not employed) and more preferably 0 to 100 nm. The seed layer is provided mainly to control crystallinity of the recording layer in the case of longitudinal recording. In the case where the recording layer consists essentially of Co, a Cr-based or V-based alloy with relatively small mismatching lattice constant with hcp crystal of Co can be employed as a seed layer. The seed layer is grown in cone shaped or column shape on the substrate surface. If the film thickness is too thin, the crystallinity of the seed layer itself is insufficient, and an effect as the seed layer is insufficient. The crystallinity in a thin film region of the seed layer depends on a deposition method. When an ultrahigh vacuum sputtering method is applied, sufficiently good crystallinity is exhibited even in the thickness of 50 nm or less, for example, that of 20 nm. Therefore the lower limit of the thickness of the seed layer in controlling the crystallinity of the recording layer can be 20 nm or less. In the magnetic medium according to the present invention, it is possible to make a matrix material that function as a seed layer. Therefore, the present invention may take a structure having no seed layer or may take a structure having a seed layer with a thickness of 20 nm or less, which has an insufficient crystallinity but helps the effect of matrix to control the crystallinity of magnetic particles. On the other hand, when an amorphous magnetic material such as rare earth-transition metal (RE-TM) is employed as a magnetic particle material, it is unnecessary to select materials for the seed layer and the matrix for controlling crystallinity. In the structure without the seed layer, the recording layer may be directly formed on a substrate or may be formed on any underlayer other than seed layer. If the seed layer is too thick, the crystal particle size on the seed layer surface is excessive, and the particle size in the recording layer formed thereon is inhibited from being smaller. Therefore, the upper limit of the thickness of the seed layer is preferably 200 nm, more preferably 100 nm, and further more preferably 50 nm.

The thickness of the magnetic recording layer 30 is preferably 5 to 50 nm and more preferably 10 to 25 nm. The lower limit of the thickness is determined by resistance to thermal disturbance, and thus, varies depending on a magnetic material employed. For example, since a sufficient thermal distribution resistance can not be ensured in a Co—Cr based magnetic material of less than 10 nm, the lower limit of the thickness is 10 nm. A magnetic material with high magnetic anisotropy such as Co—Pt based or Fe—Pt based material exhibits sufficient thermal disturbance resistance up to the thickness of about 7 nm. A Sm—Co based magnetic material with higher anisotropy exhibits sufficient thermal disturbance resistance even in 5 nm. The upper limit of the thickness of the magnetic recording layer is determined by resolution. An indicator of resolution is Mrt/Hc in a longitudinal medium, and thus, the thickness "t" of the recording layer can be thickened in the case of high Hc. The upper limit of the thickness of the recording layer depends on linear recording density (requirement for resolution) and Hc. It should be 50 nm at maximum, and preferably 25 nm.

A non-magnetic matrix 31 can be widely selected from oxides, nitrides, carbides, borides, or organic materials such as C (carbon), Si—O, Si—N, Si—C, Ti—N, Ti—C, Al—N, Ta—O, Ta—N, Al—O, ITO, In—N, In—O, B—N, Zr—N, Zr—O, and PTTE.

A material forming magnetic particles 32 can be widely selected from materials such a Co-based alloy, rare earth-transition metal alloy (RE-TM), magnetic oxide or the like. Examples of the Co-based alloy are Co—Cr, Co—Pt, Co—Fe, Co—Cr—Ta, Co—Cr—Pt, Co—Cr—Pt-Ta, Co, Fe, Tb—Fe, Tb—Co, Tb—Fe—Co, Gd—Tb—Fe—Co, Gd—Dy—Fe—Co, Nd—Fe—Co, Nd—Tb—Fe—Co, PtMnSb, Ce ferrite, Ba ferrite or the like. Of the above mentioned magnetic particle materials, particularly preferable materials in the present invention are magnetic materials with less segregation such as Co—Pt-based alloy, Co—Tb, Co, Co—Fe, rare earth-transition metal alloy or the like.

A protective layer 6 is made of C or the like, but the protective layer 6 may not be employed. The thickness of the protective layer 6 is preferably 0 to 20 nm (0 nm means the structure without the protective layer 6) and more preferably 0 to 10 nm. The lower limit of the thickness of the protective layer 6 is defined by the protective function for the recording layer. In the case of a conventional multigrain random metal medium having a microstructure in which magnetic particles are surrounded by grain boundaries, the medium itself has insufficient mechanical and chemical stability. Thus, the coating of the protective film typically of C-based film is indispensable, and a protective film of at least about 10 nm is required. In the present invention, since it is possible to make the matrix material function to protect the magnetic particles, and thus, the protective film may not be employed. In addition, in order to help protection function by the matrix, it is further effective to provide a protective film having a thickness of 10 nm or less. The upper limit of the thickness of the protective layer is defined by a spacing loss. Thicker protective thickness may lose abrupt gradient of the recording magnetic field from the head as well as the spatial abrupt gradient of the signal magnetic field generated from the medium, and thus, improvement in linear density is inhibited. The upper limit of the thickness of the protective layer should be 20 nm at maximum, and preferably 10 nm, although it depends on linear density, head structure, head flying height or the like.

The crystalline magnetic anisotropy and magnetic properties of the magnetic recording layer 30 can be adjusted by the crystallinity of the aforementioned seed layer 20, the thickness of the seed layer 20, the magnetic material and the thickness of the magnetic particles 32. For example, when relatively thick Cr is employed for the seed layer 20 and relatively thin Co—Pt or Co—Fe is employed for the magnetic particles 32, the magnetic recording layer 30 exhibits in-plane magnetic anisotropy. When relatively thin Cr is employed for the seed layer 20, the magnetic recording layer 30 exhibits three-dimensionally random magnetic isotropy. When NiFe is employed for the seed layer 20 and relatively thick Co—Pt or Co—Fe is employed for the magnetic particles 32, the magnetic recording layer 32 exhibits magnetic anisotropy in a direction perpendicular to the film surface.

The crystalline magnetic anisotropy and magnetic properties of the magnetic layer 30 can also be adjusted by deposition conditions of the seed layer 20 and magnetic particles 32. In the present invention, the magnetic anisotropy and magnetic properties after ordered magnetic particles are formed are more important.

The present inventors performed simulation of magnetic recording medium prior to realization of the present invention. As a result of the simulation, it is found that, when the magnetic particles 32 are arrayed regularly, significant reduction is observed in medium noise and the S/N ratio is improved. Further, its reduction effect is found to be significant in the case where dispersion of distance between particles in FWHM is 40% or less, and to be further significant in the case where the dispersion of particle diameter in FWHM is 20% or less.

In the ordered magnetic particle medium according to the present invention, one magnetic particle 32 is not a minimum recording unit. That is, a minimum recording cell 5 shown in FIG. 13 is not composed of only one magnetic particle 32, but is composed of at least four magnetic particles 32 in track length direction. The minimum recording cell means a recording cell having the shortest cell length, which varies according to modulation method.

When the minimum recording cell 7 is composed of a plurality of magnetic particles 32 according to the present invention, a magnetic recording medium can be designed according to the head track width, gap length, servo precision or the like. In addition, the medium noise is sufficiently lowered and the S/N ratio can be improved. The number of magnetic particles 32 in the minimum recording cell 5 depends on recording density and an aspect ratio of the recording cell.

In the present invention, since the non-magnetic matrix 31 exists between particles 32, there is no need for segregation of Cr or the like.

(B) Ordered Non-magnetic Pore Medium

FIG. 14 is a schematic view showing an example of an ordered non-magnetic pore medium according to the present invention; FIG. 14A is a plan view of a minimum recording cell; and FIG. 14B is a sectional view thereof. In the ordered non-magnetic pore medium shown in FIG. 14, a seed layer 20 is formed on a substrate 10, and a magnetic recording layer 30 is formed on the seed layer 20. The magnetic recording layer 30 comprises a plurality of non-magnetic pores 34 arrayed regularly in a continuous magnetic film 33. A protective layer 40 is formed on the magnetic recording layer 30. That the non-magnetic pores are arrayed regularly means that FWHM of distribution of distance between the closest non-magnetic pores is ±40% or less of average distance between the closest non-magnetic pores.

Material employed for the substrate 10, the seed layer 20, and the protective layer 40 may be similar to those forming the substrate 10, the seed layer 20, and the protective layer 40 in the ordered magnetic particle medium shown in FIG. 13. In addition, the thickness of the magnetic recording layer 30 in FIG. 14 is similar to that of the magnetic recording layer 30 in the ordered magnetic particle medium in FIG. 13.

A magnetic material forming a continuous magnetic film 33 can be selected from those similar to the magnetic particle materials in the ordered magnetic particle medium. It can be widely selected from polycrystalline magnetic materials or amorphous magnetic materials. Particularly preferable materials include Co—Pt-based alloy, Co—Tb, Co, Co—Fe, rare earth-transition metal alloy (RE-TM), which easily forms a continuous magnetic material and has less pining sites for domain walls. Co—Tb is a material belongs to RE-TE, and is a material for optical magnetic recording rather than magnetic recording, but it is an amorphous continuous magnetic film free from grain boundaries and can be processed well. In addition, Co—Tb has advantages that it gives high signal output since it has a relatively large saturation magnetization (Ms) among RE-TM alloys; it has superior operating temperature characteristics since it has a high Curie point; it exhibits good CSS resistance since it has good corrosion resistance.

A material forming the non-magnetic pores 34 can be selected from those similar to the materials forming the non-magnetic matrix 31 in the ordered magnetic particle medium.

The non-magnetic pores 34 are connected with each other with domain walls 6. The domain wall 6 is a part of the continuous magnetic film 33. For example, when magnetizations of two adjacent recording cells are directed to opposite directions with each other, the domain wall 6 positioned between these cells has magnetization in intermediate direction of the two directions. The domain walls 6 in the present invention may be various types depending to the type of the continuous magnetic film 33, and are not particular restricted. For example, the types of domain walls 6 include Broch domain wall and Neel domain wall.

In the ordered non-magnetic pore medium according to the present invention, since the regularly arrayed non-magnetic pores 34 act as pining sites of the domain walls 6, the shape of the domain walls 6 follows regularity of the non-magnetic pores 34. Therefore, nevertheless the magnetic film 33 is a continuous film, the medium has a very low noise and has an improved S/N ratio. In addition, in the continuous magnetic film 33, the volume of the magnetic material is considered to be infinite. Therefore, in the ordered non-magnetic pore medium, even if the non-magnetic pores are made small and are dispersed with high density, there arises no problem of thermal disturbance.

In order that the non-magnetic pores 34 effectively act as pining sites for the domain walls 6, the pore diameter is preferably 0.5 or more of the width of the domain walls 6. In order to obtain low noise characteristics, the pore diameter is preferably three times or less of the width of the domain walls 6. Typically, when an ordered non-magnetic pore medium is fabricated with a method not employing deposition in magnetic field or the like, the continuous magnetic film 33 exhibits a magnetization state having the domain walls 6 immediately after formation. In general, a pattern of the domain walls 6 appeared on the continuous magnetic film 33 immediately after deposition is a random maze pattern. However, in the case where a non-magnetic pore diameter ranges between 0.5 and 3 times of the domain wall width, the domain walls 6 do not exhibit maze shape, but exhibit such a regular array connecting the non-magnetic pores 34 as shown in FIG. 13.

Whether the domain walls 6 connect the non-magnetic pores 34 or not depends on domain wall energy and demagnetizing field energy. That is, in the case where the domain wall energy is greater than the demagnetizing field energy, the domain walls 6 are made stable in energy by connecting the non-magnetic pores 34. In the contrary case, the domain walls 6 are made stable in energy when they are formed at portions other than non-magnetic pores 34 without connecting the non-magnetic pores 34, and thus, the domain walls 6 do not connect the non-magnetic pores 34. The present inventors found out that it would be preferable to select a magnetic material and array of non-magnetic pores so that the domain wall energy is made higher than the demagnetizing field energy to lower the medium noise and to improve the S/N ratio. That is, in order to reduce magnetization transition noise, the FWHM of distribution of distance between the closest pores of the non-magnetic pores included in the minimum recording cell is preferably adjusted to ±40% or less of average distance between the closest pores.

Table 1 shows recording densities of magnetic recording media and particle diameter of magnetic particles, the interparticle distance, pore diameter and interpore distance required when the present invention is applied to these magnetic recording media.

TABLE 1

Simulated features of ordered magnetic particle media and ordered non-magnetic pore media

| | recording density (Gb/in$^2$) | | | | | |
|---|---|---|---|---|---|---|
| | 50 | | 100 | | 200 | |
| aspect ratio | 10 | 1 | 10 | 1 | 10 | 1 |
| track density (kTPI) | 71 | 224 | 100 | 316 | 141 | 447 |
| track width (nm) | 360 | 113 | 254 | 80 | 180 | 57 |
| bit density (kBPI) | 710 | 224 | 1000 | 316 | 1410 | 447 |
| shortest cell length* (nm) | 47.5 | 151 | 33.8 | 107 | 24 | 76 |
| particle diameter (upper limit; nm) | 11.9 | 37.8 | 8.5 | 26.8 | 6 | 19 |
| interparticle distance (nm) | 13–15 | 39–47 | 9–11 | 28–34 | 7–7.5 | 20–24 |

TABLE 1-continued

Simulated features of ordered magnetic particle media and ordered non-magnetic pore media

| | recording density (Gb/in²) | | | | | |
|---|---|---|---|---|---|---|
| | 50 | | 100 | | 200 | |
| pore diameter (upper limit; nm) | 11.9 | 18.4 | 8.5 | 12.8 | 6 | 8.8 |
| interpore distance (nm) | 15–72 | ≦23 | 11–51 | ≦16 | 7.5–36 | ≦11 |

*In the case where 1 to 7 modulation is adopted

Although the recording cell aspect ratio is about 20 in a conventional magnetic medium, it is expected a trend to make the aspect ratio smaller, i.e., a trend to make the track narrower will be advanced more rapidly than to make bit pitch narrower. Thus, in Table 1, there are shown cases when aspect ratio is 10 and 1 (proposed as a so-called square bit). The relationship between the bit density and the shortest cell length depends on a signal processing method. In Table 1, employed are converted values when a 1/7 modulation system is adopted.

As described previously, in the case of the ordered magnetic particle medium, the minimum recording cell contains at least four magnetic particles, and thus, the most preferable particle diameter is 1/4 or less of the minimum recording cell length in order to achieve low noise performance. Therefore, in Table 1, the particle diameter is set to 1/4 of the cell length.

The density of magnetic particles is set to 50% or more to obtain sufficiently large medium signal output; and the interparticle distance is set to (particle size+1 nm) so that exchange interaction between the particles can be completely disrupted. The number of magnetic particles included in the minimum recording cell is expressed by a value obtained by dividing the product of the track width and the shortest recording cell length by the interparticle distance.

In the ordered non-magnetic pore medium, the pore density is set to 50% or less to obtain sufficiently large medium signal output. Although the interpore distance equal to or smaller than the track width is substantially applicable, the distance is set to 0.2 of the track width in Table 1, which corresponds to a value that domain walls (magnetization transitions) connecting pores have sufficient stability.

From Table 1, it is evident that the ordered magnetic particle medium and ordered non-magnetic pore medium of the present invention are both useful as candidates of the ultrahigh density magnetic recording media.

The ordered magnetic particle medium and ordered non-magnetic pore medium according to the present invention can be manufactured with using a mask having regularly arrayed holes. First, a manufacturing method of a process mask having regularly arrayed holes will be described. Such a mask can be fabricated by utilizing a self-organizing process.

The self-organizing process includes the followings: (a) anodic oxidation method of highly purified Al disclosed in J. Electrochem. Soc. 100, 411, 1953; (b) dispersion precipitation method of oxide microsphere; (c) evaporation method of oxide microsphere in a gas; (d) Ge or Bi evaporation onto a stearic acid disclosed in Applied Physics, Vol. 52, No. 8, 712, 1983; (e) heteroepitaxial growth of Cu phthalocyanine onto graphite; (f) InAs dots formation onto GaAs disclosed in Appl. Phys. Lett. 64 (2) 196, 1994; and (g) Au dots formation onto an organic complex disclosed material in Appl. Phys. Lett. 64 (4) 422, 1994.

In the present invention, any of aforementioned self-organizing processes can be applied, and other methods without employing such self-organizing process can also be applied.

As examples of a method for manufacturing a mask by employing a self-organizing process, aforementioned methods of (a) anodic oxidation method of highly purified Al, and (c) evaporation of oxide microsphere in a gas will be described.

First, a method for manufacturing a mask by the anodic oxidation of highly purified Al will be described. The manufacture of self-organized mask using Al anodic oxidation comprising steps of: (1) forming porous alumite; and (2) fabricating a mask from the porous alumite. Hereinafter, each of these steps will be described sequentially.

(1) Step of Forming Porous Alumite

This step includes the following steps: (a) mirror polishing 4N or 5N grade highly purified Al plate; (b) chemically polishing the mirror-polished Al plate in perchlorate or alkali polishing the mirror-polished Al plate in sodium hydroxide, and then neutralizing; and (c) after neutralizing, immersing the Al plate in a anodic oxidation solution of several percents to several tens of percents, and applying positive voltage, using Pt or C as a cathode, to the Al plate for a predetermined period of time for anodic oxidation.

As an anodic oxidation solution, employed is an aqueous solution of, for example, oxalic acid, phosphorous acid, sulfuric acid, chromic acid, and mixture acid thereof. A continuous $Al_2O_3$ barrier layer is formed on the surface of the Al plate by anodic oxidation, and further, porous alumite ($Al_2O_3$) is formed on the barrier layer. The porous alumite has a plurality of regularly arrayed micropores. The formation of porous alumite having such a shape is referred to as self-organization.

FIG. 15 is a schematic cross sectional view showing a barrier layer and porous alumite formed by anodic oxidation. As shown in FIG. 15, the initially grown barrier layer 72 of anodic oxidized Al is formed on a highly purified Al plate and the porous alumite 74 having micropores 73 is formed thereon by the anodic oxidation treatment. In FIG. 15, C denotes the unit cell size of the porous alumite (corresponding to the distance between micropores); P denotes the diameter of the micropore; and W denotes the thickness of the alumite wall surrounding the periphery of the micropores.

Such formation mechanism of the self-organized porous alumite 74 is based on dissolution of both of Al and Al oxide ($Al_2O_3$) in the anodic oxidation solution. That is, when Al is immersed in an oxidizing liquid, and a voltage is applied thereto, Al oxide is formed while the Al surface is dissolved, and at the same time, a part of the formed Al oxide is dissolved into the solution. On the surface where Al oxide has been dissolved in the solution, an electric field concentrates and a current density increases. If the current density increases, micropores 73 are formed because dissolution of Al oxide is promoted. Simultaneously, the dissolved excess Al or oxidized Al is supplied to the periphery of the micropores 73, and the growth of the Al oxide wall is promoted. Local dissolution of Al oxide is caused selectively at defective portions of Al itself or Al oxide remaining on the Al surface. As described above, after the local dissolution is caused, the micropores 73 are formed and the Al oxide walls are grown, and then the electric field is weakened. When the electric field is weakened, portions where strong electric field acts are formed again adjacent to the Al oxide walls to maintain the total electric field strength on the Al oxide surface, and thus, the micropores 73 are formed. At the initial stage of anodic oxidation, the formation of the micropores 73 begins from randomly distribute defective portions. However, as described above, the periodic and regular spatial distribution of electric field occurs around the formed micropores 73, and thus, it is considered that the micropores 73 form a regular array by self-organized manner.

As shown in FIG. 15, at the interface between the Al plate 71 and the barrier layer 72, a recess is formed for each unit cell. When the sample having the grown porous alumite 74 is immersed in phosphorous acid solution with relatively high concentration or in chromic acid solution to remove the porous alumite, an Al plate 71 having recesses arrayed regularly is obtained. If anodic oxidation is applied again to this Al plate 71, projections positioned between the recesses on the Al plate 71 serves as the aforementioned defective portions. Therefore, porous alumite 74 having self-organized pattern more regular than the initial anodic oxidation can be obtained.

The growth rate of the porous alumite 74 depends on anodic oxidation conditions, mainly on an anodic oxidation voltage, and is typically several to 100 nm/minute. In addition, the depth of the micropores 73 can be adjusted by the anodic oxidation time.

In fabrication of a magnetic recording medium, the size of the formed micropores 73 corresponds to magnetic particle size or non-magnetic pore size; and the distance between the micropores 73 corresponds to the distance between magnetic particles or the distance between non-magnetic pores. The depth of the micropores 73 is associated with processing characteristics of the magnetic film. The size of the micropores 73 and the distance between the micropores 73 depend on a type the acid used for anodic oxidation, the voltage and the bath temperature.

Setting the pore distance to C, the pore diameter to P, the thickness of the Al oxide walls formed around the pores to W, and the voltage applied to Al to E, as described previously, the following relationship is experimentally established.

$$C = 2WE + P \quad (1)$$

The pore diameter P and the thickness W of the Al oxide walls depend on the type and concentration of the anodic oxidation liquid and the bath temperature. The diameter of the micropores 73 can be adjusted depending on the type and concentration of acid and bath temperature; and the distance between the micropores 73 can be widely adjusted depending on the type and concentration of acid, the bath temperature, and the applied voltage. The array regularity of the micropores 73, i.e., the pore diameter distribution and interpore distance distribution depend on the purity of Al, an amount of additives such as Mg in Al, pretreatment for anodic oxidation, anodic oxidation rate, and the number of times of anodic oxidation.

(2) Step of Fabricating a Mask from Porous Alumite

A method for forming a mask from porous alumite 74 formed on Al is disclosed in, for example, Jpn. J. Appl. Phys. 35-2 (1B) L126, 1996. In this method, an organic resin mold for mechanical maintenance is formed on the surface of the porous alumite including micropores 73 shown in FIG. 15, and then the Al plate is removed by etching, the Al oxide barrier layer is removed, and further the resin mold is removed. By the series of steps, a mask made of porous alumite can be fabricated.

In addition, in Jpn. J. Appl. Phys. 31-2 (12B) L1775, 1992 and Science, 268, 1466, 1995, there is disclosed a method of forming a negative pattern by filling a resist in the porous alumite, followed by forming a replica of oxide or platinum (Pt). As materials for replica, CVD deposition materials such as SiC, $SiO_2$, and a-C:H may be employed other than oxide and platinum. Therefore, in comparison with the aforementioned case where porous alumite itself is made into a mask, etching resistance and mechanical strength of the mask can be improved.

When the mask is thus fabricated from the replica, it is preferable to use a method in which a metal ring consisting of metal such as Cu is provided and the porous alumite having honeycomb pattern is disposed in the hole of the metal ring for the purpose of mechanical maintenance, and then a mask is fabricated from the porous alumite pattern. When the metal ring is employed, the mechanical strength and handling properties of the mask can be significantly improved. The fabrication of the mask employing the metal ring can be performed by a modified method of the replica method disclosed in, for example, Science, 268, 1466, 95. FIG. 16A is a schematic plan view and FIG. 16B is a schematic cross sectional showing an example of metal ring. The mask is formed in a hole 76 of the metal ring 75.

Next, a method for manufacturing mask employing evaporation method of oxide microspheres in a gas will be described. This method includes the following steps: (a) An oxide such as $TiO_2$ forming microspheres in order of 10 nm is placed in, for example, a boat for source material of an electron beam evaporation apparatus followed by evacuating, and then, the boat is irradiated with electron beams to evaporate $TiO_2$. (b) The vapor is introduced from through holes on a partition provided in the evaporation chamber to another chamber with a high gas pressure. In this chamber, microspheres of $TiO_2$ in order of 10 nm is formed in a gas phase by overcooling of the vapor. (c) The formed microspheres are electrically charged by passing them through plasma or by blowing ozone to them from ozonizer, and the charged microspheres are deposited on a mask substrate. The deposited microspheres are arrayed regularly on the substrate with repulsing from each other by means of Coulomb force. As a result, a regular self-organized pattern of $TiO_2$ spheres of 10 nm in particle diameter is formed. (d) A resist is filled in the formed pattern, and then a negative pattern of resist having regularly arrayed recesses is fabricated. By providing the negative pattern to a transfer process, a mask having the same pattern as self-organized pattern can be formed.

Next, a method of manufacturing a magnetic recording medium according to the present invention will be described below. In the following, methods of manufacturing an ordered magnetic particle medium and an ordered non-magnetic pore medium employing a mask fabricated from porous alumite.

(A) Method of Manufacturing an Ordered Magnetic Particle Medium

An ordered magnetic particle medium having the constitution shown in FIG. 1 can be fabricated, for example, by sequentially depositing a seed layer, a magnetic layer, and a protective layer by sputtering on a substrate set in a deposition apparatus such as a multi-chamber magnetron sputtering apparatus.

Figure 17:
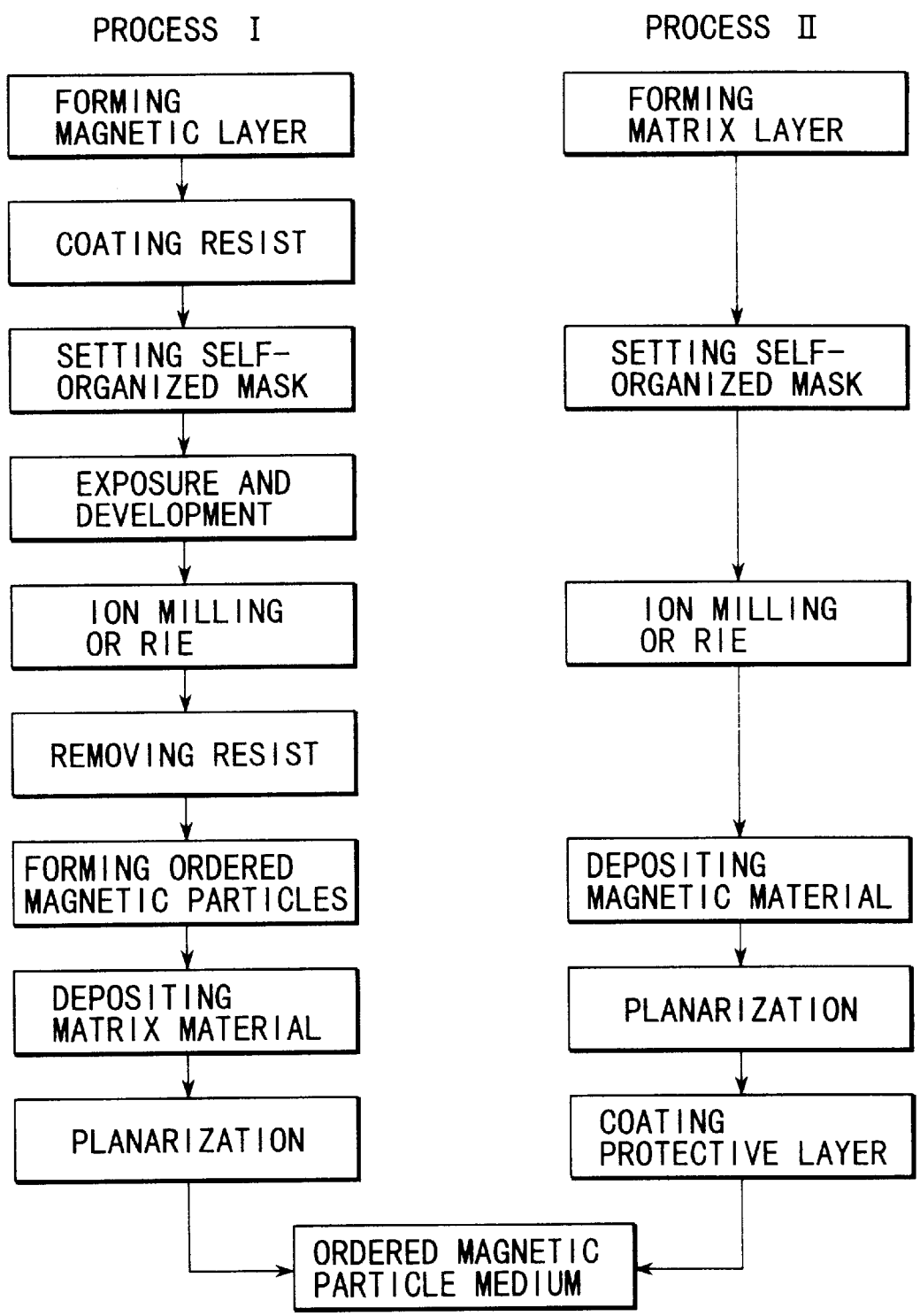
FIG. 17 is a process flowchart of a manufacturing method according to the present invention.

Two types of processes, i.e., first and second processes can be applied to this method. FIG. 17 shows the process flow of these processes. Both of these processes can be employed to fabricate the ordered magnetic particle medium shown in FIG. 13. The first process has many more processes than the second process, and requires the PEP step. However, there is an advantage that the self-organized mask can be repeatedly used many times because it is not changed in the process.

(1) Process I (a) A magnetic layer is formed on a substrate. As described previously, a seed layer and a protective layer may be or may not be formed. (b) A resist is coated on a magnetic layer. (c) The substrate is disposed immediately under a self-organized mask fabricated as described above. (d) The resist is exposed by irradiating with light or irradiating with electron beam through the mask, and the resist is developed. When a positive resist is employed, only an exposed portion remains as a pattern on a magnetic layer by the development process. The resist pattern coincides with a honeycomb-shaped pattern of the holes of the self-organized mask. (e) The resist pattern is transferred to the magnetic layer by an ion milling method or an RIE method. The ion milling method is carried out with employing an ion source having a greater diameter than the substrate (a disk substrate in the case of HDD application) on which the magnetic layer is formed, or by rotating the substrate under an ion source having a smaller diameter. The milling rates of the resist, magnetic layer, seed layer, and protective layer are examined in advance. The milling time is set by referring to the examined milling rates, thereby making it possible to pattern only the magnetic layer into regular columnar magnetic particles before the resist is milled off. Since the seed layer remains as is under the magnetic particles, good magnetic characteristics are maintained. The seed layer between magnetic particles may be milled. (f) After the magnetic layer has been patterned, the residual resist is removed as required (utilizing ashing or dipping). (g) A matrix material is further filled between the magnetic particles manufactured as described above to improve mechanical strength and corrosion resistance of the medium. The filling can be carried out by the deposition method such as CVD, sputtering, and evaporation. In view of filling properties of the matrix material between magnetic particles, an anisotropic deposition method such as collimation sputtering is preferred. However, since the filling depth (a depth substantially equal to the thickness of magnetic particles) is about 10 nm, which is very small, the filling can be carried out relatively well by employing any method. (h) After the matrix has been filled, the surface of the medium is made into an uneven surface, and thus, a planarization process is applied to the medium surface as required. The surface planarization process includes, for example, waffle vanishing, tape vanishing, CMP, ion polishing or a combination thereof. For example, when CVD carbon employed as a matrix, and tape vanish and ion polishing are combined for surface planarization, Ra<1 nm in surface roughness can be achieved. (i) After the planarization process, if a matrix material covers the top of magnetic particles, the material can be used as an ordered magnetic particle medium as is. When the matrix material does not cover the top of magnetic particles and the top of magnetic particles is exposed, it is preferable to coat a protective layer on the surface of the medium after the planarization process. (j) Although it is not shown in FIG. 17, lastly, a lubricant layer is coated on the surface of the medium, like in a typical magnetic recording medium. Since the lubricant layer can be employed instead of the protective layer, the lubricant layer may be coated on the surface of the medium when the magnetic particles are exposed as described above.

(2) Process II (a) A material constituting a matrix is formed on a substrate as a continuous film. As described above, a seed layer or a protective layer may not be formed. (b) The substrate is disposed immediately under a self-organized mask. (c) The matrix material is patterned by an ion milling method or an RIE method corresponding to the self-organized mask. By the patterning, plural pores arrayed regularly are formed in the matrix material. (d) A magnetic particle material is filled in the pores formed in the matrix material. In this filling, an anisotropic deposition method such as collimation sputtering is preferably applied to maintain magnetic properties well in the vicinity of the side walls of pores. However, since the thickness for filling is about 50 nm at maximum, deterioration of the magnetic properties is slight even if a typical isotropy deposition is employed, which brings no problem in practical point of view. (e) After filling the magnetic particles, surface planarization is carried out in the similar manner to the process I such as vanishing, CMP, or ion polishing.

In the process I, a magnetic material is disposed on the lower side and a matrix material typically harder than the magnetic material is disposed on the upper side. Therefore, it is required to manage strictly the end point of the planarization process. However, in the process II, since a hard matrix material is disposed on the lower side and a magnetic material is disposed on the upper side, the management of the end point is relatively easy in any of the planarization processes. The processes after the planarization can be implemented correspondingly to the process I.

In both of the above described processes I and II, the magnetic properties of the medium can also be adjusted by the temperature for forming the magnetic material or annealing after the formation of the magnetic particles. In both of the above described processes I and II, it is possible to manufacture a magnetic recording medium in which a plurality of magnetic particles are arrayed regularly in a continuous non-magnetic film, and in which, with respect to the magnetic particles included in a maximum magnetic recording cell, at least four particles are arrayed in the track length direction, the full width at half maximum of distribution in distance between the closest particles is ±40% or less of the average distance between the closest particles, and the full width at half maximum of particle diameter distribution is ±20% or less of the average particle diameter.

Figure 18A:
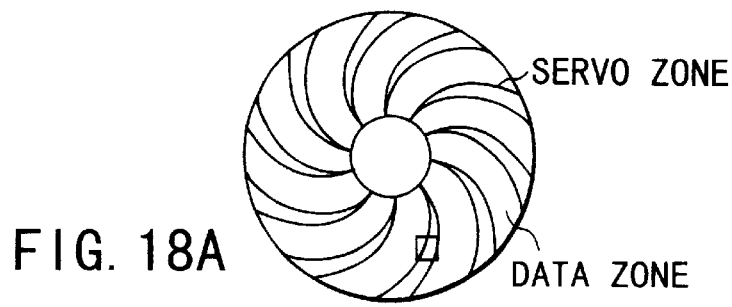
FIG. 18A is a schematic view showing an example of a servo pattern of a magnetic disk according to the present invention.
Figure 18B:
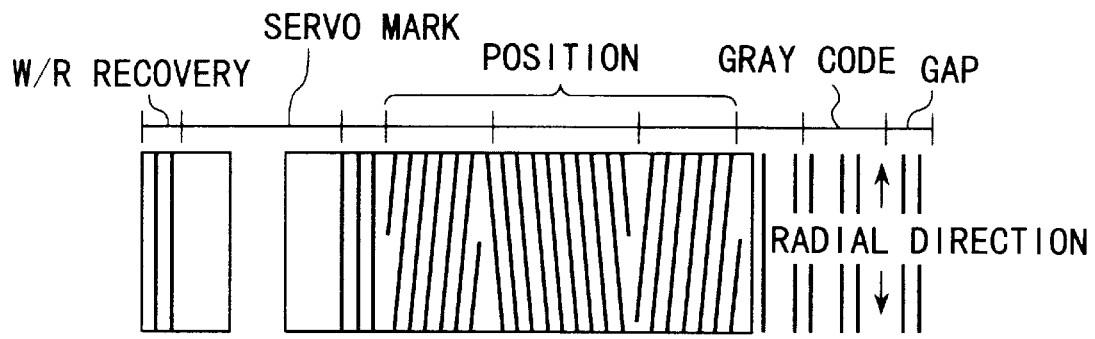
FIG. 18B is a schematic view showing a microstructure of the servo pattern.

Next, a method of manufacturing an ordered magnetic particle medium having a servo pattern will be described. FIG. 18 is a schematic view showing an example of a servo pattern of a magnetic disk; FIG. 18A shows an example of arrangement; and FIG. 18B shows a microstructure of the servo pattern. When the present invention is applied to a magnetic medium having the servo pattern, the following three embodiments are considered. That is, (i) an embodiment in which magnetic particles are formed after the servo pattern is formed; (ii) an embodiment in which the servo pattern and magnetic particles are formed simultaneously; and (iii) an embodiment in which the servo pattern is formed after the magnetic particles are formed. Hereinafter, each of these embodiments will be described.

(i) In the embodiment in which the magnetic particles are formed after the servo pattern is formed, a series of steps as described below can be applied as disclosed in, for example, Japan Applied Magnetic Engineering Society, the 103-th Research Meeting Document Page 75. (a) A servo pattern is formed on a substrate using a resist. (b) The pattern is transferred to a substrate surface using the resist as a mask. (c) A magnetic film for servo is filled in the substrate. (d) The resist and the magnetic film on the resist are lifted off. (e) The surface is planarized. After the embedded servo is formed, an ordered magnetic particle medium is formed as described above.

(ii) An embodiment in which the servo pattern and the regular magnetic particle portions simultaneously can be achieved by providing a servo pattern in a part of the self-organized mask in advance. Specifically, for example, in a transfer process for forming a mask from a porous alumite, a part of the resist may be exposed and developed according to the servo pattern.

(iii) In an embodiment in which the servo pattern is formed after the regular magnetic particles are formed, a resist is patterned on the regularly arrayed magnetic particles, a data region including a plurality of magnetic particles is maintained as is, only a servo region is etched as required, and a magnetic film for servo is filled.

(B) Method of Manufacturing an Ordered Non-magnetic Pore Medium

The ordered non-magnetic pore medium as shown in FIG. 14 can be provided correspondingly to the manufacturing method of the ordered magnetic particle medium shown in FIG. 17. That is, in the process flow of the ordered magnetic particle medium shown in FIG. 17, a magnetic layer and a matrix layer are reversed, and magnetic particles and matrix are reversed. In this method also, the processes I and II as shown in FIG. 17 can be applied.

(1) Process I (a) A non-magnetic matrix layer is formed on a substrate. A seed layer and a protective layer may be or may not be formed. (b) A resist is coated on the non-magnetic matrix layer. (c) The substrate is disposed immediately under the self-organized mask fabricated as described above. (d) The resist is exposed by irradiating with light or irradiating with electron beam through the mask. After the exposure, the resist is developed. When a positive resist is employed, only an exposed portion remains as a pattern on the magnetic layer by the development process. The resist pattern coincides with an honeycomb pattern of the hole of the self-organized mask. (e) The resist pattern is transferred to the non-magnetic matrix by an ion milling method or an RIE method. The ion milling method is carried out with employing an ion source having a greater diameter than the substrate (a disk substrate in the case of HDD application) on which the matrix layer is formed, or by rotating the substrate under an ion source having a smaller diameter. The milling rates of the resist, non-magnetic layer, seed layer, and protective layer are examined in advance. The milling time is set by referring to the examined rates, thereby making it possible to pattern only a matrix layer into regular columnar non-magnetic particles before the resist is milled off. The seed layer remains as is under the non-magnetic particles. The seed layer between non-magnetic particles may be milled. (f) After the non-magnetic layer is patterned in this manner, the residual resist is removed as required (utilizing ashing, dipping or the like). (g) A magnetic material is filled between the non-magnetic particles. The filling can be carried out by the deposition method such as CVD, sputtering, or evaporation. In view of the filling properties of the magnetic material between the non-magnetic particles, an anisotropic deposition method such as collimation sputtering is preferred. However, since the filling depth (a depth substantially equal to thickness of the non-magnetic particles) is about 10 nm, which is very small, the filling can be performed relatively well by employing any method. (h) After the magnetic material has been filled, the surface of the medium is made into an uneven surface, and thus, a planarization process is applied to the medium surface as required. The surface planarization process includes, for example, waffle vanishing, tape vanishing, CMP, ion polishing, or a combination thereof. (i) After the planarization process, a protective film is coated on the surface of the medium. (j) Although it is not shown in FIG. 17, lastly, a lubricant layer is coated on the surface of the medium, like in a typical magnetic medium. The lubricant layer may be coated on the surface of the medium instead of the protective film.

(2) Process II (a) A continuous magnetic layer is formed on a substrate. As described above, a seed layer or a protective layer may be or may not be formed. (b) The substrate is disposed immediately under a self-organized mask. (c) The magnetic material is patterned by an ion milling method or an RIE method corresponding to the self-organized mask. By the patterning, plural pores arrayed regularly are formed in the magnetic material. (d) A non-magnetic particle material is filled in the pores formed in the magnetic material. In this filling, an anisotropic deposition method such as collimation sputtering is preferably applied. However, since the thickness for filling is about 50 nm at maximum, no problem is brought about in practical point of view even if a typical isotropy deposition is employed. (e) After filling the non-magnetic particles, surface planarization is carried out in a similar method to the process I such as vanishing, CMP, or ion polishing.

In the process II, a soft magnetic material is disposed on the lower side, and a non-magnetic matrix material harder than the magnetic material is disposed on the upper side. Therefore, it is required to manage strictly the end point of planarization. On the other hand, in the process I, since a non-magnetic matrix material is disposed on the lower side, and the magnetic material is disposed on the upper side, the management of the end point is relatively easy in any of the planarization processes. The processes after planarization can be implemented correspondingly to the process I.

In both of the above described processes I and II, it is possible to manufacture a magnetic recording medium in which a plurality of non-magnetic pores are arrayed regularly in a continuous magnetic film, and in which magnetization transitions in the magnetic film consist of domain walls connecting the non-magnetic pores, the average diameter of the non-magnetic pores is 0.5 to 3 times of the average width of the domain walls, and to manufacture a magnetic recording medium in which the full width at half maximum of distribution in distance between the closest pores in the minimum magnetic recording cell is 40% or less of the average distance between the closest pores in addition to these features. Also, in both of the aforementioned processes I and II, it is possible to adjust the magnetic properties of the medium by the temperature for forming magnetic material or annealing after the after the formation of the magnetic particles.

Next, a method manufacturing an ordered non-magnetic pore medium having a servo pattern will be described. As a servo pattern, like in the ordered magnetic particle medium, the pattern shown in FIG. 18 can be employed, for example. When the present invention is applied to a medium having the servo pattern, the following three embodiments are considered. That is, (i) an embodiment in which non-magnetic pores are formed after the servo pattern is formed; (ii) an embodiment in which the servo pattern and the non-magnetic pores are formed simultaneously; and (iii) an embodiment in which the servo pattern is formed after the non-magnetic pores are formed. Hereinafter, each of these embodiments will be described.

(i) In the embodiment in which the non-magnetic pores are formed after the servo pattern is formed, a series of steps as described below can be applied as disclosed in, for example, Japanese Applied Magnetic Engineering Society, the 103-th Research Meeting Document P. 75. (a) A servo pattern is formed on a substrate using a resist. (b) The pattern is transferred to the substrate surface using the resist as a mask. (c) A magnetic film for servo is filled in the substrate. (d) The resist and the magnetic film on the resist are lifted off. (e) The surface is planarized. After the embedded servo is formed, an ordered non-magnetic pore medium is formed as described above.

(ii) An embodiment in which the servo pattern and the non-magnetic pore portions are formed simultaneously can be achieved by providing a servo pattern in a part of the self-organized mask in advance.

Specifically, for example, in a transfer process for forming a mask from a porous alumite, a part of the resist may be exposed and developed according to the servo pattern.

(iii) In an embodiment in which the servo pattern is formed after the non-magnetic pore portions are formed, a resist is patterned on the regularly arrayed non-magnetic pores, a data region including a plurality of non-magnetic pores is maintained as is, only a servo region is etched as required, and a magnetic film for servo is filled.

Next, a method of manufacturing a magnetic recording medium according to the present invention without employing the aforementioned self-organized mask will be described. As an example, a method of manufacturing an ordered magnetic particle medium according to the present invention will be described here.

Figure 19:
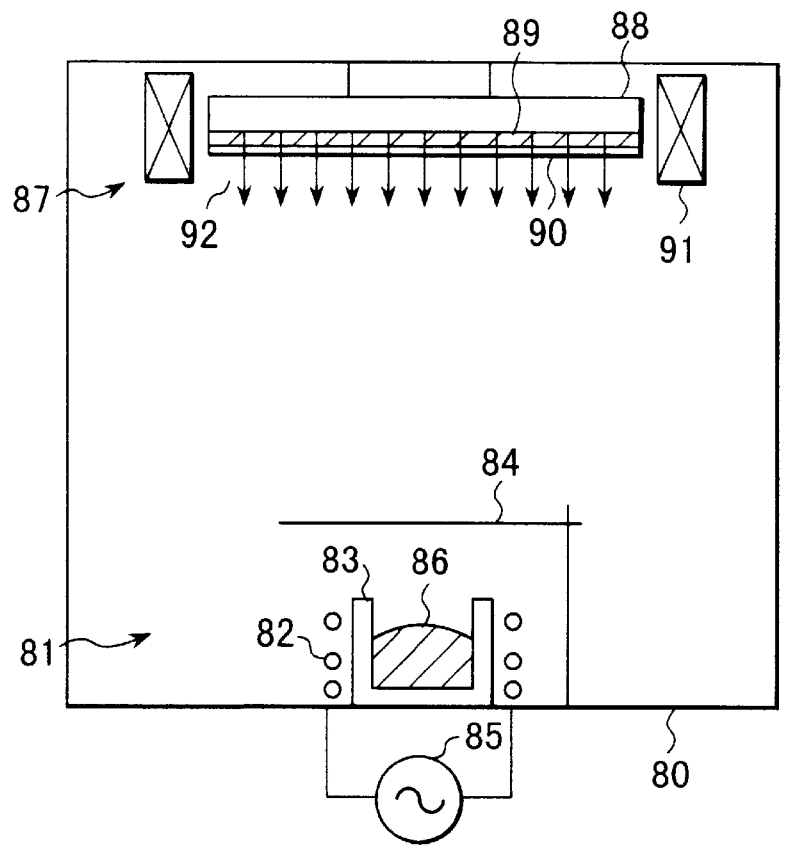
FIG. 19 is a schematic view showing an example of an apparatus for manufacturing an ordered magnetic particle medium according to the present invention.

FIG. 19 is a schematic view showing an example of an apparatus for manufacturing an ordered magnetic particle medium without employing a mask. The apparatus shown in FIG. 19 comprises the vacuum chamber 80 connected to a gas introducing system and an exhaust system. An inductive-type evaporation source 81 is disposed at the lower portion of the vacuum chamber 80. The evaporation source 81 comprises the crucible 23 around which the heater 82 is wound, and the shutter 84 disposed over the crucible 83. The heater 22 is connected to the RF power source 85 disposed outside of the chamber 80. The evaporation sample 86 employed for evaporation is charged in the crucible 83. The superconductor part 87 is disposed at the upper portion of the vacuum chamber 80. The superconductor part 87 comprises the cold head 88 suspended from the upper portion, the superconductor 89 mounted on the lower surface of the cold head 88, the magnetic disk substrate 90 mounted on the lower surface of the superconductor 89, and the coil 91 for applying magnetic field disposed at the side portion of these members. The coil 91 is also suspended from the upper portion.

The ordered magnetic particle medium can be manufactured by employing the apparatus shown in FIG. 19 according to the following procedure.

(a) The vacuum chamber 80 is evacuated to $10^{-4}$ Pa or less, and then the cold head 88 is operated to cool the superconductor 89 to a temperature at which a superconductive state is exhibited.

(b) A current is flowed through the coil 91 for applying magnetic field to apply a magnetic field in a direction perpendicular to the superconductor 89. When the magnetic field is applied to the superconductor 89 in a superconductive state, eddy currents in a shape of triangle-lattice flow, which are regularly arrayed in the superconductor 89. A magnetic field 92 perpendicular to the surface of the superconductor 89 is generated from the center of each eddy current, and the magnetic field 92 is not generated at a portion other than the eddy current center. That is, a pattern of the magnetic field 92 having a magnetic flux perpendicular to the surface arrayed regularly in the triangle-lattice shape is formed on the surface of the superconductor 89. The distance between the patterns of the magnetic field 92 depends on type of superconductor 89 and the magnetic field strength applied. For example, in the case where YBCO oxide high-temperature superconductor is employed for the superconductor 89 and the applied magnetic field is set to 1 T, the distance between the patterns of the magnetic field 92 becomes 50 nm or less, which indicates a preferred value for practice of the present invention. The distance between the patterns of the magnetic field 92 is reverse proportional to the square root of the applied magnetic field strength, thus making it possible to narrow the distance by increasing the magnetic field strength. For example, when YBCO is employed as the superconductor 89, the pattern distance of the magnetic field 32 is 25 to 50 nm.

(c) Magnetic fine particles (not shown) are evaporated on the patterns of the magnetic field 92 formed on the surface of the superconductor 89 in a self-organizing manner. An in-gas evaporation method or the like can be applied for evaporation of magnetic fine particles. For example, a magnetic material such as CoPt is employed as a raw material and is mixed in the evaporation sample 86, and the magnetic material is evaporated by inductive heating. Specifically, when the RF power source 85 is operated with the shutter 84 being closed and a current is flowed through the inductive coil 22, heating and evaporation of the magnetic material occur.

(d) An inert gas of about several tens to several hundreds of Pa is introduced into the vacuum chamber 80. As a result, the evaporated magnetic material is overcooled in gas phase, and thus, magnetic clusters of, for example, sub-nm to several tens ofnm in diameter are formed.

(e) The shutter 84 is opened to introduce the magnetic clusters onto the substrate 90 on which an ordered magnetic field pattern is formed. The magnetic clusters do not scarcely have motion energy, and thus, flies toward the substrate 30 randomly. However, the clusters are arrayed regularly on the substrate according to the pattern of the magnetic field 92 arrayed regularly in the vicinity of the substrate 90. In this manner, regular magnetic particles can be formed on the substrate 90.

(f) The medium forming process after the regular magnetic particles are obtained can be implemented in a manner similar to the processes for forming the aforementioned ordered magnetic particle medium. Also, the properties of the ordered magnetic particle medium obtained by such a method is similar to those of the ordered magnetic particle medium formed by employing the aforementioned self-organized mask.

As described above in detail, by employing the present invention, recording density can be significantly improved without applying particular burden upon elemental techniques other than magnetic recording medium such as head, servo, or signal processing device.

The medium according to the present invention can be easily combined with another methods to ensure high recording density. Some of these combinations are exemplified below.

A combination between the medium according to the present invention and a perpendicular recording system has already been described in the specification. Higher recording density can be obtained if the combination between the medium according to the present invention with a single magnetic pole head suitable to perpendicular recording is implemented.

The medium according to the present invention can be easily combined with a thermal assisted recording system. The thermal assisted recording system adopts a medium with very high magnetic anisotropy at room temperature and improves thermal disturbance resistance, making it possible to ensure finer particles. In a conventional technique, when a recording medium with high magnetic anisotropy is used, a large magnetic field is required to perform magnetic recording, which is not practical in view of a excessively large burden upon the head. On the other hand, in the thermal assisted recording system, only a recording portion is heated by employing a laser beam or the like, and anisotropy, i.e., recording magnetic field is lowered only for a period of recording. By applying such method, particle diameter can be made small even multigrain random medium, thus making it possible to ensure high density. In the ordered magnetic particle medium according to the present invention, it is also possible to adopt a magnetic particle material with high magnetic anisotropy and to perform light thermal assist during magnetic recording. Therefore, remarkable high recording density can be expected by combining the medium according to the present invention and the thermal assisted recording system.

In addition to the above, any combination with other methods can be employed without departing from the spirit of the present invention, for example, a combination with a medium employing a keeper layer disclosed in IEEE Trans. Magn. 34 (4) 1552 and 1555, 1998; and a combination with a perpendicular medium for reducing a burst noise employing semi-hard magnetic underlayer instead of soft magnetic underlayer.

EXAMPLES

Example 1

A magnetic recording medium is fabricated according to the first method employing a block copolymer.

First, a block copolymer, containing polystyrene and polyisoprene at a ratio of 7:3, and having a molecular weight Mw of about 500,000, dispersion of molecular weight being 1.1 or less, is dissolved in a cellosolve-based solvent to prepare a solution. The solution is spin-coated onto a 2.5-inch glass substrate to form a block copolymer layer having a thickness of about 30 nm. The glass substrate is placed in a thermostat, and is annealed at 150° C. for 24 hours and at 120° C. for 2 hours, and then is returned to room temperature. The surface of the glass substrate is observed with a scanning electron microscope. As a result, it is confirmed that the sample is phase separated into a sea-island structure in which islands of 13 nm in average diameter are arrayed regularly with an average distance of 30 nm in sea surrounding the islands.

The sample is subjected to ozone treatment, and then reactive ion etching (RIE) employing $CF_4$ is performed. As a result, only island regions of the block copolymer are etched. From film thickness measurement, it is found that a selectivity ratio of sea to islands is 1:4 under RIE using $CF_4$.

A CoPtCr thin film of 15 nm is deposited on the etched sample by sputtering. The sample is immersed in a cellosolve-based solvent to perform ultrasonic cleaning, thereby removing (lifting-off) the polymer layer and the CoCrPt film on the polymer layer.

The surface of the sample is observed with a scanning electron microscope. As a result, an ordered particle domain structure as shown in FIG. 4 is observed. More specifically, observed is a structure in which CoPtCr magnetic particles having a diameter of about 13 nm are arrayed regularly in the glass matrix. The ordered particle domains have isotropic shape, and their average diameter is about 200 nm.

In order to employ the sample as a high-density magnetic recording medium, a protective film consisting of carbon having a thickness of 10 nm is deposited by sputtering. The sample is subjected to tape vanishing to remove anomalous projections, and then a lubricant is applied thereto.

When magnetic characteristics are measured, the sample represents perpendicular magnetic anisotropy of 2 kOe in coercivity.

Other samples are prepared by similar procedures described as above with varying annealing time for block copolymer. As a result, CoPtCr—$SiO_2$ magnetic recording media, having an ordered state as shown in FIG. 4, and different in size of ordered particle domain to each other, are obtained.

Figure 20:
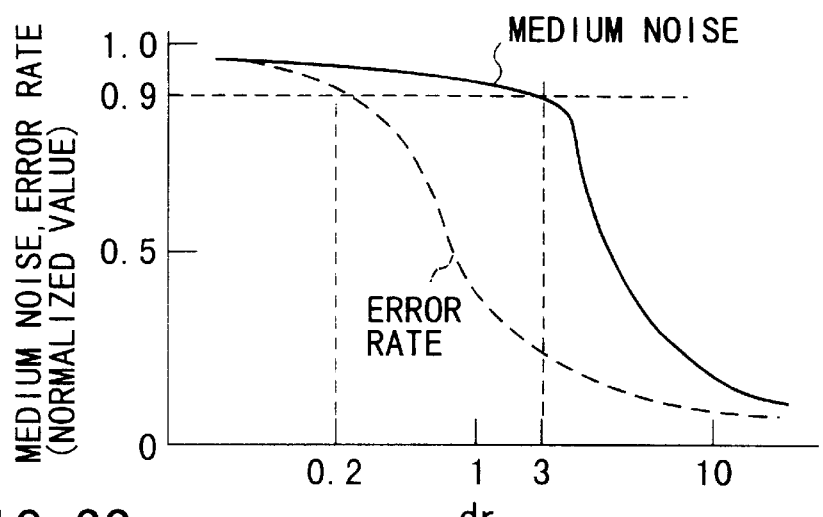
FIG. 20 is a graph showing a relationship between a domain size in a track width direction and a medium noise power or error rate in an Example of the present invention.

As for these samples, random recording is performed with a frequency up to 400 kfci, and then bit error rate is examined. For channel, 16/17EPR4ML is adopted. The measurement result is shown in FIG. 20. In FIG. 20, the horizontal axis denotes an average size dr of ordered particle domain in track width direction (radial direction). The unit of the dr value is a track width Wt, i.e., a size of recorded magnetic domain in the radial direction. The vertical axis denotes medium noise power measured when recording is performed at an single frequency of 300 kfci and error rate measured when recording is performed under above random recording conditions. These values are normalized by those of conventional random medium having no ordered particle domain (dr=0).

As shown in FIG. 20, an error rate at about dr=1/5 is 90% of that of conventional medium, thus it is confirmed that the medium of the present invention exhibits a useful effect on a magnetic recording system. In addition, it is observed that medium noise tends to decrease abruptly at about dr=3. Thus, since the magnetic recording medium of the present invention can reduce medium noise and error rate, it can improve recording density compared with the conventional random magnetic particle medium that does not cause thermal fluctuation.

The reason that above effect is obtained is supposed as follows. In the magnetic recording medium of the present invention, since the magnetic particles are arrayed regularly, magnetization transition region generated by a magnetic head is made in a state quantized by magnetic particles. In this case, disorder of transition is as large as a distance between the magnetic particles at maximum, which is remarkably small as compared with that of the conventional medium in which magnetic particles having various sizes are randomly arranged. At the same time, in the magnetic recording medium of the present invention, since a sharp magnetization transition is formed on a track edge by the same reason described as above, noise due to disorder of track edge is reduced. Therefore, medium noise is reduced as the size of the ordered particle domain is increased.

On the other hand, during one rotation of a disk, a head crosses many ordered particle domains. In this case, magnetization transition width differ every ordered particle domain because of dispersion of array axes of ordered particle domains. In the case where dr>1, fluctuation of transition width is constant in a single ordered particle domain, but it differs between ordered particle domains. The difference in fluctuation of transition width in the ordered particle domains is represented as transition jitters in reproducing signals. On the contrary, in the case where dr<1, fluctuation of transition width in one ordered particle domain is averaged. For example, in the case where dr =1/3, fluctuation of transition width is averaged to 1/3. Therefore, because the average transition jitter is not changed but its change with time is reduced, jitter affects less adversely, and so the effect to reduce the error rate is obtained. However, when dr becomes more smaller, i.e., dr<1/5, the effect of arrayed particles is lost. More specifically, though the change in transition jitter with time is reduced, jitter and noise are increased as almost high as that od random magnetic particle medium.

As described above, it is supposed that, due to both of the effects of reducing medium noise and reducing the change in transition region with time, the effect of reducing the error rate with the size of ordered particle domain in the range of dr =1/5 or more as shown in FIG. 20. It is considered that the effects of media having dr of 1/5 to 3 are not clearly exhibited in the medium noise measurement after recording under single frequency because of low sensitivity.

Example 2

A magnetic recording medium is fabricated in a manner similar to that in example 1 except that a glass substrate is subjected to RIE followed by depositing CoCrTaPt as a magnetic layer and Cr as an underlayer by means of sputtering. The magnetic recording medium in this example exhibits in-plane magnetic anisotropy, and has coercivity of 1.8 kOe.

For the purpose of reducing a height of abnormal projection height than that of example 1, burrs or the like are removed by chemical mechanical polishing after the lift-off process. As a result, the head flying height is reduced to 40 nm.

Next, the recording media having different sizes in ordered particle domain are fabricated by changing annealing time for block copolymer. Recording at a single frequency up to 300 kfci is carried out for each sample different in ordered particle domain size, reproducing signals are investigated on the same head, and medium noise power is measured. In these measurements, the similar result to that shown in FIG. 20 is obtained. From the foregoing, it is found that the relationship shown in FIG. 20 is less affected by material and magnetic characteristics of the magnetic recording medium.

Example 3

A magnetic recording medium is fabricated according to the second method employing a block copolymer.

First, ZnO of 13 nm is deposited on a NiP plated Al substrate of 2.5 inches by sputtering. After ZnO had been deposited, spin-coating of block copolymer; annealing; ozone treatment; PIE process; 13 nm-thick CoPtCr sputter deposition; lift-of process; protective layer deposition; and post-treatment are carried out in the same elemental processes as those in example 1.

The NiP layer serves as a stop layer for RIE so that the RIE reaction time can be increased to remove ZnO completely. The RIE reaction time is increased, and the ZnO under island is completely removed. The obtained magnetic recording medium exhibits magnetic characteristics having in-plane coercivity of 2 kOe and perpendicular coercivity of 1.5 kOe.

In addition, by establishing various conditions, RIE is performed so as not to remove ZnO completely, and then CoPtCr having a thickness of 10 nm is deposited. The obtained magnetic recording medium exhibits perpendicular magnetic anisotropy of 2.5 kOe.

Example 4

A magnetic recording medium is fabricated according to the third method employing a block copolymer.

First, Cr of 80 nm and SiN of 15 nm are deposited on a NiP plated Al substrate of 2.5 inches. Thereafter, spin-coating of block copolymer; annealing; ozone treatment; RIE; sputter deposition of CoCrTaPt of 15 nm; lift-off process; protective layer deposition; and post-treatment are carried out in the same elemental processes as those in example 1.

The Cr layer serves as a stop layer for RIE so that the RIE reaction time can be increased to remove SiN under islands completely. The obtained magnetic recording medium exhibits magnetic characteristics having in-plane coercivity of 2 kOe. In addition, the coercivity is increased to 2.6 kOe by depositing Ti of 15 nm under the Cr underlayer. This is because the crystallinity of the Cr underlayer is improved by the Ti layer, whereby the magnetic anisotropy of CoCrTaPt is increased.

Next, recording media are fabricated by changing the thickness of the Cr layer and the Ti layer variously. The obtained samples are observed by a transmission electron microscope. As a result, various samples are obtained whose average distance between CoCr-based crystal grains constituting magnetic particles are in a range of 1 to 4 nm.

Figure 21:
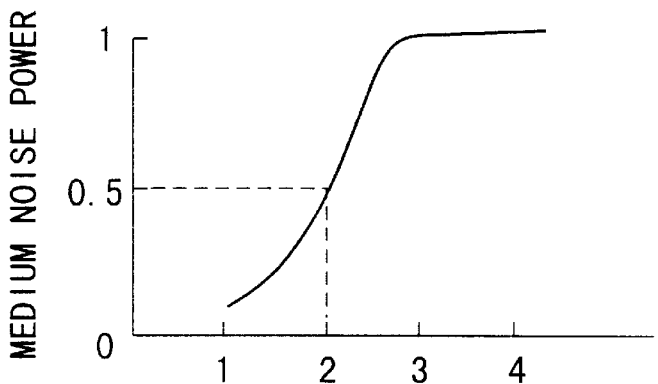
FIG. 21 is a graph showing a relationship between an average distance between magnetic particles and medium noise power in an Example of the present invention.

Recording at a single frequency up to 200 kfci is carried out, reproducing signals are investigated with the same head, and medium noise power is measured for each of samples. The measurement result is shown in FIG. 21. In FIG. 21, a horizontal axis denotes an average distance between the CoCr-based crystal grains, and a vertical axis denotes medium noise power. The medium noise power on the vertical axis is normalized by a value of a medium in which the average distance between crystal grains is 4 nm.

As shown in FIG. 21, an abrupt increase in noise is observed at 2 nm or more of average distance between crystal particles. This is because multiple magnetic domains are formed inside the magnetic particles when the average distance between crystal grains becomes 2 nm or more. In addition, with respect to crystal grains of smaller size, a great lowering of magnetic anisotropy due to influence of superparamagnetic characteristics is observed where the average distance between crystal grains is 2 nm or more.

Next, Ti of 15 nm, Cr of 80 nm, and SiN of 15 nm are deposited on a NiP plated Al substrate of 2.5 inches. Thereafter, spin-coating of block copolymer; annealing; ozone treatment; RIE; sputter deposition of CoCrTaPt of 15 nm; lift-off process; deposition of a protective layer; and post-treatment are carried out in the same elemental processes as those in example 1. Magnetic recording media different in average size of magnetic particles and in average distance between magnetic particles are fabricated by changing the mixing ratio, molecular weight, and molecular weight dispersion of polystyrene and polyisoprene in block copolymers.

Figure 22:
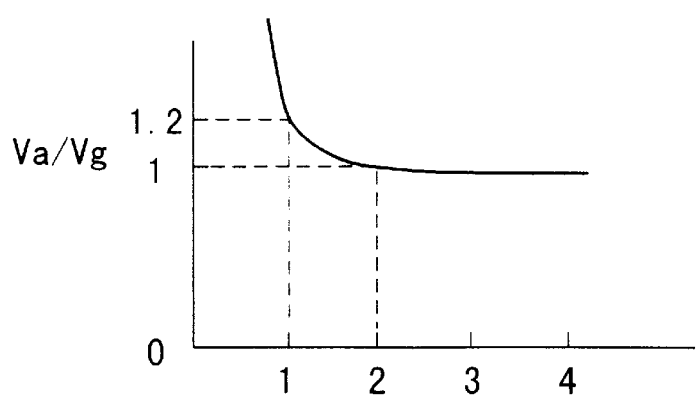
FIG. 22 is a graph showing a relationship between an average distance between magnetic particles and an activation volume in an Example of the present invention.

With the recording medium having average particle size of 12 nm, a relationship between an activation volume Va obtained by evaluation of an activation magnetic moment and an average distance between magnetic grains is determined. The measurement result is shown in FIG. 22. In FIG. 22, a horizontal axis denotes an average distance between magnetic grains, and a vertical axis denotes Va normalized by volume Vg of magnetic grains.

As shown in FIG. 22, Va agrees with Vg, i.e., Va/Vg=1 when the average distance between magnetic grains is approximately 2 nm or more, Va/Vg=1.2 when the average distance is 1 nm, and the Va/Vg abruptly increases when the average distance is 1 nm or less. As is evident from the results, in the magnetic recording medium according to this example, it is found that the average distance between magnetic grains is preferably 1 nm or more, and is more preferably 2 nm or more.

Example 5

A magnetic recording medium is fabricated according to the third method employing a block copolymer.

First, Cr of 80 nm and SiN of 15 nm are deposited on a NiP plated glass substrate of 2.5 inches. Thereafter, spin-coating of block polymer and annealing are carried out in the same elemental processes as those in example 1.

After the annealing, Os treatment (osmium-stained) is performed instead of ozone treatment in example 1. As a result of the Os treatment, the etching ratio for RIE by using $CF_4/O_2$ gas becomes island:sea=1:3.2.

After the Os treatment, RIE; sputter deposition of CoCrTaPt of 15 nm; lift-off process; deposition of a protective layer; and post-treatment are carried out.

The thus obtained sample is observed by a transmission electron microscope and a magnetic force microscope (MFM). As a result, a self-organized array structure as shown in FIG. 5 is confirmed. More specifically, ordered particle domains in which SiN non-magnetic particles of 7 nm are arrayed regularly in the CoCrTaPt magnetic matrix are formed. The shape of the domains is isotropic, and the average size is about 500 nm.

Next, magnetic recording media are fabricated by changing sputtering pressure during CoCrTaPt deposition variously. As a result, various samples whose average distance between magnetic crystal grains constituting the CoCrTaPt matrix are in a range of 1 to 4 nm are obtained. With respect to these samples, activation volume evaluation is carried out by activation magnetic moment measurement. The measurement results are similar to those of FIG. 22 except that the horizontal axis is defined as an average distance between non-magnetic particles.

In order to achieve high-density magnetic recording by shortening the magnetization transition regions, grain size of magnetic crystal grains corresponding to a unit of magnetization reversal must be reduced. However, if the crystal grains are small, magnetic recording itself is made impossible due to influence of thermal fluctuation. In the magnetic recording medium of the present invention, the average distance between magnetic crystal grains preferably is 2 nm or less, and more preferable is 1 nm or less in so as to meet a condition of Va>Vg in the magnetic matrix.

Next, likewise in example 1, samples different in sizes of ordered particle domains are prepared by changing annealing time for block copolymer. With respect to these samples, a relationship between the size of ordered particle domains in a track width direction (radial direction of a disk) and medium noise is investigated. The measurement results are similar to those in FIG. 20. From the foregoing, in order to obtain a low-noise medium, it is found that the size of ordered particle domains must be 1/5 or more of the track width (recorded magnetic domain width) on the medium or of the track width of the reproducing head.

Thus, it is considered that the reason why the same results as those in example 1 are obtained is as follows. When a domain wall in the magnetic matrix is pinned by a non-magnetic particle, the domain wall is disposed on a line connecting non-magnetic particles so as to minimize total free energy, so that the same situation is achieved as the case where isolated magnetic particles are arrayed as in example 1.

Then, magnetic recording media different in particle diameters of non-magnetic particles are fabricated by changing mixing ratio, molecular weight, and molecular weight dispersion of polystyrene and polyisoprene of block copolymer. With respect to these samples, magnetic domains in a demagnetized state are observed with MFM. As a result, it is found that domain walls cannot be pinned sufficiently unless the particle diameter of non-magnetic particles is 1 nm or more.

Figure 23:
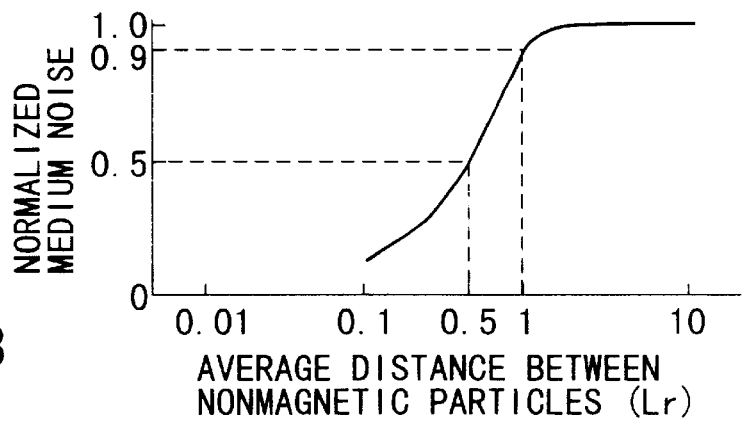
FIG. 23 is a graph showing a relationship between an average distance between non-magnetic particles and medium noise power in an Example of the present invention.

Then, samples different in distance between non-magnetic particles are fabricated. A relationship between the distance between non-magnetic particles and the medium noise power is measured. The measurement results are shown in FIG. 23. A horizontal axis denotes an average distance between non-magnetic particles in a track width direction represented by a unit of a track width Wr of a reproducing head. A vertical axis denotes medium noise power, which is normalized by a value of a medium having an average distance between non-magnetic particles of 10×Wr or more. When the average distance between non-magnetic particles is Wr or more, an effect of medium noise reduction is obscure; however, the medium noise is reduced to 90% when the average distance is identical to Wr, and is reduced to 50% when the average distance is a half Wr. A medium having an average distance of 0.1×Wr or less cannot be fabricated. However, when the average distance is approximately 0.01×Wr or less, the minimum recording cell is fully covered with non-magnetic particles, and therefore, it is meaningless to reduce extremely the average distance between non-magnetic particles.

When the average distance between non-magnetic particles is represented by a unit of a track width Wt on a medium, not by a unit of a track width Wr of a reproducing head, similar results as above are also obtained.

Example 6

A magnetic recording medium was fabricated according to the fourth method employing a block copolymer.

First, a Cr underlayer of 80 nm and a CoPtCr thin film of 15 nm were deposited on a 2.5-inch glass substrate of by general sputtering. Thereafter, spin-coating of a block polymer; annealing; ozone treatment; RIE; sputter deposition of a BN matrix layer of 15 nm; lift-off process; protective layer deposition; and post-treatment were carried out in the same elemental processes as those in example 1. However, in the RIE process, plasma gas consisting of carbon monoxide and ammonia was employed instead of $CF_4$ and the sample was heated to 110° C. during RIE. The ratio of etching speed for island to sea in the block copolymer was 3:1.

The obtained sample was observed with a transmission electron microscope. As a result, ordered particle domains as shown in FIG. 4 were observed. More specifically, formed were ordered particle domains in which CoPtCr magnetic particles having a diameter of about 14 nm were arrayed regularly in the BN matrix. The shape of ordered particle domains was isotropic, and the average diameter thereof was about 800 nm. When the magnetic characteristics of the sample were measured, it was found that the sample had in-plane magnetic anisotropy having coercivity of 1.8 kOe.

Samples were fabricated by changing RIE process time variously. With respect to each of these samples, sectional structure was observed with a transmission electron microscope (TEM). As a result, it was found that the structure varied from FIG. 6 to FIG. 7 and further FIG. 8 with the RIE process time was shortened. In the samples having such structure as shown in FIG. 6, a difference in thickness of the underlayer was 2 nm. In the sample having such structure as shown in FIG. 7, an interface layer covered about 60% of the area for the non-magnetic matrix, and had an average thickness of 1 nm. In the sample having such a structure as shown in FIG. 8, an average thickness of the interface layer was 3 nm.

With respect to each of the samples fabricated with different RIE process times, the composition distribution in a magnetic particle portion on the surface of the medium was measured with analytical TEM. As a result of the measurements, the differences in Cr composition between a central region and a marginal region in the magnetic particle were found to be 10%, 15%, and 22%, for the samples having structures shown in FIGS. 6, 7 and 8, respectively.

Next, experiments in which thermal load was applied to the magnetic recording media by ashing and CMP were carried out. By these processes, Cr diffused from the underlayer reached up to an initial layer of the CoCrTaPt for the sample having such a structure as shown in FIG. 6, and there is no change in Cr composition ratio in the marginal region of the magnetic particle. For the samples having such structures as shown in FIGS. 7 and 8, 3% and 5% increases in Cr composition ratio were observed, respectively.

Then, peeling tests using an adhesive tape were carried out. Specifically, a mesh having a total of 100 squares of 10×10 arranged with intervals of 1 mm was engraved on each of the magnetic recording media by using a cutter knife, and then a measurement was performed as to what percentage thereof would be peeled off together with the adhesive tape. As a result of the measurement, the peel-off rates were 13%, 5%, and 0% for the respective samples having such structures as shown in FIGS. 6, 7 and 8.

When the coercivities of the samples having such structures as shown in FIGS. 6, 7 and 8 was measured, the coercivities were 1.8 kOe, 2 kOe, and 2.8 kOe for the respective structures. The lattice image in each structure was investigated by using sectional TEM. In the structure as shown in FIG. 8, the initial layer portion was formed continuously in the medium plane. It was considered that the crystalline magnetic anisotropy was improved due to the continuous initial layer portion, whereby a high coercivity was obtained.

As described above, it is possible to fabricate a recording media having such a structure as shown in FIGS. 6, 7 or 8 by changing the RIE process time. It cannot be generally determined as to which of the above structures of the recording medium is the most superior. It depends on a system employing a recording medium. Conversely, the recording media of the present invention are freely selected depending on a system to which a medium applied.

Example 7

A magnetic recording medium was fabricated according to a process similar to that in example 1 except that a polymer layer was removed prior to deposition of a magnetic layer. That is, at the time when spin-coating of a block copolymer onto a substrate, annealing, ozone treatment, and RIE were carried out, removal of a block copolymer using a solvent and oxygen ashing were carried out. After the ashing, deposition of 13 nm-thick CoPtCr by sputtering, CMP, deposition of a protective layer, and post-treatment were carried out.

When magnetic characteristics of the thus fabricated sample was measured, the magnetic characteristics thereof were similar to those of samples obtained in example 1, but a glide height could be reduced to 50%. Advantages and disadvantages of the magnetic recording medium obtained in example 1 or in this example are a matter to be determined depending on the requirements of the system to which the medium is applied.

Next, a magnetic recording medium was fabricated according to a process similar to that in example 3 except that a block copolymer was removed prior to sputter deposition of 13 nm-thick CoPtCr. That is, after RIE process, removal of a block copolymer using a solvent and oxygen ashing were carried out, a 13 nm-thick CoPtCr was deposited by sputtering, and further CMP, deposition of a protective layer and post-treatment were carried out.

The magnetic characteristics of the thus obtained recording medium were similar to those of the recording medium obtained in example 3, but the glide height could be reduced by 50%. Advantages and disadvantages of the magnetic recording medium obtained in example 3 or in this example are a matter to be determined depending on the requirements of the system to which the medium is applied.

Then, a magnetic recording medium was fabricated according to a process similar to that in example 4 except that a block copolymer is removed before sputter deposition of 15 nm-thick CoCrTaPt. That is, after RIE process, removal of a block copolymer using a solvent and oxygen ashing were carried out, a 15 nm-thick CoCrTaPt was deposited by sputtering, and further CMP, deposition of a protective layer and post-treatment were carried out.

The magnetic characteristics of the thus obtained recording medium were similar to those of the recording medium obtained in example 4, but the glide height could be reduced by 50%. Advantages and disadvantages of the magnetic recording medium obtained in example 4 or in this example are a matter to be determined depending on the requirements of the system to which the medium is applied.

Next, a magnetic recording medium was fabricated according to a process similar to that in example 6 except that a block copolymer is removed prior to sputter deposition of a 15 nm-thick BN matrix layer. That is, after RIE process, removal of a block copolymer using a solvent and oxygen ashing were carried out, a 15 nm-thick BN matrix layer was deposited by sputtering, and further CMP, deposition of a protective layer and post-treatment were carried out.

The magnetic characteristics of the thus obtained recording medium were similar to those of the recording medium obtained in example 6, but the glide height could be reduced by 50%. Advantages and disadvantages of the magnetic recording medium obtained in example 6 or in this example are a matter to be determined depending on the requirements of the system to which the medium is applied.

Example 8

A magnetic recording medium was fabricated according to a process similar to that in example 4 except that a block copolymer was removed prior to sputter deposition of 15 nm-thick CoCrTaPt. That is, after RIE process, removal of a block copolymer using a solvent and oxygen ashing were carried out, a 15 nm-thick CoCrTaPt was deposited by sputtering, and further CMP, deposition of a protective layer and post-treatment were carried out.

When a medium was fabricated with a short CMP process time, an interface layer formed on the SiN matrix as schematically shown in FIG. 9. As a result of composition analysis, it was found that the interface layer contained Co and Cr. In addition, the interface layer covered 40% of area of the SiN matrix. The thickness of the interface layer was 2 nm in average.

When a medium was fabricated with a shorter CMP process time, it was found that the interface layer having an average thickness of 4 nm covering the entire surface of the magnetic recording layer. As a result of composition analysis, it was found that the interface layer contained Co, Cr, and Pt.

Peeling tests using an adhesive tape were carried out for these medium samples. Specifically, a mesh having a total of 100 squares of 10×10 arranged with intervals of 1 mm was engraved on each of the media by means of a cutter knife, and then a measurement was performed as to what percentage thereof would be peeled off together with the adhesive tape. As a result of the measurement, the peel-off rates were 5% and 0%, respectively, for samples having structures including interface layers of 2 nm and 4 nm. Although the latter structure is advantageous from the viewpoint of adhesiveness of the protective layer, this structure is disadvantageous in the viewpoint of recording density because a distance between the magnetic recording layer and a head is increased.

Example 9

Magnetic recording media of the present invention were fabricated according to a process similar to example 1 except that the samples were prepared by changing a number of rotation in spin-coating of a block polymer and a concentration of a block copolymer solution.

With respect to the thus obtained samples, a measurement was performed on the distribution of angles formed by the track length direction on the disk and the array axes of ordered particle domains by using a scanning electron microscope. As a result of the measurement, it was found that magnetic particles formed a triangular lattice in the ordered particle domains. In addition, it was found that the higher the number of rotation in spin-coating as well as the higher the concentration of the solution, the smaller the angle distribution became.

Figure 24:
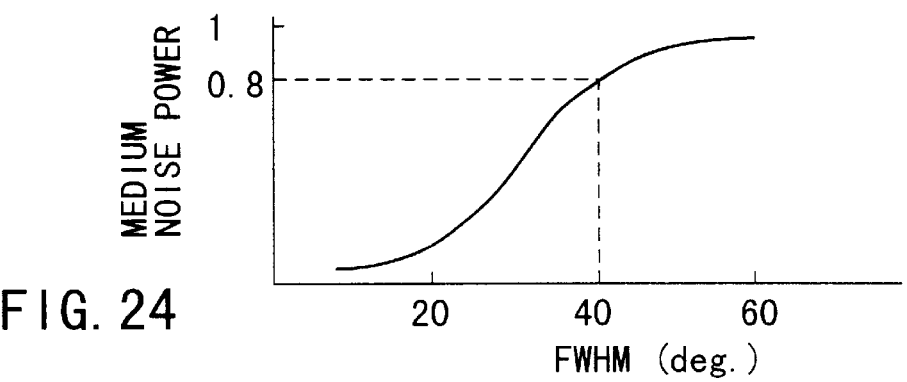
FIG. 24 is a graph showing a relationship between an angle formed between the array axis and a track length direction and medium noise power in an Example of the present invention.

Next, recording at a single frequency up to 200 kfci was carried out for these samples fabricated with changing the number of rotation in spin-coating and the concentration of solution, and then reproducing signals were investigated with the same head to measure medium noise power. The measurement result is shown in FIG. 24. In FIG. 24, a horizontal axis denotes FWHM of dispersion in distribution of angles formed between the track length direction on the disk and the array axes. A vertical axis denotes medium noise power, which is normalized by a value for a medium in when magnetic material particles are randomly dispersed.

As is evident from the result of FIG. 24, it is found that, for the magnetic recording medium of the present invention, the FWHM is preferably less than 40 degrees, more preferably less than 20 degrees, and further more preferably less than 10 degrees.

Example 10

First, 50 nm-thick vanadium and 15 nm-thick $SiO_2$ were sequentially deposited on a 2.5-inch NiP plated Al substrate by sputtering. Thereafter, spin-coating of a block copolymer, annealing, ozone treatment, and RIE were carried out according to the same elemental processes as in those of example 1.

Since the etching speed of metal vanadium to an RIE reaction gas $CF_4$ was very small compared with that of $SiO_2$, vanadium functioned as an etching stop layer during etching. Consequently, only $SiO_2$ positioned under the islands in a sea-island structure of the block copolymer could be removed by etching. In this manner, the $SiO_2$ layer having pores corresponding to the island portions was formed on the vanadium layer. After the etching, the remaining polymer layer was removed by oxygen ashing.

Figure 25:
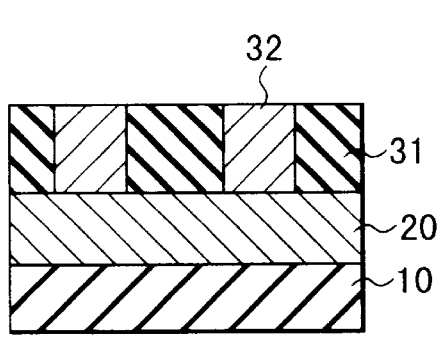
FIG. 25 is a cross sectional view showing an magnetic recording medium fabricated in an example of the present invention.

After the polymer was removed, 15 nm-thick CoCrTaPt was deposited on the sample by RF bias sputtering. More specifically, RF power of 0.1 W/cm$^2$ was applied to the sample during deposition, and the atmosphere during deposition was 2 mTorr of Ar. Performing the RF bias sputtering increased mobility of CoCrTaPt clusters, flying from the sputtering target to the sample, on the sample. As a result, almost all CoCrTaPt was deposited in the etched $SiO_2$ pores. By adjusting the deposition time so that the pores were filled up almost completely by deposition, a magnetic recording medium having a flat surface and having such a sectional structure schematically shown in FIG. 25 could be fabricated. The magnetic recording medium of FIG. 25 has a structure in which the magnetic particles 32 are embedded in the non-magnetic matrix 31. After the deposition of CoCrTaPt, 10 nm-thick carbon was deposited on the medium as a protective layer. When recording/reproducing evaluation was carried out, the flying height could be set to 40 nm.

In this example, a magnetic recording medium having a flat surface could be obtained without lifting-off and polishing processes. The reason why the flat surface profitable for a high-density magnetic recording medium could be obtained was because the bias sputtering was carried out. That is, the mobility of atoms, molecules and clusters deposited on the sample surface during bias sputtering is greater than that during general sputtering deposition, a flat sample surface can be formed in a thermally stable state. The bias power to be applied to the sample is not limited to the above value, and an optimum value can be selected according to sample, apparatus, materials or any other conditions. As long as the mobility of the clusters, flying from the target, on the sample can be increased, the applied bias may be DC bias. If the process in this example is used, lifting-off and polishing processes can be omitted, and thus, the manufacturing cost of the magnetic recording medium can be reduced.

In the case where the sea portion in the sea-island structure of the block copolymer is etched, contrary to this example, the bias sputtering can also be employed. The etching position or etching depth for the sample can also be set arbitrarily according to the characteristics of the desired magnetic recording medium or process environment.

Example 11

A sample was prepared under the conditions similar to those in example 10 except that $SiO_2$ and CoCrTaPt were co-sputtered on the sample.

Figure 26:
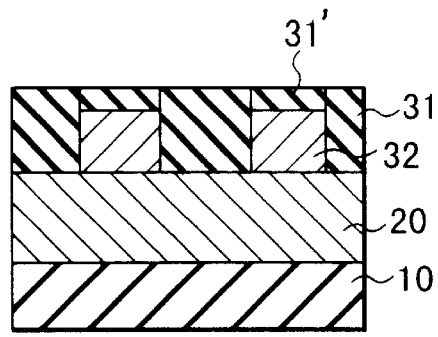
FIG. 26 is a cross sectional view showing an magnetic recording medium fabricated in an Example of the present invention.

The co-sputtering was carried out by adjusting the sputtering apparatus so that the volume composition ratio of the film was set to $CpCrTaPt:SiO_2=90:10$ when co-sputtering was performed on the flat sample. As a result of such adjustment, a magnetic recording medium having a sectional structure as schematically shown in FIG. 26 could be obtained. In the medium shown in FIG. 26, the CoCrTaPt magnetic particles 32 are embedded in the non-magnetic matrix 31 of $SiO_2$, and the non-magnetic layer 31' of $SiO_2$ was formed on the magnetic particles 32.

The reason why the sputter-deposited film in the etched pores is not made into a mixture film of the magnetic material and the non-magnetic material, but has a phase-separated structure of both portions is as follows. That is, the exposed surface of vanadium in the $SiO_2$ pores by etching has higher affinity to CoCrTaPt than to $SiO_2$. The CoCrTaPt clusters came from the target to the sample have high mobility on the sample, and thus, the CoCrTaPt film to be formed is in a state close to thermally stable state. Therefore, CoCrTaPt is solidified first on the vanadium surface in the pores. As a result, $SiO_2$ that is not soluble with CoCrTaPt is deposited on CoCrTaPt.

When the processes in this example are employed, the lifting-off and polishing processes can be eliminated, and thus, there can be provided an effect of reducing the manufacturing cost of the medium. In the case where the sea portion in the sea-island structure of the block copolymer is etched, the co-sputtering method can also be employed as in this example. The etching position or etching depth for the sample can also be set arbitrarily according to the characteristics of the desired magnetic recording medium or process environment. The bias power to be applied to the sample is not limited to the above value, and an optimum value can be selected according to sample, apparatus, materials or any other conditions. As long as the mobility of the clusters, flying from the target, on the sample can be increased, the applied bias may be DC bias. Furthermore, the volume composition ratio of $CoCrTaPt:SiO_2$ may be properly set according to the structure of the desired recording medium or sputtering apparatus, and the value used in this example is merely provided as an example. In the co-sputtering method, different targets consisting of each of materials to be deposited may be used, or a target in which materials to be deposited are combined may be used.

In the co-sputtering method employing this example, if the deposition time is properly prolonged and a non-magnetic material such as $SiO_2$ is slightly overflowed so as to deposit on the surface of the medium, it is possible to make it a protective layer. In such a case, a process of deposition of protective layer can be eliminated, and thus, a medium cost can be reduced.

Example 12

First, 50 nm-thick vanadium and 15 nm-thick CoCrTaPt were sequentially deposited on a 2.5-inch glass substrate by sputtering. Thereafter, spin-coating of a block copolymer, annealing, ozone treatment, and RIE were carried out according to the same elemental processes as in those of example 1. However, in the RIE process, a method was employed in which plasma gas consisting of carbon monoxide and ammonia was used and the sample was heated to 110° C. during RIE as in Example 6.

In this example, etching was stopped on the surface of the glass substrate. That is, only vanadium and CoCrTaPt positioned under the island portions in the sea-island structure of the block copolymer were removed by etching. In this manner, the vanadium and CoCrTaPt layers having pores corresponding to the island portions were formed on the glass substrate.

After the etching, 15 nm-thick $SiO_2$ was deposited on the sample by RF bias sputtering. More specifically, RF power of 0.1 $W/cm^2$ was applied to the sample during deposition, and the atmosphere during deposition was 2 mTorr of Ar.

Figure 27:
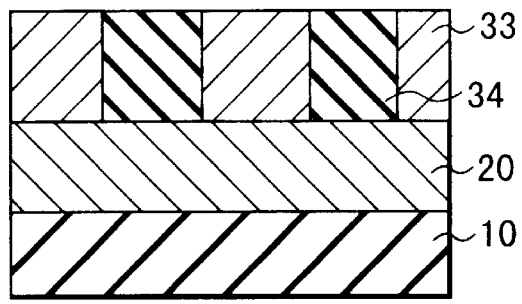
FIG. 27 is a cross sectional view showing an magnetic recording medium fabricated in an Example of the present invention.

Since the mobility of $SiO_2$ clusters on the sample, flying from the target to the sample, was increased by RF bias sputtering, almost all $SiO_2$ was deposited in etched pores in the vanadium and CoCrTaPt layers. By adjusting the deposition time so that the pores were filled up almost completely by deposition, a magnetic recording medium having a flat surface and having such a sectional structure schematically shown in FIG. 27 could be fabricated. The magnetic recording medium shown in FIG. 27 has a structure in which $SiO_2$ constituting non-magnetic particles 34 is embedded in the vanadium and CoCrTaPt layers constituting the magnetic matrix 33.

After deposition of $SiO_2$, 10 nm-thick carbon was deposited on the medium as a protective layer. When recording/reproducing was carried out, the flying height could be set to 40 nm.

In this example, a magnetic recording medium having a flat surface could be obtained without lifting-off and polishing processes. The reason why the flat surface profitable for a high-density magnetic recording medium could be obtained was because the bias sputtering was carried out like Example 11. The bias power to be applied to the sample is not limited to the above value, and an optimum value can be selected according to sample, apparatus, materials or any other conditions. The applied bias may be DC bias. In addition, if the process in this example is used, lifting-off and polishing processes can be omitted, and thus, the manufacturing cost of the magnetic recording medium can be reduced.

In the case where the sea portion in the sea-island structure of the block copolymer is etched, the bias sputtering can also be employed. The etching position or etching depth for the sample can also be set arbitrarily according to the characteristics of the desired magnetic recording medium or process environment.

In the bias sputtering method employed in this example, if the deposition time is properly prolonged and a non-magnetic material such as $SiO_2$ is slightly overflowed so as to deposit on the surface of the medium, it is possible to make it a protective layer. In such a case, a process of deposition of protective layer can be eliminated, and thus, a medium cost can be reduced.

Example 13

A magnetic recording medium was fabricated employing the similar processes as in Example 11. However, the RIE process time was set to twice as long as that in Example 11. In addition, the volume ratio of CpCrTaPt to $SiO_2$, which were co-sputtered, was set to 50%. As a result, a so-called granular medium, in which magnetic particles are clearly separated, was formed. When the sectional structure of the medium was observed with a transmission electron microscope, it was found that the medium had a structure as shown in FIG. 11. More specifically, the initial layer was $SiO_2$ formed by RIE, and the growth layer was $SiO_2$ selectively grown based on difference in affinity as described in Example 11. It was confirmed that the $SiO_2$ in the growth layer contained a trace of Ta that is a constituent element of the magnetic material.

In order to examine the adhesiveness of the media, peeling tests using an adhesive tape were carried out. Specifically, a mesh having a total of 100 squares of 10×10 arranged with intervals of 1 mm was engraved on the magnetic recording medium by using a cutter knife, and then a measurement was performed as to what percentage thereof would be peeled off together with the adhesive tape. As a result of the measurement, the peel-off rates were 10% for the medium of Example 11, and 0% for the medium of this Example. It was considered that, in this Example, strain within the magnetic recording medium was reduced due to formation of the initial and growth layers, which resulted in improvement in the adhesiveness. Suitable degree of adhesiveness varies depending on requirements for system employing the medium. The above granular medium has characteristics that is excellent in adhesiveness but is poor in reproducing signal intensity as compared with the medium of Example 11.

Example 14

A mask consisting of porous alumite was fabricated by anodic oxidation of highly purified Al. Table 2 shows anodic oxidation conditions and measurement results of the pore diameter P in the porous alumite and thickness W of the Al oxide wall.

TABLE 2

Pore diameter P and wall thickness W

| Sample No. | anodic oxidation conditions | | P (nm) | W (nm/V) |
|---|---|---|---|---|
| a1. | 4% phosphorous acid | 25° C. | 30 | 1 |
| a2. | 2% phosphorous acid | 25° C. | 15 | 1 |
| a3. | 4% phosphorous acid | 50° C. | 40 | 0.5 |
| a4. | 2% oxalic acid | 25° C. | 15 | 1 |
| a5. | 3% oxalic acid | 25° C. | 20 | 0.7 |
| a6. | 3% oxalic acid | 50° C. | 30 | 0.5 |
| a7. | 3% chromic acid | 40° C. | 25 | 1 |
| a8. | 3% chromic acid | 10° C. | 15 | 1.5 |
| a9. | 15% sulfuric acid | 10° C. | 12 | 0.8 |
| a10. | 10% sulfuric acid | 10° C. | 8 | 10 |

P and W measured for, each pore through SEM observation of the surface of the porous alumite shown in FIG. 15 and image processing. The anodic oxidation rate was adjusted to 10±1 nm/minute by adjusting the applied voltage.

From Table 2, it is found that pores having a diameter of several nm to several tens of nm and walls having a thickness of sub-nanometer to 1 nm per unit voltage could be formed.

Next, experiments were performed to vary the pore diameter distribution and inter-pore distance distribution by varying the Al purity, pretreatment method of anodic oxidation, and number of anodic oxidation treatments. The experimental results are shown in Table 3.

TABLE 3

FWHM(Pσ) of pore diameter distribution and FWHM(Cσ) of interpore distance distribution

| No. | Al purity | pretreatment | number of treatments | Pσ (%) | Cσ (%) |
|---|---|---|---|---|---|
| b1. | 4N | 5% NaOH, 80° C., 10 s → 5% $HNO_3$ neutralization | 1 | 30 | 40 |
| b2. | 5N | same as above | 1 | 20 | 30 |
| b3. | 5N | same as above | 2 | 10 | 20 |
| b4. | 5N | 5% NaOH, 80° C., 30 s → 5% $HNO_3$ neutralization | 1 | 10 | 25 |
| b5. | 5N | perchlorate solution, r.t., 30 s | 1 | 20 | 40 |
| b6. | 4N | same as above | 1 | 35 | 50 |
| b7. | 4N | none | 1 | 45 | 85 |
| b8. | 5N | SiC stumper pressing → same treatment as b1 | 1 | 8 | 15 |

The FWHM (Pσ) of the pore diameter distribution and the FWHM (Cσ) of the inter-pore distance distribution were derived from image processing of images obtained by SEM observation of the fabricated samples of porous alumite. Note that Pσ and Cσ denote dispersion for the average pore diameter and average inter-pore distance, and for example, 20% of Pσ corresponds to average pore diameter ±10%. The pretreatment conditions for anodic oxidation were varied by varying chemical polishing conditions of the buff polished high-purity Al. The anodic oxidation rate was adjusted to 10±1 nm/minute by adjusting the applied voltage.

In the above table, sample of b8 with the minimum dispersion in pore diameter and inter-pore distance was obtained by arraying regularly defective portions as pore igniters in advance. The defects were arranged as follows: A SiC substrate having a flat surface was set to an direct-write EB apparatus. Electron beams were raster-scanned on the SiC substrate surface, and thus, projections having a height of sub-nanometer arranged on the SiC surface in lattice shape were formed. The SiC substrate having the projections formed thereon was taken out of the direct-write EB apparatus, and then the SiC substrate was pressed to the high-purity Al plate, and thus, recesses arranged on the Al surface in lattice shape were formed. Next, the Al plate having the recesses formed thereon was subjected to anodic oxidation process under each condition shown in Table 3. In the sample of b8, the recesses on the Al plate, which were formed by pressing the SiC substrate having the projections formed by EB direct-write, serve to pore igniters during anodic oxidation. Therefore, the pores were arrayed in accordance with the EB pattern, which made dispersion of the pore diameter and inter-pore distance very small.

By combining the conditions in Table 2 and 3 and by controlling the anodic oxidation voltage, samples of porous alumite having the average pore diameter in the range of 8 to 40 nm, the FWHM of the pore diameter distribution of 8 to 120% (120% means±60%), the average inter-pore distance of 12 to 60 nm, and the FWHM of the inter-pore distance distribution of 15 to 200% were fabricated.

Even when the anodic oxidation rate was varied in the range of about several nm to 30 nm/minute, Pσ and C a resulted in values similar to those shown in Table 3. When the anodic oxidation rate was 30 nm/minute or more, the samples other than b8 in Table 3 represented increase in Pσ and Cσ at a rate of about 5% per increase by 10 nm/minute in the oxidization rate. Even when the anodic oxidation rate was 30 nm/minute or more, the samples of b8 in Table 3 did not represent particular increase in Pσ and Cσ.

A mask was fabricated by using a metal ring, according to a modified method of replica method disclosed in aforementioned Science, 268, 1466, 1995. A Cu ring was provided. A resist in which a pattern of porous alumite had been transferred was disposed in an aperture of the Cu ring. Then, Pt was continuously grown on the Cu ring, and Pt was grown at the aperture of the ring in accordance with the resist pattern. In this manner, a replica consisting of Pt having a honeycomb-shaped pattern of porous alumite was formed. The pattern of the holes of the mask thus formed agreed with the pattern of porous alumite by an error within 1 nm.

Figure 28:
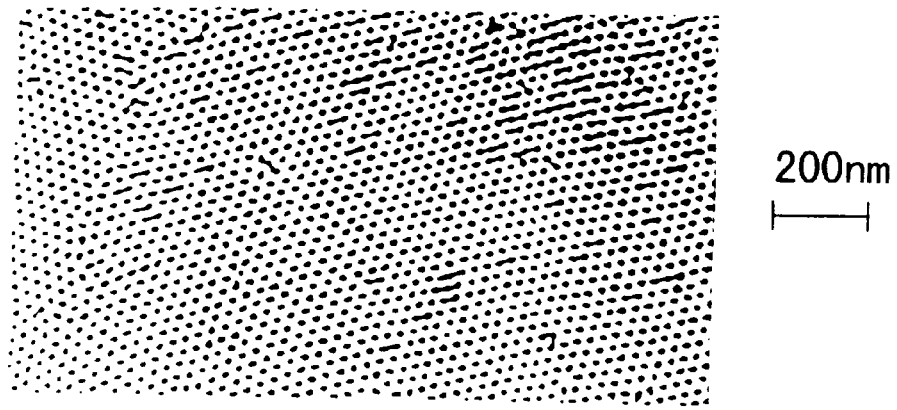
FIG. 28 is an SEM image of a mask fabricated in an Example of the present invention.

FIG. 28 shows an SEM image of a fabricated mask viewed from the top. In FIG. 28, black circles correspond to holes, and a white background corresponds to a wall portion. In the mask shown in FIG. 28, the average pore diameter, the average inter-pore distance, FWHM of pore diameter distribution, and FWHM of pore distance distribution were 20 nm, 30 nm, 30%, and 40%, respectively.

The depth of the pore can be adjusted by Pt growth time during replica forming in addition to the thickness of porous alumite before transfer. In this example, the depth the pore was set to 500 nm considering applicability to processes for a magnetic recording medium. A metal ring having an inner diameter of several centimeters can prevent the replica from being destroyed due to an effect of mechanical maintenance of the metal ring by taking care on handling of the replica even in a case where the thickness of Pt is as thin as about 500 nm, although it depends on an aperture area of the metal ring.

Next, ordered magnetic particle media were fabricated by employing the masks fabricated as above. The thickness of the protective film on the magnetic particles was set to 10 nm that was equal to the film thickness used for a conventional medium for the purpose of comparison. The material used for the protective film was a matrix material or a carbon film in the process I, and was a carbon film in the process II. In addition, a fluorocarbon-based lubricant layer of about 2 to 3 nm was coated on the surface of all samples.

Figure 29:
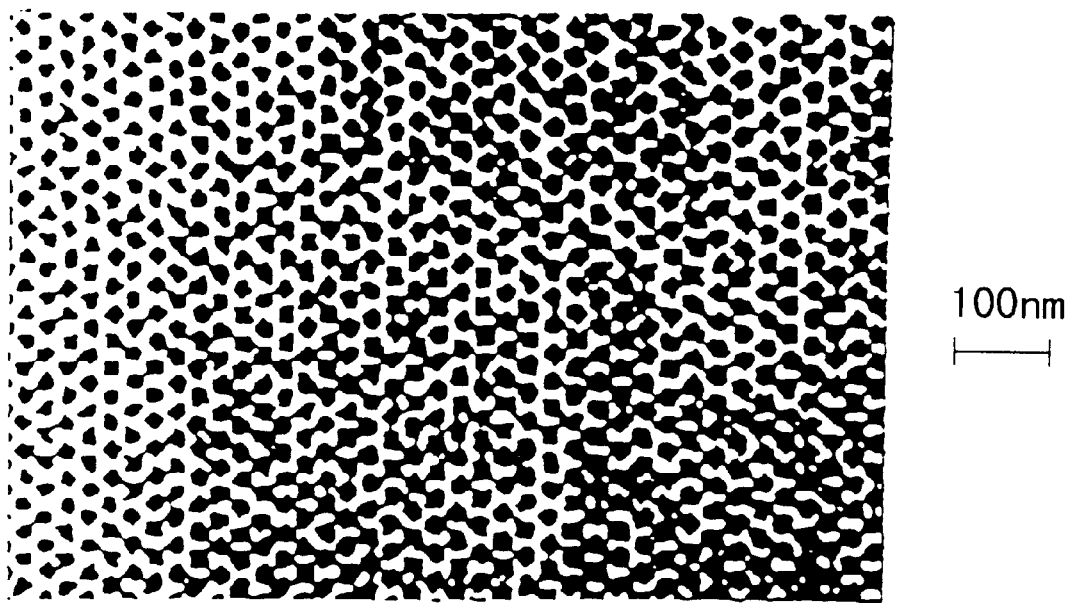
FIG. 29 is an SEM image of an ordered magnetic particle medium fabricated in an Example of the present invention.

FIG. 29 is a top view of a fabricated ordered magnetic particle medium observed with SEM. In FIG. 29, a white portion corresponds to a non-magnetic matrix 31, and black circles correspond to magnetic particles 32.

Using various self-organized masks fabricated as above, ordered magnetic particle media having the average particle diameter in the range of 7 to 42 nm, FWHM of particle diameter distribution of 8 to 150% (150% means±75%), average inter-particle distance of 12 to 60 nm, and FWHM of inter-particle distance distribution of 15 to 250% were fabricated.

The fabricated ordered magnetic particle media were evaluated as follows. The direction of the easy axis, the product between the remanent magnetization (Mr) in the direction of the easy axis and the thickness of magnetic particles, coercivity (Hc), and coercivity squareness (S*) were obtained by means of VSM. An activation magnetic moment was obtained by means of fluctuation field measurement. An activation size (Da) of magnetic particles was obtained from the volume ratio of magnetic particles and the measured value of saturation magnetization. The Da corresponds to a minimum reversal size of magnetic particle, which coincides with the physical of one particle in the case where there is no exchange interaction between particles.

In addition, the average particle diameter (D) of magnetic particles, the average distance (C) between magnetic particles, the FWHM (Dσ) of particle diameter distribution, and the FWHM (Cσ) of distance between magnetic particles were obtained from TEM and SEM observations and image processing of the observed images.

The average particle diameter (D) of magnetic particles would correspond to the average pore diameter P in the self-organized mask, but D and P indicated slightly different values due to the transfer process from the mask. The FWHM (Dσ) of particle diameter distribution would correspond to pore diameter dispersion Pσ in the self-organized mask, but Dσ indicated a slightly large value because dispersion in the transfer process was superposed on Pσ. The average distance between magnetic particles was indicated by the symbol C, same as that for the average distance (C) between pores in the self-organized mask, because there was no significant difference between them. The dispersion (C'σ) of distance between particles and the dispersion (Cσ) of distance between pores in the self-organized mask did not coincide with each other completely indicating a slight difference, which reflected a difference between the particle diameter dispersion Dσ and the pore diameter dispersion Pσ.

An objective region on the medium where the above average value and distribution were examined was 2 μm square, which was sufficiently larger range than a minimum recording cell size assumed in the present invention. Therefore, if the dispersion in the objective region of 2 μm square is 20% or less, for example, the dispersion in the minimum recording cell is, of course, 20% or less.

In addition, each sample of disk medium was mounted on a spin stand and recording/reproducing characteristics, mainly medium noise characteristics, were evaluated using an MR head. The evaluation results will be described as follows.

FIG. 30 is a graph showing the measurement results of a relationship between the average distance (C) between magnetic particles and the product (Mrt) between the remanent magnetization and the film thickness. For samples having an easy axis of magnetization in plane, i.e., longitudinal recording media, the Mrt was obtained from major loop measurement in the in-plane direction. For samples having an easy axis of magnetization in perpendicular direction, the Mrt was obtained from major loop measurement in perpendicular direction. FIG. 30 shows the results in a case where ordered magnetic particle media having the average particle diameter D of 9 to 11 nm, the particle diameter dispersion Dσ of 30% (±15%) or less, and the inter-particle distance dispersion Cσ of 60% (±30%) or less were selected and examined. Measurements were performed for media, magnetic particles of which having a thickness of 10 nm.

In FIG. 30, the curve A denotes the measurement results of the media according to the present invention whose magnetic particles are made of Co—Fe; the curve B denotes the measurement results of the media according to the present invention whose magnetic particles are made of Co—Pt; and the points C denote the measurement results of conventional media for comparison. The conventional media C have a multigrain random array structure in which Cr (100 nm)/CoCrTaPt (10 nm)/C (10 nm)/lubricant (3 nm) are formed on a substrate. For the conventional media, two samples having different magnetic particle diameters fabricated by varying the temperature during sputter deposition of the magnetic layer were provided.

Mrt will be proportional to $C^{-2}$ under a condition where the film thickness and particle diameter are constant if the magnetic material is not degraded significantly. In FIG. 30, the measurement results A and B represent that Mrt is proportional to $C^{-2}$ as the above theory. However, the measurement results of the conventional media deviate from the theory.

In addition, a value of Mrt for the same C is determined depending on the amount of magnetic element in the magnetic particles. When compared the Co—Pt media of the present invention with the conventional CoCrTaPt media, Mrt of the conventional media is lower than that of the media of the present invention, although the concentrations of the magnetic element are almost identical to each other. This result shows that there are superparamagnetic particles in the conventional media because the particle diameter distribution is wide, which causes to lower Mrt due to thermal disturbance. However, there are almost no particles being in superparamagnetic because the particle diameter dispersion is small in the ordered magnetic particle media of the present invention.

Mrt is a quantity relating to signal power and magnetization transition width with respect to magnetic recording characteristics. The greater Mrt is, the greater signal power is. When coercivities are identical, the greater Mrt is, the wider the magnetization transition width is, which makes high density recording hard. Therefore, Mrt is a quantity to be properly adjusted according to other magnetic characteristics of the medium, noise characteristics, and characteristics of the recording/reproducing system such as a head. As shown in FIG. 30, it is found that, in the media according to the present invention, Mrt can be properly adjusted by adjusting the average distance C between magnetic particles.

FIG. 31 is a graph showing the measurement results of a relationship between the average particle diameter D of magnetic particles and the coercivity Hc. Hc is measured value in the direction of easy axis of magnetization for each sample. In FIG. 31, the curve B shows the measurement results of the media employing Co—Pt magnetic particles according to the present invention; and the points C show the measurement results of the conventional media. The ordered magnetic particle media according to the present invention used for the measurements B had the particle diameter dispersion Dσ of 30% (±15%) or less; the average inter-particle distance of (D+1 to D+2) nm, where D is the average particle diameter; and inter-particle distance dispersion of 60% (±30%) or less. Measurement of coercivity Hc was carried out by measuring a VSM major loop for about several tens of minutes at room temperature. As the particle diameter of magnetic particles becomes smaller, Hc will be lowered due to influenced of thermal disturbance at room temperature. The influence of thermal disturbance can be estimated from the magnetic anisotropy of particles and the volume of particles.

The solid line shown in FIG. 31 is a theoretical curve of Hc relative to the Co—Pt magnetic particles of the media according to the present invention, which is fitted by Hc when the particle diameter of magnetic particles is sufficiently large. In addition, the dashed line shown in FIG. 31 is a theoretical curve of Hc of the CoCrTaPt magnetic particles of the conventional media. When compared the curve of the measurement results and the theoretical curve, both of these curves coincide with each other in the media according to the present invention in which particle diameter dispersion is small, but the measurement results are lower than the theoretical curve in the conventional media in which particle diameter dispersion is large. This is because the conventional media include superparamagnetic particles as described about the measurement results of Mrt.

Hc is a quantity relating to the magnetization transition width and recording sensitivity with respect to magnetic recording characteristics. When the Mrt values are identical, the higher Hc makes the magnetization transition width narrower, which is suitable to high density recording. However, when values of the coercivity squareness S* are identical, an increase in Hc lowers the recording sensitivity. Therefore, Hc is also a quantity to be properly adjusted according to a recording/reproducing system. As shown in FIG. 31, it is found that Hc can be properly adjusted by adjusting the average particle diameter of magnetic particles in the media according to the present invention.

FIG. 32 is a graph showing the measurement results of a relationship between the inter-particle distance dispersion C'σ, which is represented by a half FWHM, and Da/D that is a ratio of the activation size Da of magnetic particles and the average particle diameter D of magnetic particles. In FIG. 32, the curve A shows the measurement results of the media according to the present invention whose magnetic particles are made of Co—Fe; the curve B shows the measurement results of the media according to the present invention whose magnetic particles are made of Co—Pt; and the points C show the measurement results of the conventional media. The media according to the present invention used for measurements had the particle diameter dispersion Dσ of 30% or less in FWHM.

From the measurement results of the media according to the present invention, in the media whose inter-particle distance dispersion is adjusted to ±40% (FWHM: 80%) or less, Da/D values become unity. Da denotes a minimum magnetization reversal unit, which coincides with a physical particle diameter D when the exchange interaction between magnetic particles is disrupted. In addition, in a region where dispersion is 80% or more, the reason why Da/D increases as the dispersion becomes larger can be interpreted as follows. That is, when the inter-particle distance dispersion C'σ is large due to such causes that the degree of completion of the self-organized mask is low or a fabrication process of the ordered magnetic particle medium is deficient, it is considered that Da/D becomes larger since particles are locally in contact with each other.

In the conventional media, the inter-particle distance dispersion indicates a value of ±50% (FWHM: 100%) or more. In addition, the particles locally come into contact with each other, and thus, the Da/D indicates a value greater than unity. When the values of inter-particle distance dispersion are identicla, Da/D values of the conventional media are greater than those of the media according to the present invention. This is because the particle diameter dispersion Dσ as well as the inter-particle distance dispersion C'σ are larger in the conventional media, and thus, the number of local contact between particles is larger than that in the media according to the present invention.

Da/D is a quantity associated with noise caused by exchange interaction between magnetic particles with respect to magnetic recording characteristics, and it should be set to 2 or less. As can be seen from FIG. 32, in the ordered magnetic particle media according to the present invention, the inter-particle distance dispersion is preferably restricted to ±65% (FWHM: 130%) or less so that Da/D is set to 2 or less. It is most preferable to restrict the dispersion to ±40% (FWHM: 80%) or less so that Da/D is set to about 1.

Figure 33:
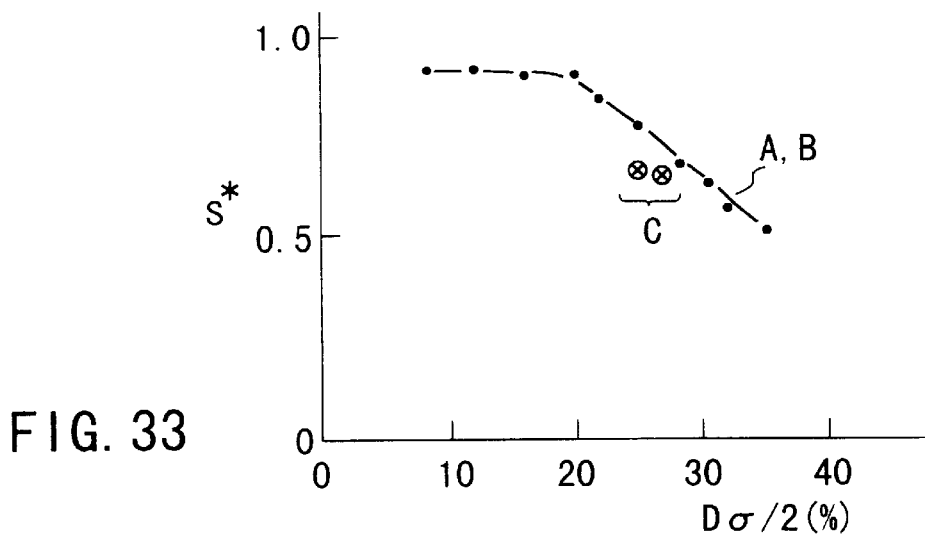
FIG. 33 is a graph showing an evaluation result of an ordered magnetic particle medium in an Example of the present invention.

FIG. 33 is a graph showing the measurement results of a relationship between the particle diameter dispersion Dσ, which is represented by a half FWHM, and the coercivity squareness S*. S* is derived from the measurement result of the VSM major loop for a longitudinal medium, and derived from the measured value of saturation magnetization corrected by demagnetizing field for a perpendicular medium. In FIG. 33, symbols A, B, and C are similar to those used in FIG. 30. The media according to the present invention used for measurements had the average particle diameter of 12 to 13 nm, and the inter-particle distance dispersion Cσ of ±30% (FWHM: 60%) or less.

The coercivity squareness S* is a quantity corresponding to dispersion of Hc of magnetic particles. The coercivity squareness S* reflects the dispersion of magnetic characteristics of particles, for example, the dispersion of crystal magnetic anisotropy, but does not depend on particle diameter itself. However, in the case where the particle diameter becomes small, and Hc is lowered due to thermal disturbance at room temperature, S* exhibits particle diameter dependency.

As shown in FIG. 33, in the media according to the present invention, S* values are large when particle diameter dispersion is adjusted to ±20% (FWHM: 40%), although the average particle diameter D is as small as 12 to 13 nm. On the contrary, if the particle diameter dispersion is greater than ±20%, it is found that S* is lowered since components of magnetic particles having low Hc exist even in the media of the present invention.

In the conventional media, the particle diameter dispersion is ±25% or more, and thus, it is found that particles having Hc lowered by thermal disturbance are considerably included. In addition, when the values of particle diameter dispersion are identical, the conventional media exhibit S* value smaller than that of the media according to the present invention. This is because the inter-particle distance dispersion as well as the particle diameter dispersion are larger in the conventional medium, and thus, particle components are included which come into contact with each other and have nominally high Hc, which makes dispersion of Hc larger.

S* is a quantity associated with recording sensitivity with respect to magnetic recording characteristics. When Hc values are identical, the larger S* improves recording sensitivity and overwrite erasure ratio. Thus, S* is preferably set to 0.5 or more, although it depends on recording ability of a head. Therefore, from the results shown in FIG. 33, in the ordered particle media according to the present invention, it is found that the particle diameter dispersion is preferably set to ±35% or less (70% or less in FWHM), and more preferably set to ±20% (40% or less in FWHM) where S* indicates a high constant value.

The recording/reproducing characteristics of the media according to the present invention were evaluated by employing an MR head. The employed MR head ia a prototype having an AMR reproducing unit of 1.3 μm in recording track width, 1.0 μm in reproducing track width, and 0.1 μm in reproducing gap. This head has recording/reproducing ability in areal density up to 4.3 Gb/in$^2$ when a guard band width between tracks is set to 0.15 μm. This head is basically designed for a longitudinal medium, but it is applicable to recording/reproducing of a perpendicular medium. For a perpendicular medium, in particular, for such a perpendicular medium having a structure in which an NiFe soft magnetic film and a NiFeCo semi-hard magnetic film are disposed under the magnetic layer according to the present invention, it is preferable to use a recording head consisting of a single magnetic pole. However, in evaluating the medium noise characteristics, a ring type head for a longitudinal medium can be used, and thus, this head is employed for the perpendicular medium according to the present invention.

The minimum recording cell size that can be recorded by using this head is 1.3 μm×0.1 μm, and thus, the minimum recording cell has an area of 1.3×10E5 (nm$^2$) in this case. In the ordered magnetic particle medium according to the present invention, the distance between magnetic particles is 12 to 60 nm, and thus, the number of magnetic particles included in the minimum recording cell is 36 to 902.

The measurement conditions for recording/reproducing characteristics are: 1800 rpm in disk rotation speed; 22 mm in radius of recording position; and 25 nm in head flying height. Recording was carried out with changing a recording frequency, and the normalized medium noise at each frequency was examined. A recording current was set to a saturation recording current in which overwrite erasure ratio became -40 dB or more (minus side). The normalized medium noise is a value obtained by dividing a value of the medium noise (Nm) integrated over a full frequency bandwidth by a low-pass signal output (S0), and is a normalized by a reproducing track width (1 μm).

Figure 34:
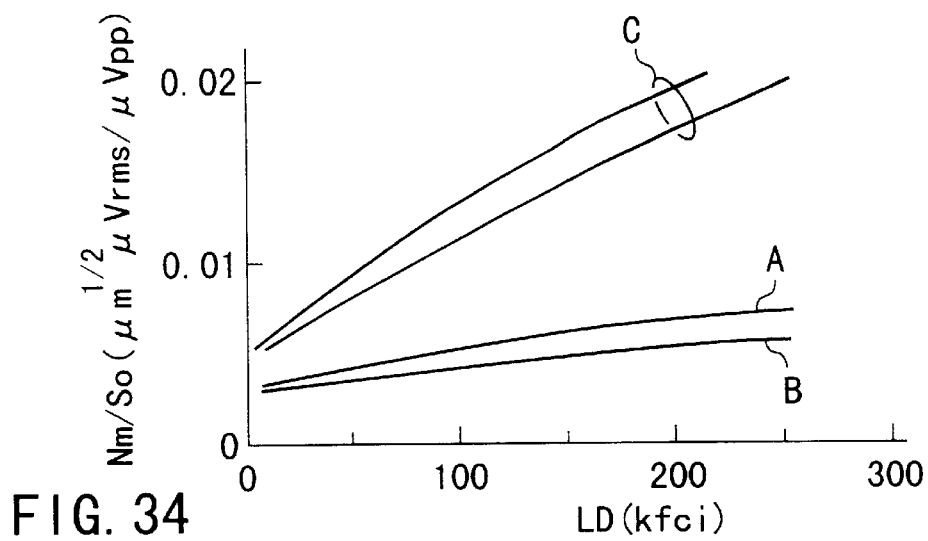
FIG. 34 is a graph showing an evaluation result of an ordered magnetic particle medium in an Example of the present invention.

FIG. 34 is a graph showing examples of the measurement results of a relationship between the spatial recording frequency LD of the medium and normalized medium noise. In FIG. 34, symbols A, B, and C are similar to those used in FIG. 30. The media according to the present invention used for measurements had the average particle diameter of magnetic particles of 15 nm, FWHM of the particle diameter distribution of 25%, the average inter-distance distribution of 50%.

As is evident from FIG. 34, the media according to the present invention exhibit remarkably lower noise than the conventional media. This is because the particle diameter dispersion and inter-particle distance dispersion are restricted, i.e., the magnetic particles are arrayed regularly in the media according to the present invention more as compared with the conventional media. In the media according to the present invention, both of the medium employing CoFe particles (curve A) and the medium employing CoPt particles (curve B) exhibit a very low noise, and the medium employing CoPt particles (curve B) exhibits lower noise than the medium employing CoFe particles (curve A). As shown in FIG. 30, this is because the CoPt particle medium (curve B in FIG. 30) has a smaller Mrt than the CoFe particle medium (curve A in FIG. 30), and therefore, the magnetization transition width is narrower in the CoPt particle medium, and sharper magnetization transition is formed.

Figure 35:
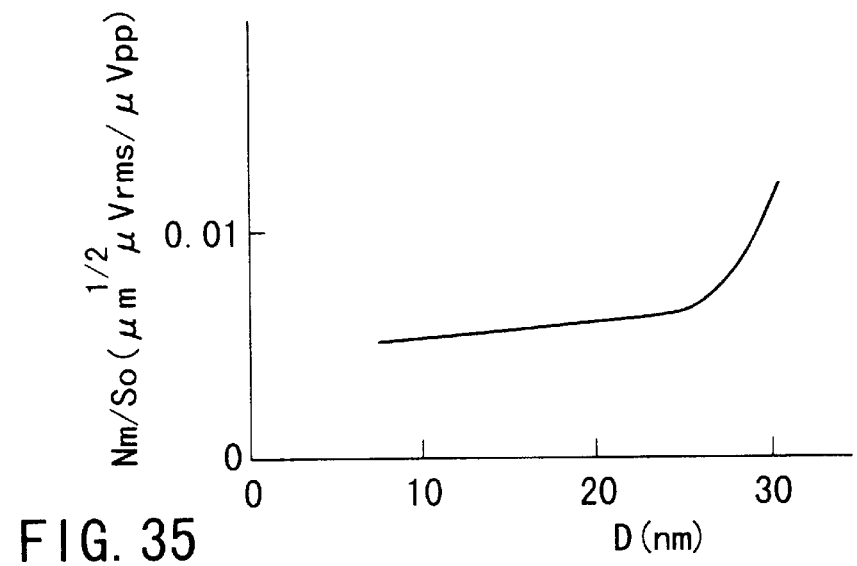
FIG. 35 is a graph showing an evaluation result of an ordered magnetic particle medium in an Example of the present invention.

FIG. 35 is a graph showing the results of a relationship between the normalized medium noise and the average particle diameter D when the magnetic media according to the present invention were recorded at a spatial recording frequency of 250 kfci. The media according to the present invention used for the measurements had the particle diameter dispersion of 25% or less in FWHM; the average inter-particle distance of (D+1 to D+3) nm, where D is the average particle diameter; and inter-particle distance dispersion of 50% or less in FWHM.

As is evident from FIG. 35, in the case where a spatial frequency is set to 250 kfci, i.e., in the case where the recording cell length is about 0.1 μm, the noise level is very low at the average particle diameter of about 25 nm or less; however, the noise level rises abruptly at 25 nm or more.

A relationship between the normalized medium noise and the spatial recording frequency was measured (the measurement results are not shown). As a result, if the magnetic particle diameter was ¼ or more of the recording cell length, noise level increased even in the ordered magnetic particle media according to the present invention. As is evident from this results, the particle diameter of magnetic particles should preferably be ¼ or less of the recording cell length in order for low noise effect to be exhibited significantly in the media according to the present invention. The number of magnetic particles arrayed in track width direction is not particularly restricted as long as the track width does not become shorter than the minimum recording cell length. Therefore, the lower limit of the number of magnetic particles in the track width direction of the minimum recording cell is 4. Actually, several tens or more of magnetic particles are arrayed in the track width direction of the minimum recording cell.

Figure 36:
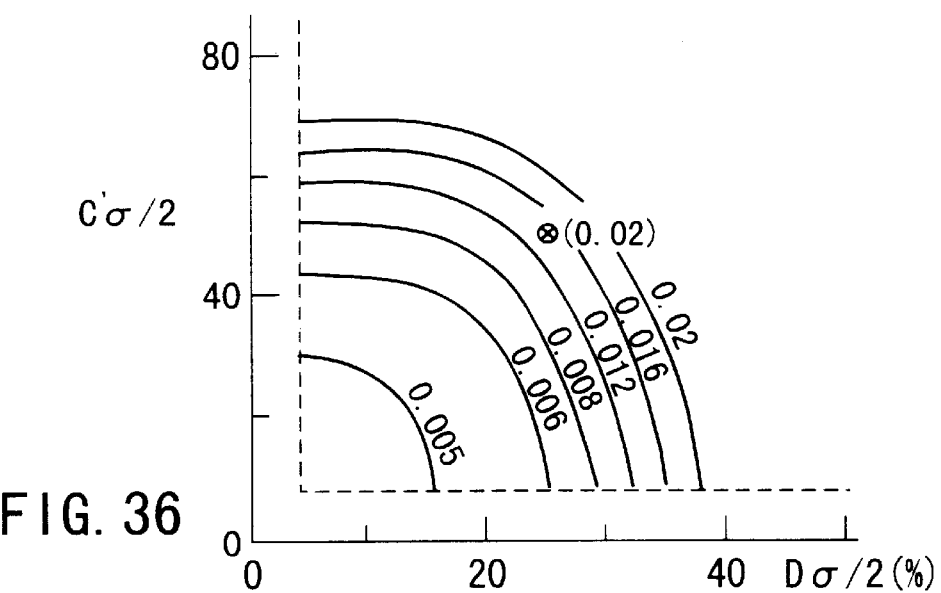
FIG. 36 is a graph showing an evaluation result of an ordered magnetic particle medium in an Example of the present invention.

FIG. 36 is a graph showing the measurement results of relationships among the particle diameter dispersion of magnetic particles Dσ, the inter-particle distance dispersion C'σ, and medium noise. Measurements were carried out by selecting the media according to the present invention in which the particle diameter was adjusted to ¼ or less of the recording cell length, and the inter-particle distance was adjusted to particle diameter+(1 to 3 nm), and a spatial recording frequency.

In FIG. 36, the solid lines indicate the measurement results of the ordered magnetic particle media according to the present invention by way of contour lines of the normalized medium noise. In addition, the point shown in FIG. 36 indicates the measurement result of the conventional medium with low noise.

As is evident from the results shown in FIG. 36, it is preferable that the particle diameter dispersion is ±20% or less (40% or less in FWHM) and the inter-particle distance dispersion is ±40% (80% or less in FWHM) in order for a low noise effect to be exhibited in the media according to the present invention. More preferably, it is found that the particle diameter dispersion is ±10% or less (20% or less in FWHM) and the inter-particle distance dispersion is ±20% or less (40% or less in FWHM). It is most preferable that the particle diameter dispersion is ±5% or less (10% or less in FWHM), and the inter-particle distance dispersion is ±10% or less (20% or less in FWHM).

In FIG. 36, the noise of the conventional medium is higher than that of the media according to the present invention having an almost equal dispersion. This is because the magnetic particles are arrayed substantially regularly in the media according to the present invention, in which the dispersion indicates displacement from the regular array positions, while magnetic particles are randomly arranged in the conventional medium.

Note that, the results shown in FIG. 36 were obtained from measurements employing a magnetic head that can be fabricated at present. Thus, in the case where measurements are carried out with a magnetic head having a narrower head gap and more improved reproducing resolution in the future, the contour lines of the normalized medium noise shown in FIG. 36 will be shifted to a region of higher values. When such a head is employed for recording, magnetic recording media having smaller particle diameter dispersion and inter-particle distance dispersion should be employed.

Example 15

According to the aforementioned manufacturing method, an ordered non-magnetic pore was fabricated. CoPt and TbCo were employed as magnetic materials. When CoPt was employed, like in the case of the ordered magnetic particle medium, the easy axis of magnetization was set according to the seed layer material, the thickness of the seed layer, thickness of the magnetic layer, and deposition conditions for the magnetic layer. When TbCo was employed, a perpendicular magnetization layer was formed without providing a seed layer.

The samples of the fabricated ordered non-magnetic pore media were evaluated in accordance with the evaluation for the ordered magnetic particle media. A microstructure of the ordered non-magnetic pore medium was evaluated by means of the average pore diameter (P'), FWHM of the pore diameter distribution (P'σ), the average inter-pore distance (C'), and FWHM of inter-pore distance distribution (C'σ). These parameter values were determined by adding values due to process fluctuation to each of the parameter values obtained for the self-organized masks obtained in Example 14, i.e., the average pore diameter, FWHM of pore diameter distribution, the average inter-pore distance, and FWHM of the inter-pore distance distribution. The ranges of P', P'σ, C, and C'σ in this Example were substantially identical to those of the average particle diameter D, FWHM of the particle diameter distribution Dσ, the average inter-particle distance C, and FWHM of the inter-particle distance distribution C'σ, respectively, which were determined for of the ordered magnetic particle media in Example 14.

First, MFM observation was carried out to evaluate a domain wall. When TbCo was employed as a magnetic material, the domain wall width was 10 to 20 nm except the vicinity of the composition ratio near the compensation composition, although it depends on composition ratio and the film thickness. When CoPt was employed as a magnetic material, the domain wall width was 7 to 13 nm. The greater the anisotropy energy is, the narrower the domain wall width is. For example, even when CoPt is employed, in the case where the composition of Co is 50 at %, the domain wall width is assumed to be 5 to 10 nm. When SmCo having a great magnetic anisotropy is employed, the domain wall width is assumed to be 3 to 6 nm. In this manner, it is found that, in the present invention, the non-magnetic pore diameter can be variously adjusted according to type of magnetic material to be employed.

A relationship between the average inter-pore distance C' and a product between the remanent magnetization and film thickness (Mrt) was measured. The measurement results exhibited a reverse correlation to that between C and Mrt for the ordered magnetic particle medium shown in FIG. 30. That is, since the greater C' increases an occupation rate of the magnetic material, Mrt increases. The relationship between Mrt and C' is as expected from calculation. It is found that Mrt can be properly adjusted even in the ordered non-magnetic pore medium.

A relationship between the average pore diameter P' of the non-magnetic pore and the coercivity Hc was measured. The measurement results exhibited a relationship similar to that between the average particle diameter D and the coercivity Hc for the ordered magnetic particle medium shown in FIG. 31. That is, when P' was ½ or less of the domain wall width, Hc was lowered. When the non-magnetic pore diameter is ½ or more of the domain wall width, the non-magnetic pores function as a pinning sites of the domain wall, and thus, greater Hc is obtained. However, when the pore diameter is less than ½ of the domain wall width, the domain wall moves freely without being pinned at the non-magnetic pores, and thus, Hc is lowered.

A relationship between the dispersion C'σ a of non-magnetic pore distance and the ratio Da/P' of the activation size Da of the non-magnetic pore and the average pore diameter P' is measured.

The activation size Da of the magnetic particles exhibited a very large value. This is because the magnetic matrix is connected in the entire area of the film surface. From the measurement results, it is found that the ordered non-magnetic pore medium according to the present invention is not affected by thermal disturbance unlike a multigrain or ordered magnetic particle medium.

When the average pore diameter P' was small, the coercivity squareness S* was lowered as the pore diameter dispersion P'σ increased. This is because the pores having a pore diameter less than ½ of the domain wall width appears as the pore diameter dispersion P'σ increases. However, in the case where the average pore diameter P' was relatively large or in the case where the pore diameter dispersion P'σ was sufficiently small, S* indicated a value close to unity.

A relationship between a spatial recording frequency LD and a normalized medium noise for the non-magnetic pore media was measured by employing an MR head used for evaluation of the ordered magnetic particle media. In the case where the pore diameter was adjusted to ½ to 3 times of the domain wall width and the inter-pore distance dispersion C'σ was adjusted to ±40% (80% in FWHM) or less, they exhibited low noise performance as in the case of the measurement results for the ordered magnetic particle media shown in FIG. 34.

Figure 37:
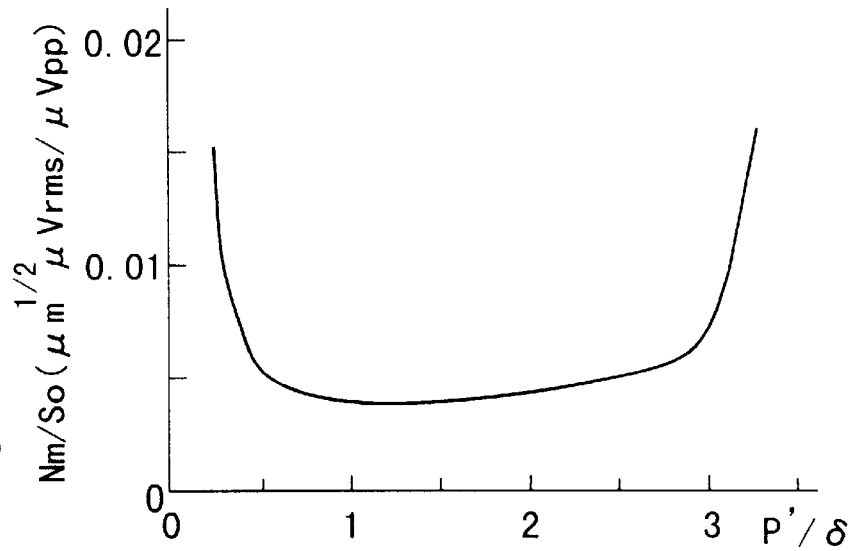
FIG. 37 is a graph showing an evaluation result of an ordered non-magnetic pore medium in an Example of the present invention.

FIG. 37 shows a relationship between the normalized medium noise at 250 kfci and a ratio P'/δ between the average pore diameter P' and the domain wall width δ with respect to the non-magnetic pore media. Measurements were carried out for media in which FWHM (C'σ) of inter-pore distance distribution was adjusted to 80% or less. As is evident from FIG. 37, it is fount that the non-magnetic pore media according to the present invention exhibit excellent low noise performance in the range where the P'/δ is ½ to 3. The reason why the noise is increased in the range of P'/δ less then ½ is because the domain walls move without being pinned at the pores and the magnetization transition portions are disordered due to indefinite locations of the domain walls. The reason why the noise is increased in the range of P'/δ greater than 3 is because the non-magnetic pores having an excessively large diameter serve as noise sources by themselves, although the domain walls are pinned at the pores and the magnetization transition portions have a proper shape.

Figure 38:
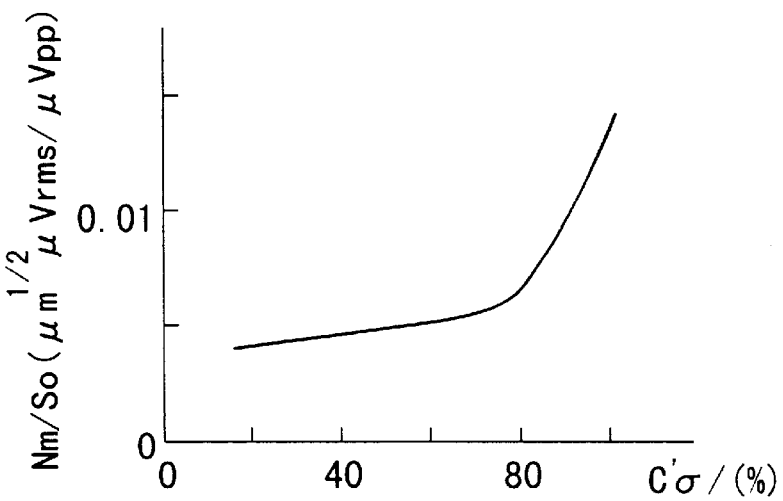
FIG. 38 is a graph showing an evaluation result of an ordered non-magnetic pore medium in an Example of the present invention.

FIG. 38 shows a relationship between the normalized medium noise at 250 kfci and the FWHM (C'σ) of the inter-pore distance distribution with respect to the non-magnetic pore media. Measurements were carried out for the non-magnetic media in which P'/δ is adjusted to ½ to 3. As shown in FIG. 38, the noise increases gently with an increase in C'σ a when C'σ was set to 80% or less, but it increases abruptly when C'σ exceeds 80%. As a result of SEM observation and MFM observation, when the C'σ exceeds 80%, the pores would be connected with each other, depending on the pore diameter. Thus, it is found that the substantial pore diameter becomes excessive and the pores serve as noise sources. In addition, it is found that the domain walls are connected with each other between pores other than those arranged along magnetization transition, and thus, the shapes of magnetization transition are disordered.

What is claimed is:

1. A magnetic recording apparatus comprising a magnetic recording medium comprising a magnetic recording layer formed on a substrate, a recording head configured to record information by forming recording cells on recording tracks formed on a surface of the magnetic recording layer, and a reproducing head configured to reproduce information recorded in the recording cells:

wherein the magnetic recording layer has a structure that magnetic particles are dispersed in a non-magnetic matrix and ordered particle domains in which magnetic particles are arrayed regularly are formed on a surface thereof, an average distance between the magnetic particles is 1 nm or more;

and wherein the size in the track width direction of each ordered particle domain is one fifth or more of a track width of the reproducing head.

2. A magnetic recording apparatus comprising a magnetic recording medium comprising a magnetic recording layer formed on a substrate, a recording head configured to record information by forming recording cells on recording tracks formed on a surface of the magnetic recording layer, and a reproducing head configured to reproduce information recording in the recording cells:

wherein the magnetic recording layer has a structure that non-magnetic particles are dispersed in a magnetic matrix and ordered particle domains in which non-magnetic particles are arrayed regularly are formed on a surface thereof, an average distance between the magnetic particles is 1 nm or more;

and wherein the size in the track width direction of each ordered particle domain is one fifth or more of a track width of the reproducing head.

3. The apparatus according to claim 2, wherein an average distance between the non-magnetic particles in a track width direction is not more than the track width of the recording head.

4. A magnetic recording medium comprising a magnetic recording layer formed on a substrate, in which information is recorded by forming recording cells in recording tracks formed on a surface of the magnetic recording layer:

wherein the magnetic recording layer has a structure that magnetic particles are dispersed in a non-magnetic matrix and ordered particle domains in which magnetic particles are arrayed regularly are formed on a surface thereof, an average distance between the magnetic particles is 1 nm or more;

and wherein the size in the track width direction of each ordered particle domain is one fifth or more of a width of the recording track formed on the recording layer.

5. The medium according to claim 4, wherein the size in the track width direction of each ordered particle domain is three times or more of the width of the recording track formed on the recording layer.

6. The medium according to claim 4, wherein an average magnetic particle diameter is 2 nm or more.

7. A magnetic recording medium comprising a magnetic recording layer formed on a substrate, in which information is recorded by forming recording cells in recording tracks formed on a surface of the magnetic recording layer;

wherein the magnetic recording layer has a structure that magnetic particles are dispersed in a non-magnetic matrix and ordered particle domains in which magnetic particles are arrayed regularly are formed on a surface thereof, an average distance between the magnetic particles is 1 nm or more;

wherein the size in the track width direction of each ordered particle domain is one fifth or more of a width of the recording track formed on the recording layer, and wherein an underlayer is formed between the substrate and the magnetic recording layer, and wherein the thickness of the underlayer under the magnetic particles is greater than the thickness of the underlayer under the nonmagnetic matrix.

8. The medium according to claim 7, wherein an interface layer comprising an element of the magnetic particles is formed between the underlayer and the non-magnetic matrix.

9. A magnetic recording medium comprising a magnetic recording layer formed on a substrate, in which information is recorded by forming recording cells in recording tracks formed on a surface of the magnetic recording layer;

wherein the magnetic recording layer has a structure that magnetic particles are dispersed in a non-magnetic matrix and ordered particle domains in which magnetic particles are arrayed regularly are formed on a surface thereof, an average distance between the magnetic particles is 1 nm or more;

wherein the size in the track width direction of each ordered particle domain is one fifth or more of a width of the recording track formed on the recording layer, and wherein an interface layer comprising an element of the magnetic particles is formed on the non-magnetic matrix.

10. The medium according to claim 9, wherein a thickness of the interface layer in not more than 5 nm.

11. A magnetic recording medium comprising a magnetic recording layer formed on a substrate, in which information is recorded by forming recording cells in recording tracks formed on a surface of the magnetic recording layer;

wherein the magnetic recording layer has a structure that magnetic particles are dispersed in a non-magnetic matrix and ordered particle domains in which magnetic particles are arrayed regularly are formed on a surface thereof, an average distance between the magnetic particles is 1 nm or more;

wherein the size in the track width direction of each ordered particle domain is one fifth or more of a width of the recording track formed on the recording layer, wherein an underlayer is formed between the substrate and the magnetic recording layer, and wherein the non-magnetic matrix constituting the magnetic recording layer comprises an initial layer in contact with the underlayer and a growth layer formed on the initial layer.

12. A magnetic recording medium comprising a magnetic recording layer formed on a substrate, in which information is recorded by forming recording cells in recording tracks formed on a surface of the magnetic recording layer;

wherein the magnetic recording layer has a structure that magnetic particles are dispersed in a non-magnetic matrix and ordered particle domains in which magnetic particles are arrayed regularly are formed on a surface thereof, an average distance between the magnetic particles is 1 nm or more;

wherein the size in the track width direction of each ordered particle domain is one fifth or more of a width of the recording track formed on the recording layer, and wherein a full width at half maximum of the distribution of the angle formed between an array axis of the ordered particle domain and the track length direction is 40° or less.

13. A magnetic recording medium comprising a magnetic recording layer formed on a substrate, in which information is recorded by forming recording cells in recording tracks formed on a surface of the magnetic recording layer:

wherein the magnetic recording layer has a structure that non-magnetic particles are dispersed in a magnetic matrix and ordered particle domains in which non-magnetic particles are arrayed regularly are formed on a surface thereof;

wherein the magnetic matrix is constituted by magnetic crystal grains separated from each other with an average distance of 2 nm or less;

wherein an average non-magnetic particle diameter is 1 nm or more, and wherein a size in a track width direction of each ordered particle domain is one fifth or more of a width of the recording track formed on the recording layer.

14. The medium according to claim 13, wherein a size in the track width direction of each ordered particle domain is three times or more of the width of the recording track formed on the recording layer.

15. A magnetic recording medium comprising a magnetic recording layer formed on a substrate, in which information is recorded by forming recording cells in recording tracks formed on a surface of the magnetic recording layer;

wherein the magnetic recording layer has a structure that non-magnetic particles are dispersed in a magnetic matrix and ordered particle domains in which non-magnetic particles are arrayed regularly are formed on a surface thereof;

wherein the magnetic matrix is constituted by magnetic crystal grains separated from each other with an average distance of 2 nm or less;

wherein an average non-magnetic particle diameter is 1 nm or more, wherein an underlayer is formed between the substrate and the magnetic recording layer, wherein a thickness of the underlayer under the magnetic matrix is greater than a thickness of the underlayer under the nonmagnetic particles, and wherein a size in the track width direction of each ordered particle domain is one fifth or more of a width of the recording track formed on the recording layer.

16. The medium according to claim 15, wherein an interface layer comprising an element of the magnetic matrix is formed between the underlayer and the non-magnetic particles.

17. A magnetic recording medium comprising a magnetic recording layer formed on a substrate, in which information is recorded by forming recording cells in recording tracks formed on a surface of the magnetic recording layer;

wherein the magnetic recording layer has a structure that non-magnetic particles are dispersed in a magnetic matrix and ordered particle domains in which non-magnetic particles are arrayed regularly are formed on a surface thereof;

wherein the magnetic matrix is constituted by magnetic crystal grains separated from each other with an average distance of 2 nm or less;

wherein an average non-magnetic particle diameter is 1 nm or more, wherein an interface layer comprising an element of the magnetic matrix is formed on the non-magnetic particles, and wherein a size in the track width direction of each ordered particle domain is one fifth or more of a width of the recording track formed on the recording layer.

18. The medium according to claim 17, wherein a thickness of the interface layer in not more than 5 nm.

19. A magnetic recording medium comprising a magnetic recording layer formed on a substrate, in which information is recorded by forming recording cells in recording tracks formed on a surface of the magnetic recording layer;

wherein the magnetic recording layer has a structure that non-magnetic particles are dispersed in a magnetic matrix and ordered particle domains in which non-magnetic particles are arrayed regularly are formed on a surface thereof;

wherein the magnetic matrix is constituted by magnetic crystal grains separated from each other with an average distance of 2 nm or less;

wherein an average non-magnetic particle diameter is 1 nm or more, wherein an underlayer is formed between the substrate and the magnetic recording layer, wherein each non-magnetic particle constituting the magnetic recording layer comprises an initial layer in contact with the underlayer and a growth layer formed on the initial layer, and wherein a size in the track width direction of each ordered particle domain is one fifth or more of a width of the recording track formed on the recording layer.

20. A magnetic recording medium comprising a magnetic recording layer formed on a substrate, in which information is recorded by forming recording cells in recording tracks formed on a surface of the magnetic recording layer;

wherein the magnetic recording layer has a structure that non-magnetic particles are dispersed in a magnetic matrix and ordered particle domains in which non-magnetic particles are arrayed regularly are formed on a surface thereof;

wherein the magnetic matrix is constituted by magnetic crystal grains separated from each other with an average distance of 2 nm or less;

wherein an average non-magnetic particle diameter is 1 nm or more, wherein a full width at half maximum of the distribution of the angle formed between an array axis of the ordered particle domain and the track length direction is 40° or less, and wherein a size in the track width direction of each ordered particle domain is one fifth or more of a width of the recording track formed on the recording layer.

21. A magnetic recording medium comprising a magnetic recording layer formed on a substrate, in which information is recorded by forming recording cells in recording tracks formed on a surface of the magnetic recording layer:

wherein the magnetic recording layer has a structure that magnetic particles are dispersed in a non-magnetic matrix, the magnetic particles being arrayed regularly on a surface thereof;

and wherein the number of the magnetic particles arranged along the track length direction in the minimum recording cell is four or more;

and wherein the full width at half maximum of distribution of the distance between closest magnetic particles is ±40% or less to an average distance between closest magnetic particles;

and wherein the full width at half maximum of distribution of magnetic particle diameter is ±20% or less to an average magnetic particle diameter.

22. A magnetic recording medium comprising a magnetic recording layer formed on a substrate, in which information is recorded by forming recording cells in recording tracks formed on a surface of the magnetic recording layer:

wherein the magnetic recording layer has a structure that non-magnetic pores are dispersed in a continuous magnetic film, the non-magnetic pores being arrayed regularly on a surface thereof;

and wherein magnetization transitions in the continuous magnetic film are made by domain walls connecting the non-magnetic pores;

and wherein an average non-magnetic pore diameter ranges from 0.5 to 3 times of an average domain wall width.

23. The medium according to claim 22, wherein a full width at half maximum of distribution of distance between closest non-magnetic pores is ±40% or less to an average distance between closest non-magnetic pores.

* * * * *